(12) United States Patent
Uehara et al.

(10) Patent No.: US 7,547,129 B2
(45) Date of Patent: Jun. 16, 2009

(54) CONTROLLED VIEWING ANGLE DISPLAY APPARATUS

(75) Inventors: Shinichi Uehara, Tokyo (JP); Masao Imai, Tokyo (JP); Yoshi Yagi, Tokyo (JP)

(73) Assignee: NEC Corporation, Tokyo (JP)

(*) Notice: Subject to any disclaimer, the term of this patent is extended or adjusted under 35 U.S.C. 154(b) by 70 days.

(21) Appl. No.: 11/248,475

(22) Filed: Oct. 13, 2005

(65) Prior Publication Data

US 2006/0077688 A1  Apr. 13, 2006

(30) Foreign Application Priority Data

Oct. 13, 2004 (JP) ............................ 2004-298377
Apr. 26, 2005 (JP) ............................ 2005-128246

(51) Int. Cl.
*F21V 7/04* (2006.01)

(52) U.S. Cl. ................ 362/607; 362/600; 362/613; 362/628; 349/65

(58) Field of Classification Search ............ 362/607, 362/26, 27, 600, 613, 615–629; 349/61, 349/65, 68
See application file for complete search history.

(56) References Cited

U.S. PATENT DOCUMENTS 5,956,107 A * 9/1999 Hashimoto et al. ........... 349/64
6,854,857 B2 * 2/2005 Hara et al. .................. 362/613
7,052,168 B2 * 5/2006 Epstein et al. .............. 362/625
7,165,874 B2 * 1/2007 Nagakubo et al. .......... 362/623
7,275,851 B2 * 10/2007 Sakurai ...................... 362/612

FOREIGN PATENT DOCUMENTS

| JP | 05-108023 | 4/1993 |
| JP | 06-059287 | 3/1994 |
| JP | 09-073070 | 3/1997 |
| JP | 09-105907 | 4/1997 |
| JP | 10-097199 | 4/1998 |

* cited by examiner

*Primary Examiner*—Briggitte R Hammond
*Assistant Examiner*—Vanessa Girardi
(74) *Attorney, Agent, or Firm*—Young & Thompson

(57) ABSTRACT

A light source apparatus permits an angular range of illumination light to be changed, wherein the apparatus can be made thin. A related display apparatus permits a visible angular range to be changed using the light source apparatus. The display apparatus can be mounted in a terminal device, ahd an optical member and an optical unit can be incorporated in the light source apparatus. The light source apparatus is provided with a light guide plate with a conical sheet. Two light sources are provided on side surfaces of the light guide plate. Two inclined surfaces whose inclination angles to a light output surface differ from each other are formed at a light diffusion surface of the light guide plate. The conical sheet is provided with a flat plate portion on which a plurality of cones are formed. The cones protrude toward the light guide plate.

14 Claims, 43 Drawing Sheets

FIG. 27
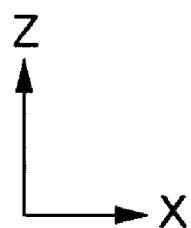
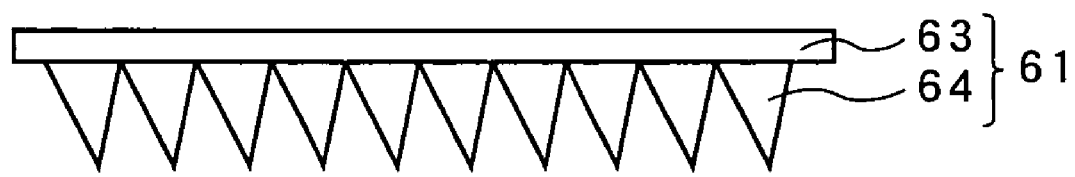

FIG. 28
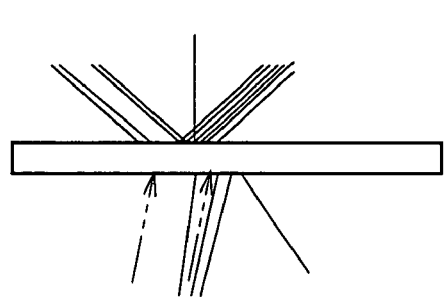
(a) 10°
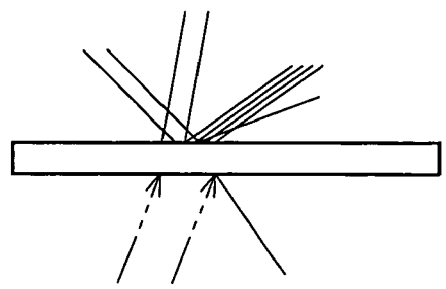
(b) 20°
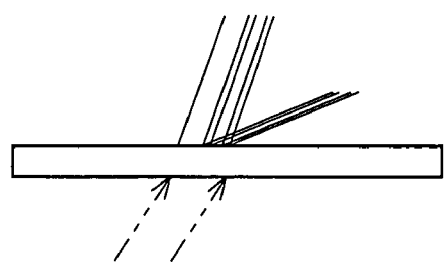
(c) 30°
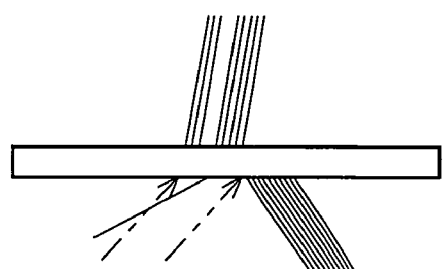
(d) 40°
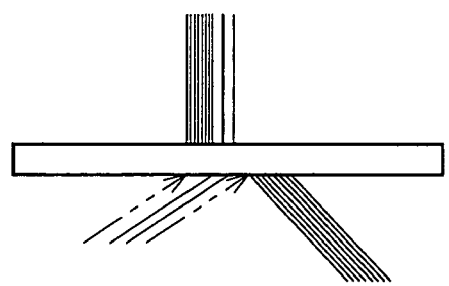
(e) 50°
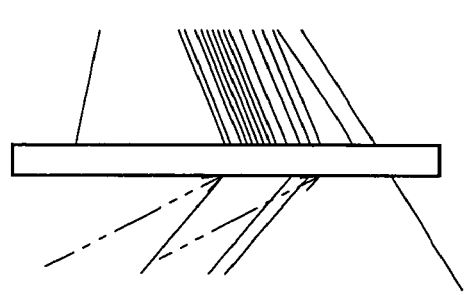
(f) 60°
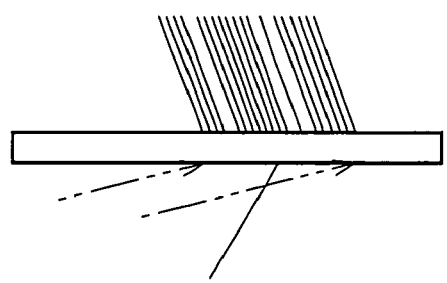
(g) 70°

CONTROLLED VIEWING ANGLE DISPLAY APPARATUS

BACKGROUND OF THE INVENTION

1. Field of the Invention

The present invention relates to a light source apparatus that changes the angular range of illumination light, a display apparatus which permits a visible angular range to be changed using the light source apparatus, a terminal device in which the display apparatus is mounted, and an optical member and an optical unit which are to be incorporated in the light source apparatus. More particularly, the invention relates to a light source apparatus, a display apparatus, a terminal device, an optical member and an optical unit, which are thin.

2. Description of the Related Art

Recently, display apparatuses using a liquid crystal panel are widely mounted in portable terminal devices due to their advantages, such as compactness, flatness, lightness and low power consumption. The modes of the liquid crystal panel that are best used in conventional portable terminal devices include an STN (Super Twisted Nematic) mode with a passive matrix structure and a TN (Twisted Nematic) mode with an active matrix structure. Liquid crystal panels of those modes suffer a narrow angular range where the gradation can be seen adequately, causing inversion of gradation when the line of sight comes off the optimal position of observation.

The inversion of gradation has not mattered so much for the conventional portable terminal devices when the display contents are generally characters, such as telephone numbers. The recent technical advancements allow portable terminal devices to often display image information as well as text information. Accordingly, inversion of gradation significantly lowers the visibility. To cope with the problem, liquid crystal panels with a wider angular range to ensure proper visibility of gradation without causing gradation inversion are gradually being mounted in portable terminal devices. The liquid crystal panels of such a mode are generally called a wide view angle liquid crystal panel, and a horizontal field mode, such as an in-plane switching mode, a multidomain vertically aligned mode, and the like are worked to practical use. The use of those wide view angle liquid crystal panels can ensure proper visibility of gradation in a wider angular range. While portable terminal devices are basically personal tools, therefore, applications which can be viewed simultaneously by a plurality of people and permit information to be shared with other people have been developed and are gradually being installed in the portable terminal devices.

Because of the nature of portable terminal devices, the portable terminal devices are used in public as well as in private rooms where privacy and security are strictly secured. It is necessary to take security measures on the display of privacy information and security information which should not be viewed by a third party. Particularly, the recent technical advancements of portable terminal devices increase opportunities of displaying privacy information and security information, resulting in growing demands of the peek proof technology. Accordingly, it is desirable to realize the peek proof technology of allowing the user alone to view the display contents by narrowing the display-visible angular range. There are several liquid crystal display apparatuses which meet the demands.

FIG. 75 is a perspective view of a view-angle controlled display apparatus according to a first prior art described in Patent Literature 1 (Japanese Patent No. 3087861) As shown in FIG. 75, the view-angle controlled display apparatus according to the first prior art comprises a surface light source 1101, an optical shutter plate 1102, an optical path control plate 1103, and a transmission display apparatus 1104. The optical shutter plate 1102 comprises a first polarizing plate 1105 for optical shutter, a twisted nematic liquid crystal cell 1106 for optical shutter, and a second polarizing plate 1107 for optical shutter. The transmission display apparatus 1104 comprises a twisted nematic liquid crystal cell 1108 for display, and a third polarizing plate 1109 for display. Each shutter area of the optical shutter plate 1102 can be switched between a light transmission area and a light shielding area in response to an electric signal. The optical path control plate 1103 converges the light, emitted from the surface light source 1101 and transmitted from the light transmission area of the optical shutter plate 1102, at a predetermined position, and comprises, for example, microlens. The transmission display apparatus 1104 displays an image with light from the optical path control plate 1103 as the light source.

In the view-angle controlled display apparatus according to the first prior art described in Patent Literature 1, given that only a part of the optical shutter plate 1102 serves as the light transmission area and the remaining area serves as the light shielding area, only a part of an omnidirectional light emitted from the surface light source 1101 transmits the optical shutter plate 1102, so that the optical shutter plate 1102 works as if it were a point light source or a line light source. As the optical path control plate 1103 comprising a microlens is provided in the optical path, light emitted from the light source is converged at the observation position that is determined by the positional relationship between the light source and the microlens. Because the transmission display apparatus 1104 is intervened on the optical path between the optical path control plate 1103 and the observation position, light affixed with an display image reaches the observation position. An observer can therefore observe an image only in the light converging area. If the entire optical shutter plate 1102 is made to work as the light transmission area and a surface light source, an image can be observed in a wide area. Accordingly, it is possible to switch the visible angular range.

FIGS. 76A and 76B are cross-sectional views of a view-angle controlled liquid crystal display apparatus according to a second prior art described in Patent Literature 2 (Unexamined Japanese Patent Application KOKAI Publication No. H6-59287). FIG. 76A shows the liquid crystal display apparatus when no voltage is applied, and FIG. 76B shows the liquid crystal display apparatus when a voltage is applied. As shown in FIGS. 76A and 76B, the view-angle controlled liquid crystal display apparatus according to the second prior art is provided with a liquid crystal panel having a liquid crystal material (not shown) sealed by transparent substrates 2102 and 2108. A polarizing plate 2101 is provided on one surface of the liquid crystal panel, and a guest-host liquid crystal 2131 is provided on the other surface thereof. A liquid crystal material comprising liquid crystal molecules 2131$a$ and elongated dye molecules 2131$b$ is sealed in the guest-host liquid crystal 2131 by two transparent substrates 2114. The dye molecules 2131$b$ have a larger amount of light absorption in the short axis of molecules than in the long axis of molecules.

When no voltage is applied to the guest-host liquid crystal 2131, the liquid crystal molecules 2131$a$ and the elongated dye molecules 2131$b$ are aligned in such a way that their lengthwise direction is in parallel to the surfaces of the transparent substrates 2114. When a voltage is applied to the guest-host liquid crystal 2131, the liquid crystal molecules 2131$a$ and the elongated dye molecules 2131$b$ are aligned in such a way that their lengthwise direction is perpendicular to the surfaces of the transparent substrates 2114.

In the view-angle controlled liquid crystal display apparatus according to the second prior art described in Patent Literature 2, light of a wide angular range is input to the guest-host liquid crystal 2131. At the time of displaying an image at a wide angle, no voltage is applied to the guest-host liquid crystal 2131 to match the direction of light absorption of the guest-host liquid crystal 2131 with the direction of light absorption of the polarizing plate 2101, so that the light directly transmits the guest-host liquid crystal 2131. This can allow the display screen to be visible in a wide angular range.

At the time of displaying an image at a narrow angle, a voltage is applied to the guest-host liquid crystal 2131 to align the dye molecules 2131b in such a way that their lengthwise direction becomes perpendicular to the surfaces of the transparent substrates 2114, so that the light whose inclination angle is shifted greatly from the direction perpendicular to the surfaces of the transparent substrates 2114 is absorbed by the dye molecules 2131b and does not transmit the guest-host liquid crystal 2131. Even if the angular distribution of the light input to the display apparatus is wide, therefore, the angular distribution of the output light becomes narrower by the absorption by the guest-host liquid crystal. This can narrow the visible display screen. It is therefore possible to switch the visible angular range.

FIG. 77 is a cross-sectional view of a view-angle controlled display apparatus according to a third prior art described in Patent Literature 3 (Unexamined Japanese Patent Application KOKAI Publication No. H9-73070). As shown in FIG. 77, in the view-angle controlled liquid crystal display apparatus according to the third prior art, a view-angle control apparatus 3020 is provided on the display surface side of a reflection type TN liquid crystal display apparatus 3010. In the view-angle control apparatus 3020, transparent electrodes 3022 and 3024 are respectively formed inside two transparent substrates 3021 and 3025 arranged facing each other, and a macromolecular dispersion type liquid crystal layer 3023 is sealed between the transparent electrodes 3022 and 3024. The macromolecular dispersion type liquid crystal layer 3023 is formed by sealing a mixture of a polymer precursor and a liquid crystal and curing the polymer by irradiation of ultraviolet rays while causing phase separation of the liquid crystal and the polymer at the same time.

The light transmittance of the view-angle control apparatus 3020 is high when no voltage is applied, so that an image can be observed in a wide area. When an AC voltage is applied to the view-angle control apparatus 3020, the liquid crystal molecules are aligned in the direction of an electric field, and become a light scattering state due to the difference in refractive index between the liquid crystal and the polymer, resulting in opacity. The scattering intensity is high particularly in a specific azimuth angular range. Therefore, setting the specific azimuth angular range to a predetermined direction can provide the light output from the liquid crystal display apparatus 3010 with directivity. This can ensure privacy of the display contents of the liquid crystal display apparatus from nearby persons. Accordingly, the view-angle control apparatus 3020 can switch the angular range in which the liquid crystal display apparatus 3010 is visible.

FIG. 78 is a cross-sectional view of a view-angle controlled display apparatus according to a fourth prior art described in Patent Literature 4 (Unexamined Japanese Patent Application KOKAI Publication No. H9-105907). As shown in FIG. 78, the view-angle controlled liquid crystal display apparatus according to the fourth prior art is provided with a backlight unit 4300 whose luminance is controllable and a liquid crystal panel 4100 with a high view angle characteristic which passes light output from the backlight unit 4300. The backlight unit 4300 is constructed in such a way as to make the luminance variable. An optical element 4200 is laid out between the backlight unit 4300 and the liquid crystal panel 4100. The optical element 4200 has a polymer dispersion type liquid crystal filled between two transparent substrates arranged in a face-to-face manner. As a voltage is applied to a pair of transparent electrodes formed on the polymer dispersion type liquid crystal side of the individual transparent substrates, the light scattering of the polymer dispersion type liquid crystal is controlled. Accordingly, the liquid crystal display apparatus can change the luminance of the backlight unit 4300 and the light scattering of the optical element 4200.

In case where the liquid crystal display apparatus is observed by a few people while moving, or in case where the liquid crystal display apparatus is observed by many people without moving, the liquid crystal display apparatus can be observed by increasing both the luminance of the backlight and the degree of light scattering of the optical element 4200. The liquid crystal display apparatus can therefore substantially demonstrate the effectiveness of the wide view angle characteristic.

When the wide view angle characteristic of the liquid crystal display apparatus is not particularly needed, e.g., when the liquid crystal display apparatus is observed by a few people without moving, the luminance of the backlight as well as the degree of light scattering of the optical element 4200 is reduced. This can allow the visible angular range to be switched.

FIG. 79 is a cross-sectional view of a view-angle controlled display apparatus according to a fifth prior art described in Patent Literature 5 (Japanese Patent No. 3271695). FIG. 80 is a perspective view of a diffusion light guide plate which is used in the backlight source of the prior art. As shown in FIG. 79, the view-angle controlled liquid crystal display apparatus according to the fifth prior art is provided with a liquid crystal display element 5004. Two polarizing plates 5012 are respectively provided on the front and rear sides of the liquid crystal display element 5004, and a backlight source is provided on the rear side of the liquid crystal display element 5004. The backlight source has a double-layer structure in which a backlight source having a diffusion light guide plate and an ordinary backlight source are laminated. The ordinary backlight source is provided with two fluorescent tubes 5008 as light sources on the respective side surfaces of a light guide plate 5009. A scatter sheet 5007 is laid out in front of the light guide plate 5009, and a prism sheet 5006, which converges light, is laid out in front of the scatter sheet 5007. That is, the ordinary backlight source is no different in structure from the backlight sources known before the application of Patent Literature 5, and has a structure which is normally used well.

Provided in front of the prism sheet 5006 is a light shielding slit film 5005 whose visible angle is 10 degrees to 20 degrees or so in the right and left direction and which does not pass light only in the front direction. A diffusion light guide plate 5001 is provided in front of the light shielding slit film 5005. Two fluorescent tubes 5003 as light sources are provided on the respective side surfaces of the diffusion light guide plate 5001. As shown in FIG. 80, the diffusion light guide plate 5001 is a transparent plate of, for example, acrylate resin, and has multiple minute recesses 5002 formed in the surface thereof, and generally has a pinform pattern.

In the thus-constructed view-angle controlled display apparatus according to the fifth prior art described in Patent Literature 5, when the fluorescent tubes 5003 are turned off and the fluorescent tubes 5008 are turned on, the lights emitted from the fluorescent tubes 5008 transmit the light guide plate 5009, the scatter sheet 5007 and the prism sheet 5006 in order, and are partly cut when transmitting the light shielding slit film 5005 to be narrow-angled light of a visible angle of 10 degrees to 20 degrees in the right and left direction. This light is hardly diffused even when transmitting the diffusion light guide plate 5001 from directly below, and transmits the liquid crystal display element 5004 as narrow-angled light of a visible angle of 40 degrees to 50 degrees or so in the right and left direction. Accordingly, the light goes out only in the front direction, resulting in a narrow-angled state where an image can be recognized only in the angular range of 40 to 50 degrees or so in the right and left direction.

When the fluorescent tubes 5003 are turned on and the fluorescent tubes 5008 are turned off, on the other hand, the light is diffused at the recesses 5002 of the diffusion light guide plate 5001. Accordingly, the light transmits the liquid crystal display element 5004 also in other directions than the front direction. This results in a wide-angled state where an image can be recognized at a wide angle of 80 degrees or greater in the right and left direction. It is therefore possible to switch the visible angular range.

The prior arts however have the following problems. The view-angle controlled display apparatus according to the first prior art described in Patent Literature 1 comprises a surface light source, an optical shutter plate comprised of plural constituting elements, an optical path control plate, and a transmission display apparatus. The optical shutter plate comprises a twisted nematic liquid crystal cell, and the transmission display apparatus comprises a twisted nematic liquid crystal cell for display. The twisted nematic liquid crystal cell of the optical shutter plate, like the twisted nematic liquid crystal cell for display, comprises transparent substrates, thus making the view-angle controlled display apparatus thicker by two times or greater than the ordinary liquid crystal display apparatus without a view-angle controlling capability. In other words, the addition of the view-angle controlling capability increases the thickness of the display apparatus, making the apparatus thinner difficult. When the display apparatus is to be mounted in a portable terminal device, particularly, the increased thickness becomes a significant issue.

The view-angle controlled display apparatus according to the second prior art described in Patent Literature 2 takes the structure where a liquid crystal panel, a polarizing plate, and a guest-host liquid crystal cell are laminated. The guest-host liquid crystal cell, like the liquid crystal panel, comprises transparent substrates, thus making the view-angle controlled display apparatus thicker than the liquid crystal display apparatus which comprises the liquid crystal panel alone. The view-angle controlled display apparatus therefore raises a problem similar to that of the view-angle controlled display apparatus described in Patent Literature 1.

The view-angle controlled display apparatus according to the third prior art described in Patent Literature 3 also takes the structure where a reflection type TN liquid crystal display apparatus and a view-angle control apparatus are laminated. The view-angle control apparatus, like the TN liquid crystal display apparatus, comprises transparent substrates, so that the view-angle controlled display apparatus becomes thicker than the liquid crystal display apparatus which comprises the liquid crystal panel alone. The view-angle controlled display apparatus therefore raises a problem similar to that of the view-angle controlled display apparatus described in Patent Literature 1.

The view-angle controlled display apparatus according to the fourth prior art described in Patent Literature 4 takes the structure where a liquid crystal panel and an optical element are laminated. The optical element, like the liquid crystal panel, comprises transparent substrates, so that the view-angle controlled display apparatus becomes thicker than the liquid crystal display apparatus which comprises the liquid crystal panel alone. The view-angle controlled display apparatus therefore raises a problem similar to that of the view-angle controlled display apparatus described in Patent Literature 1.

The view-angle controlled display apparatus according to the fifth prior art described in Patent Literature 5 takes the structure where a liquid crystal display element, an ordinary backlight source, and a backlight source having a diffusion light guide plate are laminated. Unlike the liquid crystal display apparatuses described in Patent Literatures 1 to 4, the liquid crystal display apparatus includes only the liquid crystal element as a consituting element which has transparent substrates. However, the lamination of the two backlight sources doubles the overall thickness of the display apparatus or makes the apparatus thicker. That is, the added view-angle controlling capability increases the overall thickness, which makes it difficult to design the display apparatus thinner. When the display apparatus is to be mounted in a portable terminal device, particularly, the increased thickness raises a significant problem similar to that of the view-angle controlled display apparatus described in Patent Literature 1.

SUMMARY OF THE INVENTION

Accordingly, it is an object of the present invention to provide a light source apparatus that changes the angular range of illumination light and can be thin, a display apparatus which permits a visible angular range to be changed using the light source apparatus, a terminal device in which the display apparatus is mounted, and an optical member and an optical unit which are to be incorporated in the light source apparatus.

A light source apparatus according to the first aspect of the invention includes a first light source and a second light source; a light guide member which outputs light input from the first light source in a first direction, and outputs light input from the second light source in a second direction different from the first direction; and an optical member which outputs light output from the light guide member in the first direction in a first angular range, and outputs light output from the light guide member in the second direction in a second angular range wider than the first angular range.

A display apparatus according to the second aspect of the invention includes the light source apparatus as recited above; and a transmission display panel which adds an image to light output from the light source apparatus when transmitting the light.

A terminal device according to the third aspect of the invention includes the display apparatus as recited above. The terminal device may be one of a cellular phone, a personal digital assistant, a game machine, a digital camera and a digital video player.

An optical member according to the fourth aspect of the invention includes a flat plate portion made of a transparent material; and a plurality of cones of a transparent material which are formed on one side of the flat plate portion, and whose center axes are parallel to one another.

A display apparatus according to the fifth aspect of the invention includes the light source apparatus as recited above; and a transmission display panel which adds an image to light output from the light source apparatus when transmitting the light.

An optical unit according to the sixth aspect of the invention includes a light guide member which outputs light input from a first side in a first direction, and outputs light input from a second side different from the first side in a second direction different from the first direction; and an optical member which outputs light output from the light guide member in the first direction in a first angular range, and outputs light output from the light guide member in the second direction in a second angular range wider than the first angular range, and has a flat plate portion made of a transparent material, and a protruding portion of a transparent material which is formed on that side of the flat plate portion which faces the light guide member and has a top portion in close contact with the light guide member, and whose side surfaces have a curved surface convex in a direction going toward the light guide member, and another curved surface convex in a direction going away from the light guide member.

BRIEF DESCRIPTION OF THE DRAWINGS

FIG. 4 is a perspective view of an optical model illustrating a case where a narrow-view light source is turned on;

FIG. 7 is a perspective view of an optical model illustrating a case where a wide-view light source is turned on;

FIG. 27 is a cross-sectional view of a conical sheet along the XZ plane, which is used in the light source apparatus according to the second embodiment of the invention;

FIGS. 28A to 28G are diagrams illustrating the results of simulation on the behavior of output light while changing the direction of rays of light incident to a conical sheet 61 having cones of an inclination angle of 10 degrees for illustrating the optical operation of the conical sheet, when the wide-view light source is turned on according to the first embodiment of the invention,ÿand respectively illustrating the simulation results at the inclination angles of 10 degrees, 20 degrees, 30 degrees, 40 degrees, 50 degrees, 60 degrees, and 70 degrees from the Z axis;

FIG. 36 is a diagram of an optical model at the cross section along line D-D shown in FIG. 35, illustrating light which goes out of the light guide plate from an inclined surface with an inclination angle of 45 degrees and enters the light guide plate again, particularly when the narrow-view light source is turned on;

FIG. 37 is a diagram of an optical model at the cross section along line E-E shown in FIG. 35, illustrating light which goes out of the light guide plate from an inclined surface with an inclination angle of 45 degrees and enters the light guide plate again after being reflected at a reflector, particularly when the narrow-view light source is turned on;

FIG. 65 is a partly enlarged cross-sectional view illustrating the behavior of light near a protruding portion when the narrow-view light source is turned on;

DETAILED DESCRIPTION OF THE PREFERRED EMBODIMENTS

Figure 1:
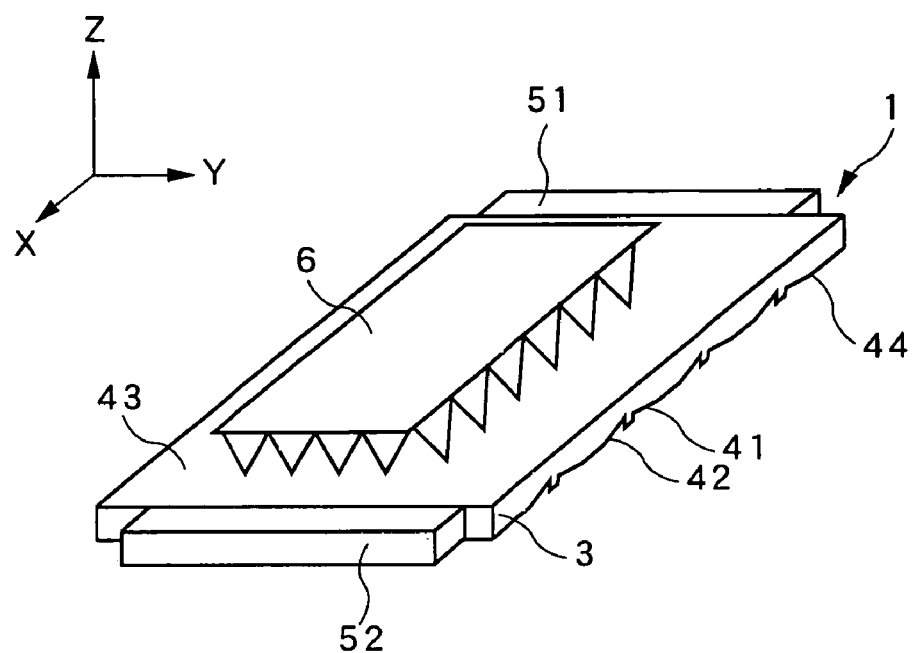
FIG. 1 is a perspective view of a light source apparatus according to a first embodiment of the present invention.
Figure 2:
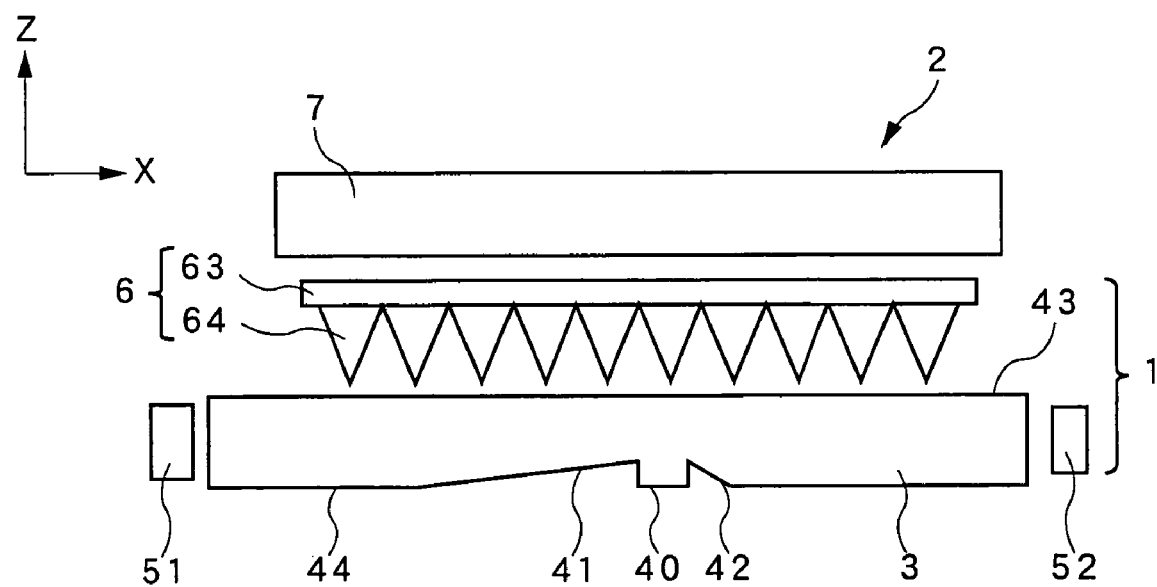
FIG. 2 is a cross-sectional view of a display apparatus in which the light source apparatus according to the first embodiment of the invention is mounted.
Figure 3:
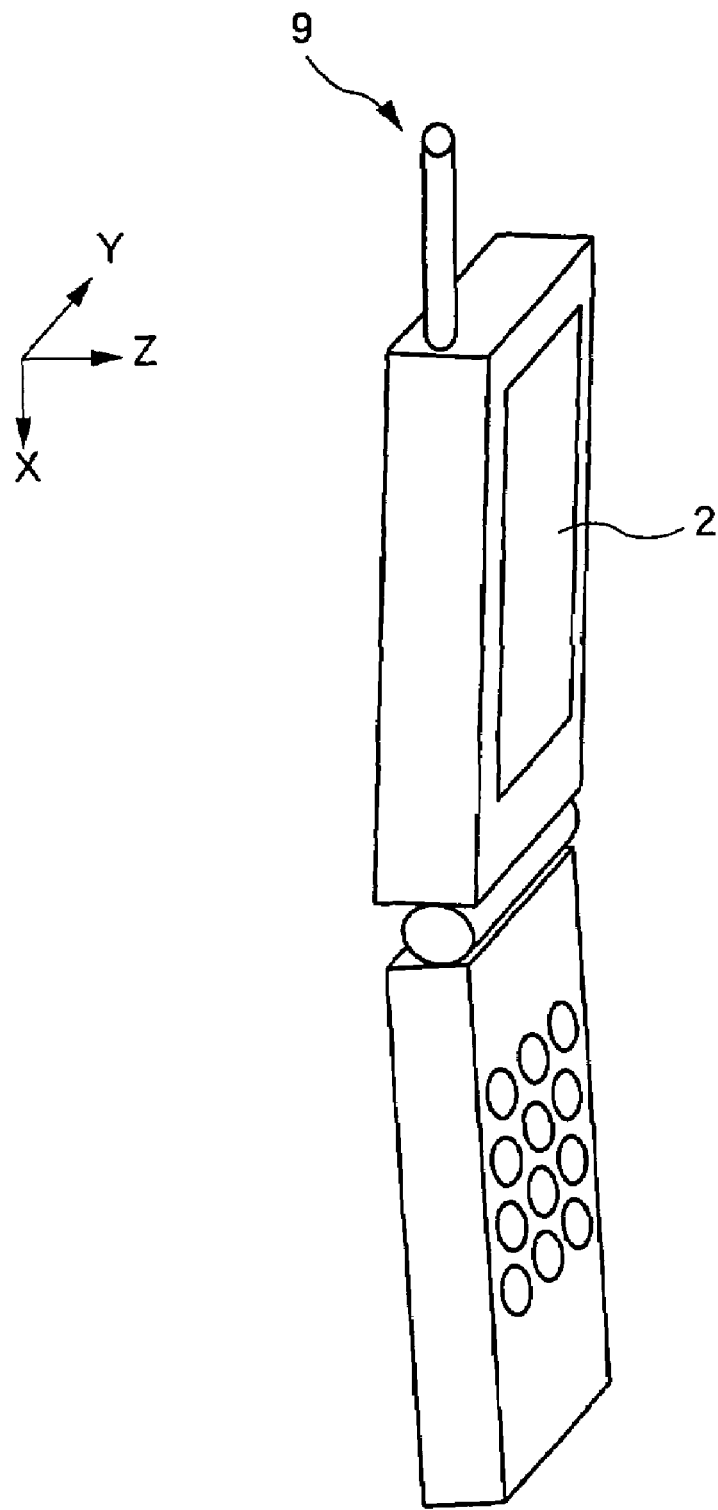
FIG. 3 is a perspective view of a terminal device in which the display apparatus using the light source apparatus according to the first embodiment of the invention is mounted.

A light source apparatus according to each preferred embodiment of the invention, and a display apparatus and a terminal device both of which use the light source apparatus will be described below with reference to the accompanying drawings. To begin with, a light source apparatus according to the first embodiment of the invention, and a display apparatus and a terminal device both of which use the light source apparatus will be described. FIG. 1 is a perspective view of the light source apparatus according to the embodiment, FIG. 2 is a cross-sectional view of a display apparatus using the light source apparatus, and FIG. 3 is a perspective view of a terminal device in which the display apparatus using the light source apparatus according to the embodiment is mounted.

As shown in FIG. 1, a light source apparatus 1 according to the first embodiment comprises a light guide plate 3, a conical sheet 6 laid out in front of the light guide plate 3, i.e., on a viewer/listener side, and light sources 51 and 52 respectively laid out on the two side surface sides facing each other. The light source 51 is for narrow viewing, and the light source 52 is for wide viewing. The front side of the light guide plate 3 or that side of the light guide plate 3 which is located on the conical sheet side is a light output surface 43. The opposite side or the rear side of the light guide plate 3 is called a light diffusion surface 44. The light output surface 43 is flat. Formed on the light diffusion surface 44 are two inclined surfaces 41 and 42 having different inclination angles with respect to the light output surface 43.

For the sake of convenience, the XYZ orthogonal coordinate system is set as follows through the specification. The direction going toward the light source 52 from the light source 51 is a +X direction, and the opposite direction is a −X direction. The +X direction and the −X direction are generally called "X-axial direction". Of the directions parallel to the light output surface 43 of the light guide plate 3, the direction orthogonal to the X-axial direction is a Y-axial direction. The direction that is orthogonal to both the X-axial direction and the Y-axial direction is a Z direction. Of the Z-axial direction, the direction going toward the light output surface 43 from the light diffusion surface 44 is a +Z direction, the opposite direction is a −Z direction. The +Z direction is frontward or the direction toward a viewer/listener. The +Y direction is the direction where the right-hand coordinate system is satisfied. That is, when the thumb of the right hand of a person is pointed in the +X direction and the index finger is pointed in the +Y direction, the middle finger is pointed in the +Z direction.

Provided that the XYZ orthogonal coordinate system is set in the aforementioned manner, the light output surface 43 of the light guide plate 3 becomes the XY plane, the light source 51 is laid out in the −X direction as seen from the light guide plate 3, the light source 52 is laid out in the +X direction, and the conical sheet 6 is laid out in the +Z direction. The light sources 51 and 52 are diffusive light sources, and lights output from the light sources 51 and 52 are diffused in the light guide plate 3 at least in the X and Y directions.

As shown in FIG. 2, an inclined surface 41, a flat surface 40 and an inclined surface 42 are repeatedly laid out on the light diffusion surface 44 of the light guide plate 3 in the +X direction in the named order. The direction of the inclination of the inclined surface 41 and the direction of the inclination of the inclined surface 42 with respect to the +X direction are opposite to each other. The inclined surface 41 is inclined in the direction in which light output from the light source 51 and transmitted in the light guide plate 3 in the +X direction is irradiated, and the inclined surface 42 is inclined in the direction in which light output from the light source 52 and transmitted in the light guide plate 3 in the −X direction is irradiated. The absolute value of the inclination angle of the inclined surface 41 is smaller than the absolute value of the inclination angle of the inclined surface 42. The absolute value of the inclination angle of the inclined surface 41 is, for example, 6 degrees, and the absolute value of the inclination angle of the inclined surface 42 is 45 degrees. The boundary between the inclined surface 41 and the inclined surface 42 is a projecting ridge protruding in the −Z direction, and the boundary between the flat surface 40 and the inclined surface 41, and the boundary between the inclined surface 2 and the flat surface 40 are steps in the Z-axial direction. The flat surface 40, the inclined surface 1 and the inclined surface 2 extend over the entire length of the light guide plate 3 in the Y-axial direction.

In the conical sheet 6, a flat plate portion 63 of a transparent material is formed, and a plurality of cones 64 are formed on the back of the flat plate portion 63. The flat plate portion 63 is laid out in parallel to the XY plane, and the cones 64 protrude in the −Z direction or toward the light guide plate 3. That is, the center axes of the cones 64 are parallel to one another and are parallel to the Z-axial direction. The vertexes of the cones 64 are laid out along the X-axial direction and two directions inclined by 60 degrees to the X-axial direction in the XY plane. In other words, there are a total of three extending directions of the imaginary line connecting the vertexes of the cones 64, namely the X-axial direction and two directions inclined by 60 degrees to the X-axial direction in the XY plane. Accordingly, connecting the vertexes of the adjoining three cones 64 defines an imaginary right triangle whose one side extends in the Y-axial direction.

In one example, the vertexes of the adjoining three cones 64 are laid out at equal pitches of 50 μm in the Y-axial direction liquid crystal panel, so that one side of the right triangle defined by the vertexes of the cones 64 is 50 μm. The apex angle of the cones 64 is 70 degrees, and the height of the cones 64 is 36 μm. The "apex angle" is the angle defined by two sides in a cross section including the center axis of the cone 64. A transparent resin is preferably used for the light guide plate 3 and the conical sheet 6 for its easy processability; for example, polymethyl-methacrylate (PMMA) with a refractive index of 1.5 is used in the embodiment.

As shown in FIG. 2, in a display apparatus 2 which uses the light source apparatus 1 according to the first embodiment, a transparent liquid crystal panel 7 is provided on that side of the conical sheet 6 where the light guide plate 3 is laid out, i.e., on the +Z-directional side. The transparent liquid crystal panel 7 is a liquid crystal panel of an in-plane switching mode, a multidomain vertically aligned mode or a film-compensated TN mode. FIG. 2 shows the flat surface 40, the inclined surface 41 and the inclined surface 42 only at one location for the sake of simplifying the diagram.

As shown in FIG. 3, the display apparatus 2 is mounted in, a cellular phone 9. The horizontal direction and the vertical direction of the cellular phone are so set as to be respectively the Y-axial direction and the X-axial direction of the light source apparatus 1. That is, the two light sources 51 and 52 (see FIG. 2) in the cellular phone 9 are laid out over and under the display screen, respectively.

Figure 4:
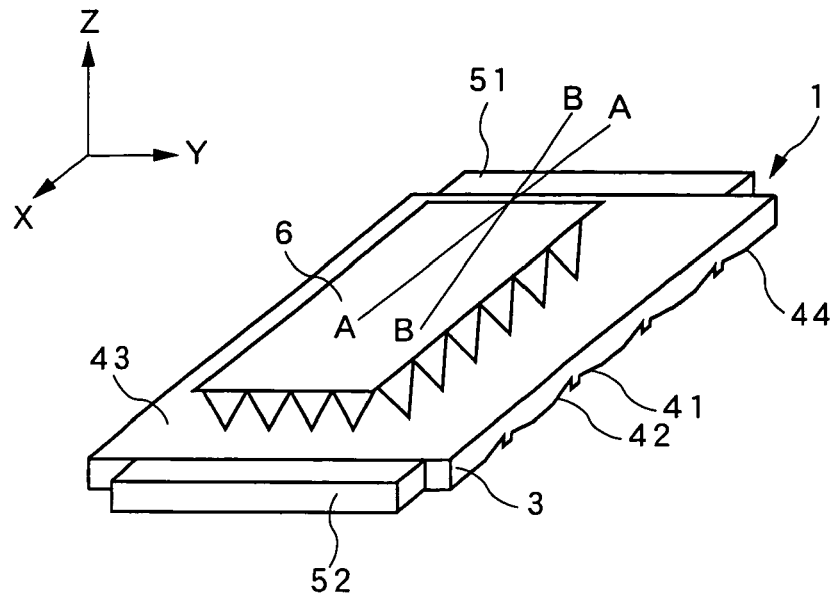
Figure 5:
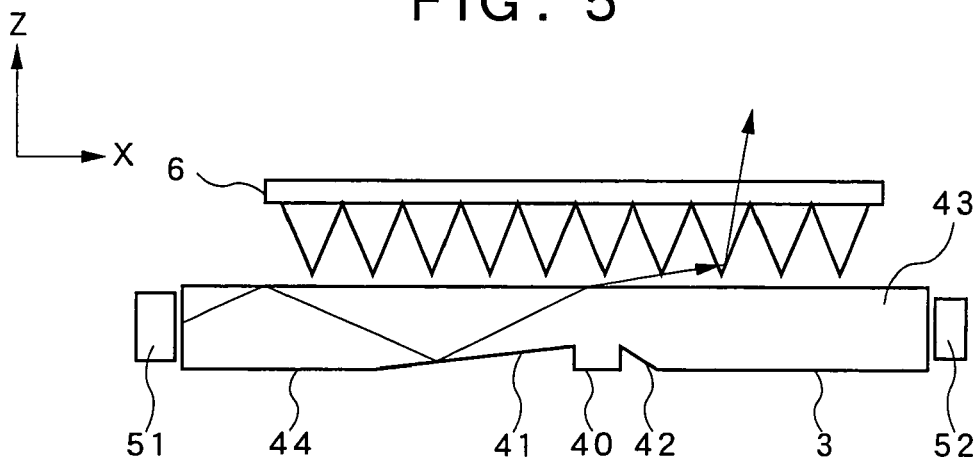
FIG. 5 is a diagram of the optical model at the cross section along line A-A shown in FIG. 4.
Figure 6:
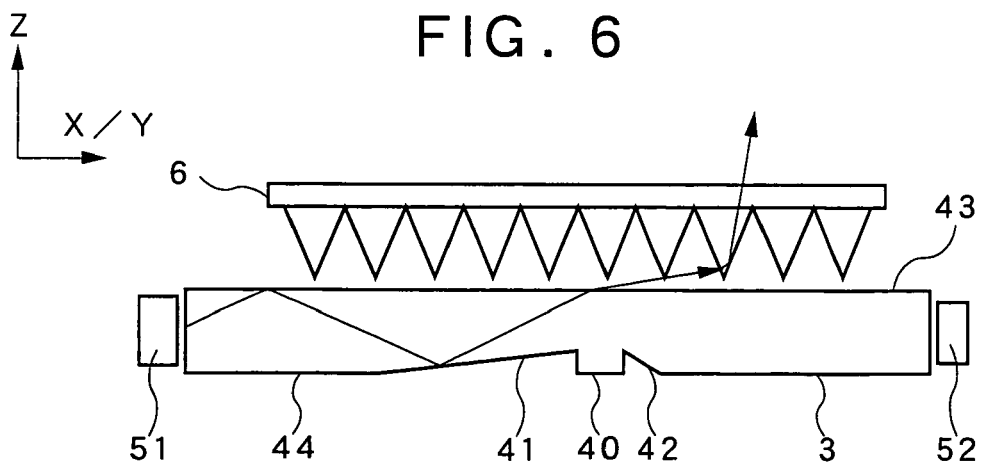
FIG. 6 is a diagram of the optical model at the cross section along line B-B shown in FIG. 4.

The operation of the light source apparatus 1 according to the embodiment with the above-described structure, i.e., the method of switching the angular range of the illuminated light in the light source apparatus 1 will be described. First, the operation of narrowing the range of irradiation of the light source apparatus 1 will be described. FIG. 4 is a perspective view of an optical model illustrating a case where the narrow-view light source 51 is turned on, FIG. 5 is a diagram of the optical model at the cross section along line A-A shown in FIG. 4, and FIG. 6 is a diagram of the optical model at the cross section along line B-B shown in FIG. 4. The line A-A extends in the X-axial direction, and the line B-B extends in the direction angled from the X-axial direction by 30 degrees in the XY plane. FIGS. 5 and 6 show the flat surface 40, the inclined surface 41 and the inclined surface 42 only at one location for the sake of illustrative simplicity.

The behavior of light at the cross section along line A-A shown in FIG. 5 will be discussed below. The light emitted from the narrow-view light source 51 is input to the light guide plate 3. But, the angle defined by the traveling direction of the light after entering the light guide plate 3 and the +X direction with respect to the Z-axial direction becomes smaller than 41.8 degrees based on the Snell's law due to the difference in refractive index between air and the resin material for the light guide plate 3. Let us consider the rays of light inclined by 41.8 degrees in the +Z direction with respect to the +X direction.

The light emitted from the narrow-view light source 51 and input to the light guide plate 3 reaches the light output surface 43 of the light guide plate 3. This light is not however output from the light guide plate 3 and is totally reflected for the angle with respect to the Z-axial direction is 48.2 degrees which is larger than the critical angle of 41.8 degrees. Likewise, when the light is input to other regions than the inclined surfaces 41 and 42 on the light diffusion surface 44, the light is totally reflected at the same angle, so that the light propagates in the direction away from the light source 51 while repeating the total reflection between the light output surface 43 and the light diffusion surface 44. When the light is input to the inclined surface 41 with the inclination angle of 6 degrees with respect to the X-axial direction during propagation, the angle from the normal line of the inclined surface 41 becomes 42.2 degrees. As the angle is larger than the critical angle of 41.8 degrees, the light does not go out of the light guide plate 3 from the inclined surface 41 and is totally reflected. The angle of the light after total reflection with respect to Z-axial direction becomes 36.2, smaller than the critical angle, so that the light having reached the light output surface 43 goes out of the light guide plate 3, and the angle of the after being output becomes 62.4 with respect to the Z-axial direction.

As mentioned above, the angle of the light input to the light guide plate 3 with respect to the X-axial direction after being input always becomes equal to or smaller than 41.8 degrees. Therefore, the angle of the input light with respect to the X-axial direction when having reached the light output surface 43 or the light diffusion surface 44 of the light guide plate 3 becomes 48.2 degrees or greater, thus resulting in total reflection. In the process where the light is totally reflected at the light output surface 43 and the light diffusion surface 44, and travels in the light guide plate 3, every time the light is totally reflected at the inclined surface 41 with the inclination angle of 6 degrees, the angle of the light in the traveling direction with respect to the X-axial direction approaches the critical angle. When the angle becomes smaller than the critical angle, the light is output from the light output surface 43 or the flat side of the light diffusion surface 44. As a result, the light emitted from the light guide plate 3 has a strong directivity in the direction inclined by 60 degrees from the Z-axial direction in the XZ plane.

The light output from the light guide plate 3 and inclined by 62.4 degrees with respect to the Z-axial direction is input to the conical sheet 6. Because the apex angle of the cone 64 is 70 degrees, the angle of the light input to the cone 64 is 7.4 degrees and the angle between the traveling direction of the rays of light entered the cone 64 and the normal line of the light input surface of the cone 64 becomes 4.9 degrees. Thereafter, the light reaches the opposite side surface of the cone 64. Because the angle to this side surface from the normal line thereto is 65.1 degrees, the light is totally reflected, and thus travels in the direction of 11.1 degrees from the Z-axial direction. Thereafter, the light is output from the conical sheet 6 at angle of 16.8 degrees from the Z-axial direction by the Snell's law. That is, the light output from the conical sheet 6 has a strong directivity in the direction of 16.8 degrees from the Z-axial direction in the XZ plane.

The behavior of light at the cross section along line B-B shown in FIG. 6 will be discussed next. Because the light from the narrow-view light source 51 is diffused at least in the XY plane as mentioned above, quite the same theory as applied to the cross section along line A-A is satisfied for the cross section along line B-B. As a result, the light output from the conical sheet 6 has a strong directivity, and its angle from the Z-axial direction becomes 16.8 degrees. The result is true of not only along line B-B but also for other angles in the XZ plane, so that the light output from the conical sheet 6 has a strong directivity in the direction of 16.8 degrees from the Z-axial direction. That is, the illumination range of the light source apparatus 1 is limited to a narrow angular range.

Figure 7:
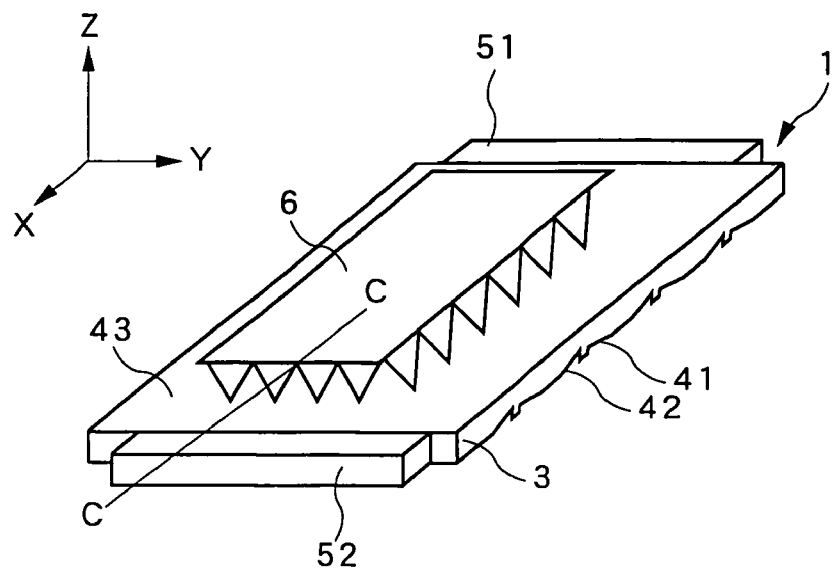
Figure 8:
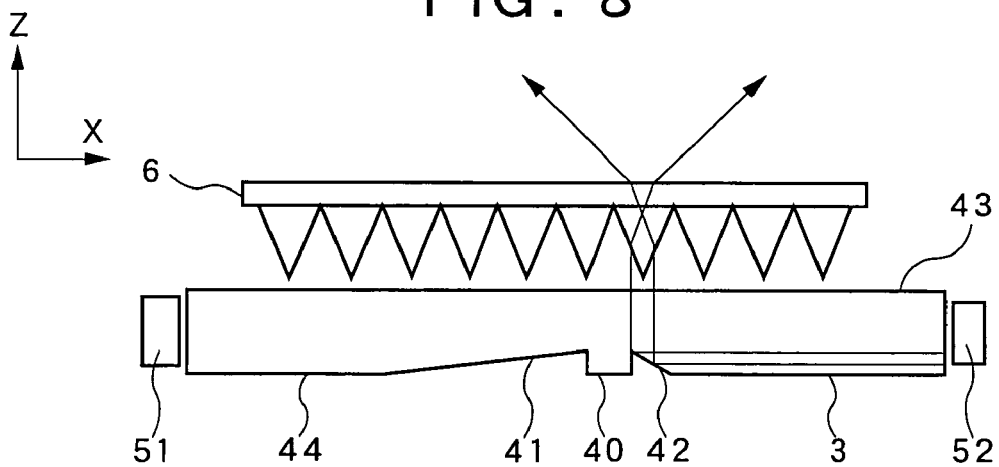
FIG. 8 is a diagram of the optical model at the cross section along line C-C shown in FIG. 7.

Next, the operation of widening the range of irradiation of the light source apparatus 1 will be described. FIG. 7 is a perspective view of an optical model illustrating a case where the wide-view light source 52 is turned on, FIG. 8 is a diagram of the optical model at the cross section along line C-C shown in FIG. 7. The line C-C extends in the X-axial direction. FIG. 8 shows the flat surface 40, the inclined surface 41 and the inclined surface 42 only at one location for the sake of illustrative simplicity.

As shown in FIG. 8, at the cross section along line C-C in FIG. 7, the light emitted from the wide-view light source 52 enters the light guide plate 3 and propagates therein. This is the same as the case where the narrow-view light source 51 is turned on. The difference when the wide-view light source 52 is turned on lies in the large inclination angle of 45 degrees of the inclined surface 42 which is illuminated by the light source 52. To explain the effect of the inclined surface 42 with the inclination angle of 45 degrees, let us first consider the light that propagates in the light guide plate 3 in the −X direction and enters the inclined surface 42. The incident angle of the light to the inclined surface 42 is 45 degrees, larger than the critical angle of 41.8 degrees, so that the light input to the inclined surface 42 does not go out of the light guide plate 3 and is totally reflected. The propagation direction after total reflection is in the Z-axial direction.

Accordingly, the light is output from the light output surface 43 of the light guide plate 3 in parallel to the Z-axial direction, and is input to the conical sheet 6. Because the apex angle of the cone 64 is 70 degrees, the incident angle of the light to be input to the cone 64 is 55 degrees and the angle of the light from the normal line to the light input surface of the cone 64 after it is input to the cone 64 is 33 degrees. As the angle is smaller than the inclination angle of 35 degrees of the opposite side surface of the cone 64, the light does not reach the opposite side surface of the cone 64, enters the flat plate portion 63, goes out from the front side of the conical sheet 6, and travels in the direction inclined by 34 degrees from the Z-axial direction. As shown in FIG. 8, at the time the light is input to the conical sheet 6, the light input to the opposite side surface of the cone 64 travels in the direction f −34 degrees. As the cone 64 has a two-dimensional shape whose cross section in the XY plane is a circle, the light to be output from the conical sheet 6 goes out concentrically in the direction inclined by 34 degrees from the +Z direction. Apparently, the light that has propagated in the light guide plate 3 is diffused concentrically from the conical sheet 6 at a large angle. The same theory is applied to the light which propagates in the direction of 90 degrees to the normal line within the in the XY plane as well as the light which propagates in the X-axial direction.

Figure 9:
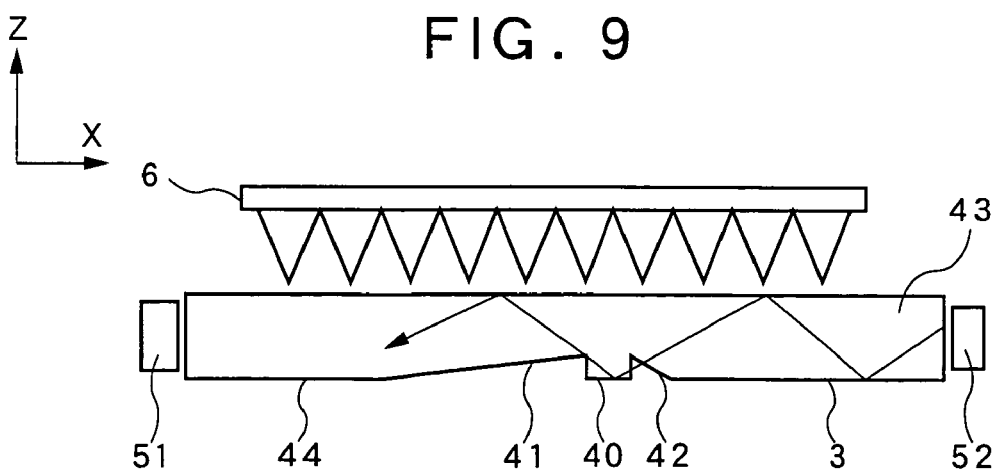
FIG. 9 is an optical model diagram illustrating the behavior of light traveling in a light guide plate.
Figure 10:
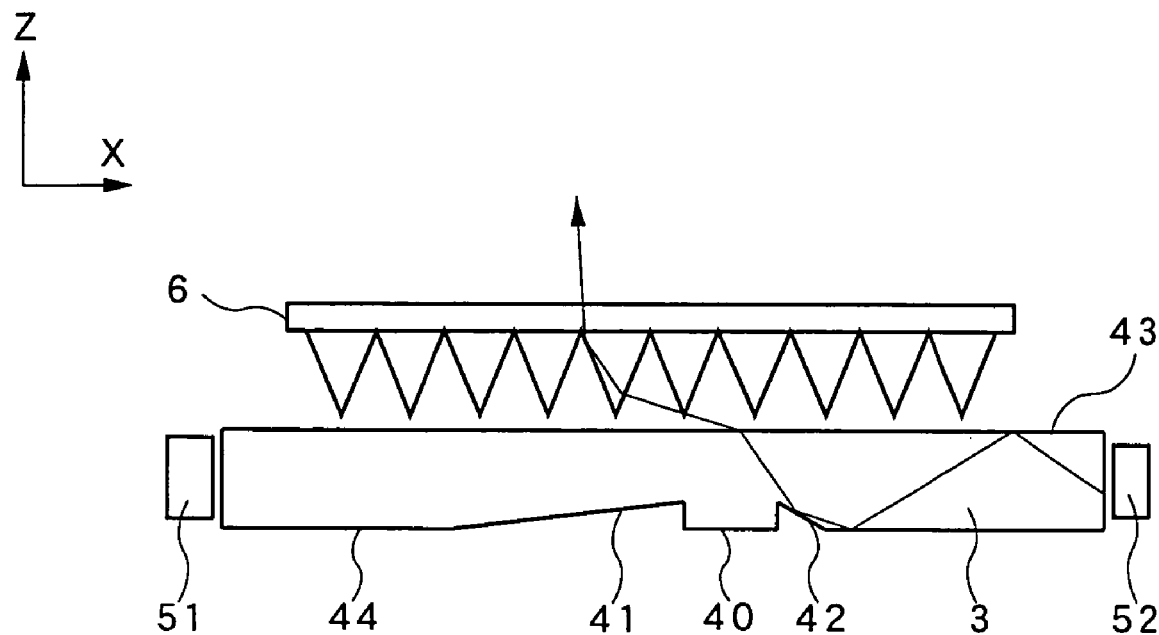
FIG. 10 is an optical model diagram illustrating the behavior of light traveling in the light guide plate.

FIGS. 9 and 10 are cross-section views illustrating a case where the light propagating in the light guide plate 3 at the critical angle has reached the inclined surface 42. FIGS. 9 and 10 show the flat surface 40, the inclined surface 41 and the inclined surface 42 only at one location for the sake of illustrative simplicity. since the critical angle of the light guide plate 3 is 41.8 degrees as mentioned above, the light is input to the inclined surface 42 at an inclination angle of 3.2 degrees from the direction of the normal line to the inclined surface 42. As the angle is smaller than the critical angle, the light goes out of the light guide plate 3, but mostly re-enters the light guide plate 3 from the adjoining perpendicular surface, i.e., the boundary between the inclined surface 42 and the flat surface 40. The angle of the light input to the perpendicular surface is inclined by 40.2 degrees from the direction of the normal line, so that the angle of the light after being input to the perpendicular surface becomes 25.5 degrees. Therefore, the incident angle when the light reaches the flat surface 40 becomes 64.5 degrees, the light is totally reflected to propagate in the light guide plate 3. Apparently, the light whose incident angle when reaching the inclined surface 42 is smaller than the critical angle goes out of the light guide plate 3 temporarily, and re-enters the light guide plate 3 and propagates therein at a larger angle.

As shown in FIG. 10, when the light whose angle from the Z-axial direction becomes 55.6 degrees reaches the inclined surface after being totally reflected at the light diffusion surface 44 of the light guide plate 3 during the process, the light is input to the light output surface 43 at an angle of 34.4 degrees from the direction of the normal line, and leaves the light guide plate 3 at an angle of 57.8 degrees from the Z-axis direction. The light output from the from the light guide plate 3 is input to the conical sheet 6. Because the apex angle of the cone 64 is 70 degrees, the angle of the light input to the cone 64 is 22.8 degrees and the angle of the light after being input to the cone 64 from the normal line to the light input surface of the cone 64 becomes 75 degrees. Thereafter, the light is input to the opposite side surface of the cone 64, but because of the angle to this side surface from the normal line thereto being 55 degrees, the light is totally reflected, transmitting the flat plate portion 63, and is output from the conical sheet 6.

That is, the light having been emitted from the wide-view light source 52 and having propagated in the light guide plate 3 travels in various angular directions by the inclined surface 42 with the inclination angle of 45 degrees, and is scattered by the conical sheet 6, thus ensuring irradiation of a wide angular range.

As mentioned above, the light emitted from the narrow-view light source 51 is reflected at the inclined surface 41 while propagating, totally reflected, in the light guide plate 3, changing the angle, and is output with a directivity in the first direction. The first direction is, for example, a direction inclined by 60 degrees or so in the −X direction with respect to the +Z direction. The light emitted from the wide-view light source 52 is reflected at the inclined surface 42 while propagating, totally reflected, in the light guide plate 3, changing the angle, and is output with a directivity in the second direction. The second direction is, for example, a direction inclined by 20 degrees or so in the +X direction with respect to the +Z direction. On the conical sheet 6, the light incident in the first direction is made homogeneous in the XY plane and is converged, and is output in a relatively narrow angular range nearly about the +Z direction. The light incident in the second direction is made homogeneous in the in the XY plane and is diffused, and is output in a relatively wide angular range nearly about the +Z direction.

It is therefore possible to realize a light source apparatus capable of changing the angular range of the illuminated light by switching the light sources, provided at two facing sides of the light guide plate where two inclined surfaces with different inclination angles are formed, from one to the other and turning on the selected light source. As the light output from the conical sheet 6 of the light source apparatus 1 in the +Z direction transmits the transparent liquid crystal panel 7, an image is added to the light. This can allow the image to be displayed on the display apparatus 2 of the cellular phone 9. If the narrow-view light source 51 is turned on at this time, the angular range where the image is visible can be narrowed so that only the user of the cellular phone 9 can view the image, preventing nearly people from peeking. If the wide-view light source 52 is turned, on the other hand, the angular range where the image is visible can be widened so that plural viewers/listeners can view the image at a time.

Figure 11:
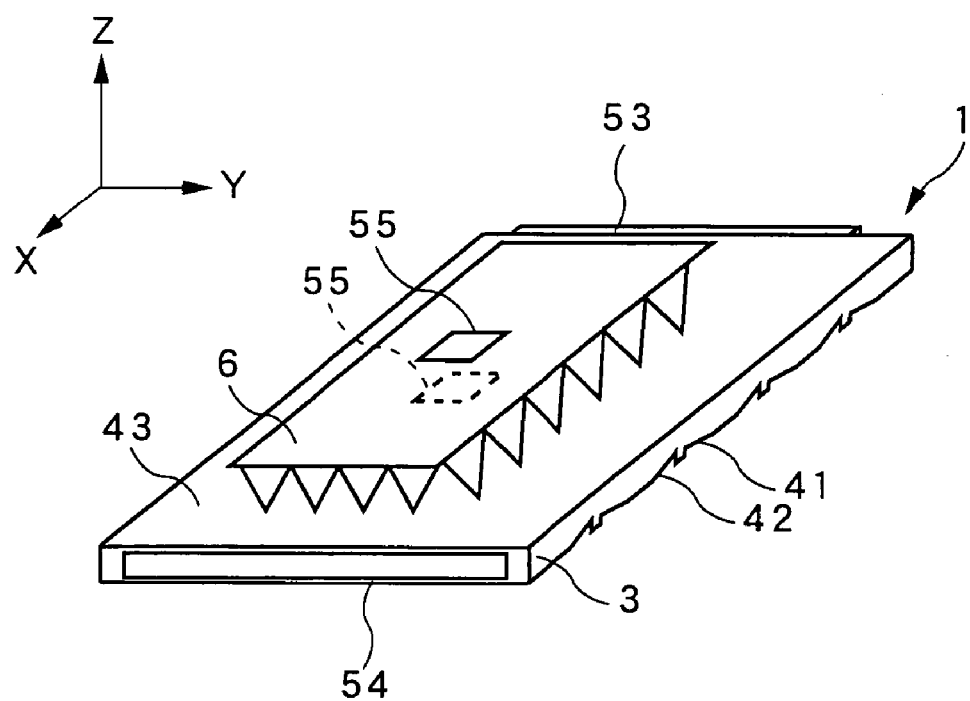
FIG. 11 is an optical model diagram for doing computer simulation according to the first embodiment of the invention.

To check the adequacy of the design, computer simulation was conducted using a commercially available ray tracing simulator. FIG. 11 is a diagram showing an optical model which was used in the simulation. As shown in FIG. 11, the length of the light guide plate 3 in the X-axial direction, the width in the Y-axial direction, and the height in the Z-axial direction were respectively set to 60 mm, 40 mm, and 0.6 mm, and a light emitting surface 53 was laid out as the narrow-view light source on the YZ plane of the light guide plate 3 on the −X-directional side in such a way that the input direction becomes the +X direction. A light emitting surface 54 was laid out as the wide-view light source on the YZ plane of the light guide plate 3 on the +X-directional side in such a way that the input direction becomes the −X direction. The widths of the light emitting surfaces 53 and 54 in the Y-axial direction were set to 40 mm, and the height in the Z-axial direction was set to 0.5 mm. The light emitting surface emits Lambert light.

The two inclined surfaces 41 and 42 with different inclination angles are formed on the in the XY plane of the light guide plate 3 on the -Z-directional side. The inclined surface 41 with a smaller inclination angle has the inclination angle of 6 degrees toward the +Z direction from the +X direction, and is continuously laid out in the Y-axial direction. Likewise, the inclined surface 42 with a larger inclination angle has the inclination angle of 45 degrees toward the +Z direction from the −X direction, and is continuously laid out in the Y-axial direction. The maximum depth of each of the inclined surfaces 41 and 42 in the Z-axial direction was set to 10 μm, and the pitch in the X-axial direction was set to 0.2 mm.

The downward conical sheet 6 with multiple cones whose vertexes faced in the −Z direction was provided on the +Z-directional side as seen from the light guide plate 3. The cones were laid out in such a way that the vertexes of the cones formed a right triangle as seen from the −Z direction, with one side being in parallel to the Y-axial direction. The pitch of the vertexes of the cones in the Y-axial direction was set to 50 μm, so that one side of the right triangle formed by the vertexes of the cones was set to 50 μm. The apex angle of the cones was set to 70 degrees, and the height to 36 μm. The thickness of the conical sheet 6 including the cone portions was set to 0.1 mm, and a light receiving surface 55 having a length of 10 mm in the X-axial direction and a width of 10 mm in the Y-axial direction was provided on the +Z-directional side of the conical sheet 6. To observe the light intensity distribution of the light output from the light guide plate 3, the light receiving surface 55 of the same size was provided between the light guide plate 3 and the conical sheet 6. The material for the light guide plate 3 and the conical sheet 6 was polymethyl-methacrylate having a refractive index of 1.5.

Figure 12:
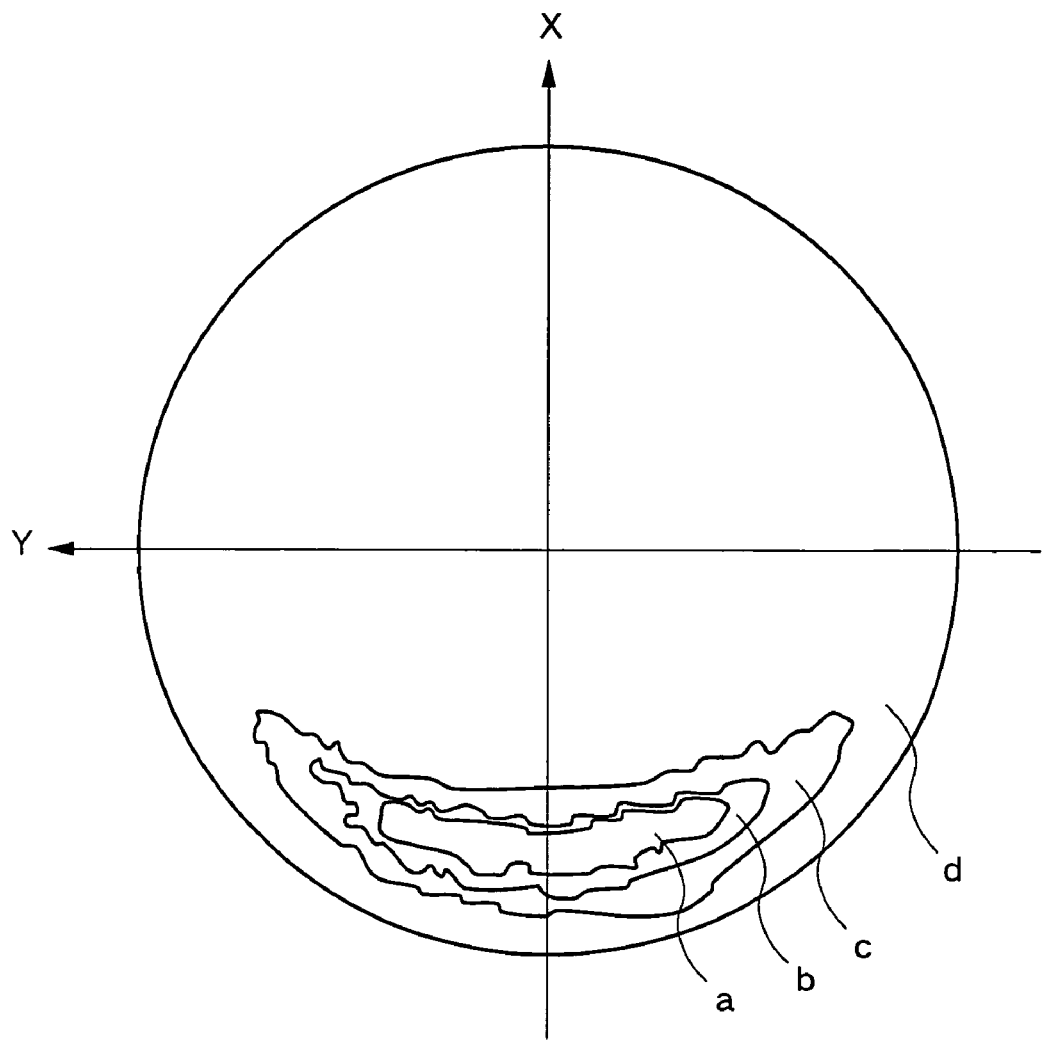
FIG. 12 is a diagram illustrating the results of simulation when the narrow-view light source is turned on according to the first embodiment of the invention,ÿand illustrating a light intensity distribution particularly when light is output from the light guide plate.
Figure 13:
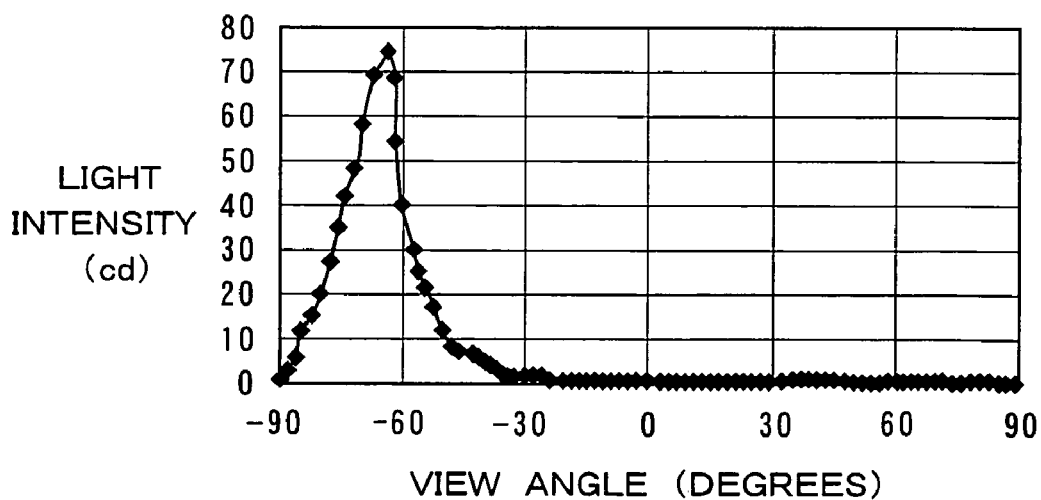
FIG. 13 is a graph illustrating the results of simulation when the narrow-view light source is turned on according to the first embodiment of the invention,ÿand illustrating the light intensity distribution in the X-axial direction particularly when light is output from the light guide plate.
Figure 14:
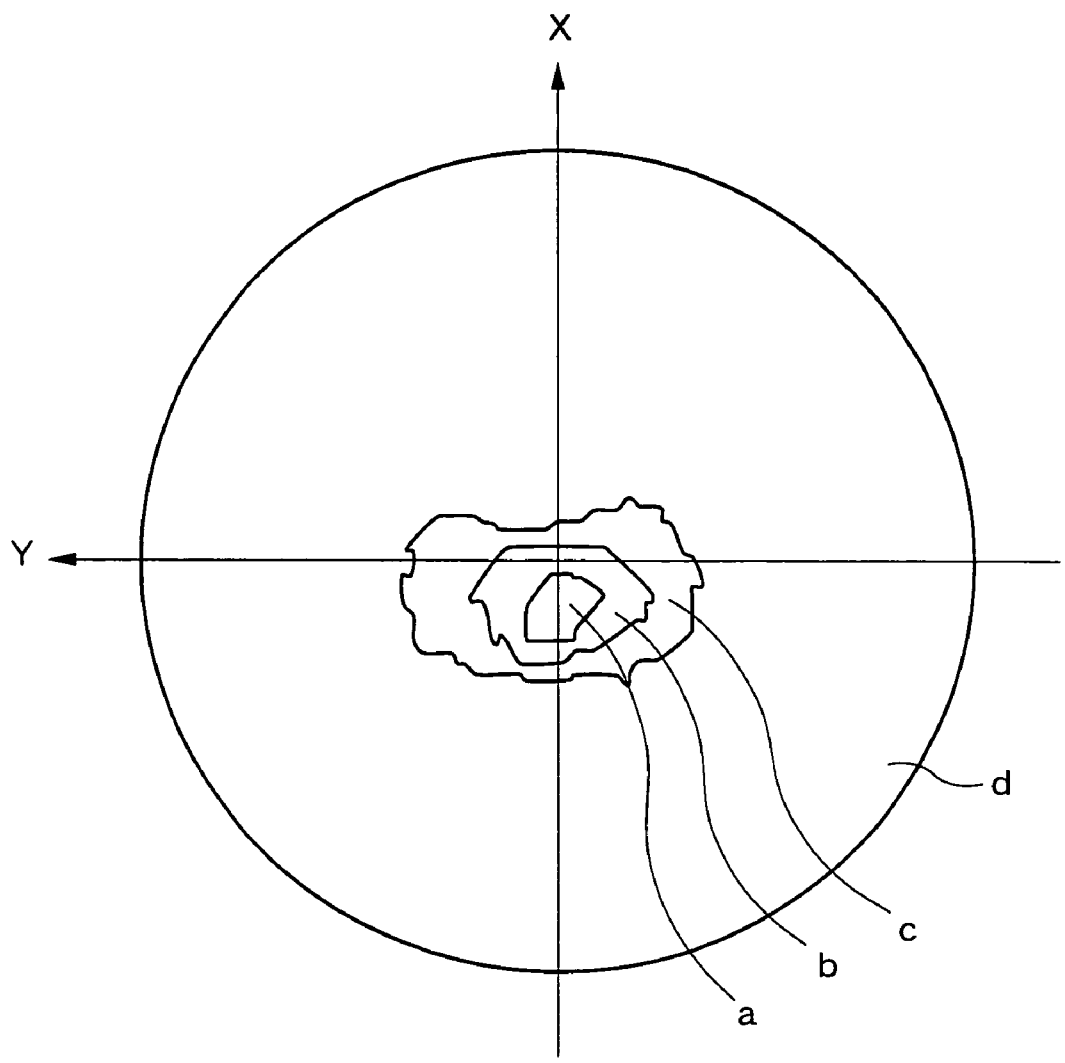
FIG. 14 is a diagram illustrating the results of simulation when the narrow-view light source is turned on according to the first embodiment of the invention,ÿand illustrating a light intensity distribution particularly when light is output from a conical sheet.
Figure 15:
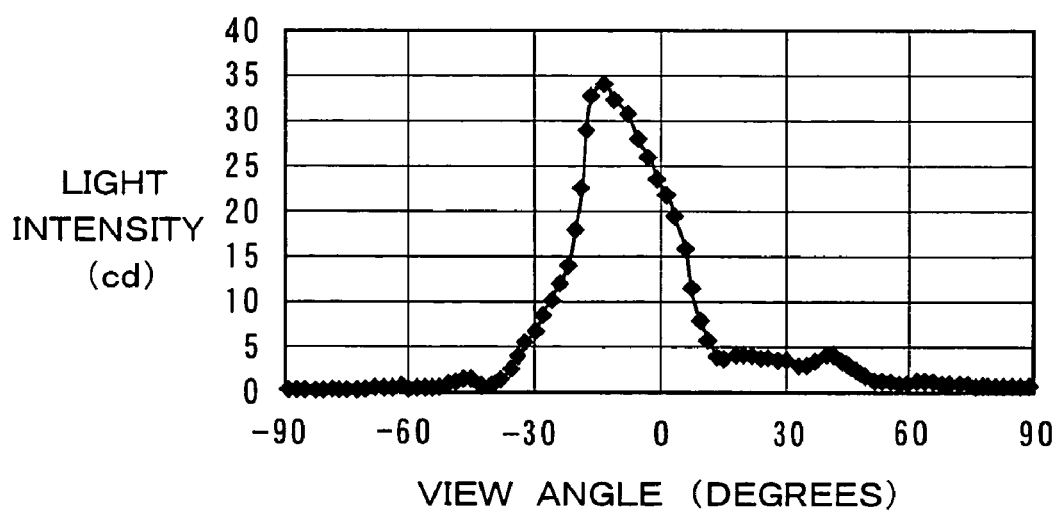
FIG. 15 is a graph illustrating the results of simulation when the narrow-view light source is turned on according to the first embodiment of the invention,ÿand illustrating the light intensity distribution in the X-axial direction particularly when light is output from the conical sheet.
Figure 16:
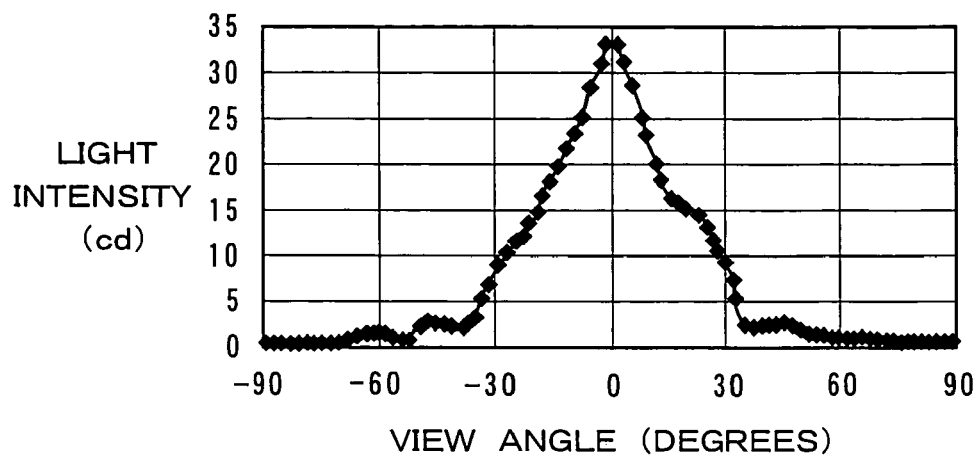
FIG. 16 is a graph illustrating the results of simulation when the narrow-view light source is turned on according to the first embodiment of the invention,ÿand illustrating the light intensity distribution in the Y-axial direction particularly when light is output from the conical sheet.

First, the light intensity distribution when the narrow-view light source is turned on will be explained. FIG. 12 is a polar coordinate diagram illustrating the light intensity distribution when the narrow-view light source is turned on, and shows the X direction and the Y direction. FIG. 13 is a graph illustrating the light intensity distribution in the X-axial direction in the light intensity distribution shown in FIG. 12, with the horizontal axis representing the view angle in the X-axial direction and the vertical axis representing the light intensity. FIG. 14 is a polar coordinate diagram illustrating the intensity distribution of the light output from the conical sheet when the narrow-view light source is turned on, and shows the X direction and the Y direction. FIG. 15 is a graph illustrating the light intensity distribution in the X-axial direction in the light intensity distribution shown in FIG. 14, with the horizontal axis representing the view angle in the X-axial direction and the vertical axis representing the light intensity. FIG. 16 is a graph illustrating the light intensity distribution in the Y-axial direction in the light intensity distribution shown in FIG. 14, with the horizontal axis representing the view angle in the Y-axial direction and the vertical axis representing the light intensity. In FIGS. 12 and 14, points of the same brightness were connected by solid lines, and areas surrounded by the solid lines were set as areas a, b, c and d in the order of a brighter one to a darker one. That is, the brightest area was the area a, and the darkest area was the area d. The same is true of other polar coordinate diagrams to be discussed.

As shown in FIGS. 12 and 13, the light intensity distribution when the light is output from the light guide plate 3 has a peak in the direction inclined by −65 degrees in the X-axial direction from the Z-axial direction. The inclination angle in the Y-axial direction is relatively homogeneously distributed. As shown in FIGS. 14 to 16, the light is converged within 30 degrees both in the X-axial direction and the Y-axial direction in the light intensity distribution when the light is output from the conical sheet 6. It is understood that when the narrow-view light source is turned on, the illumination range of the light source apparatus is restricted to a narrow angular range.

Figure 17:
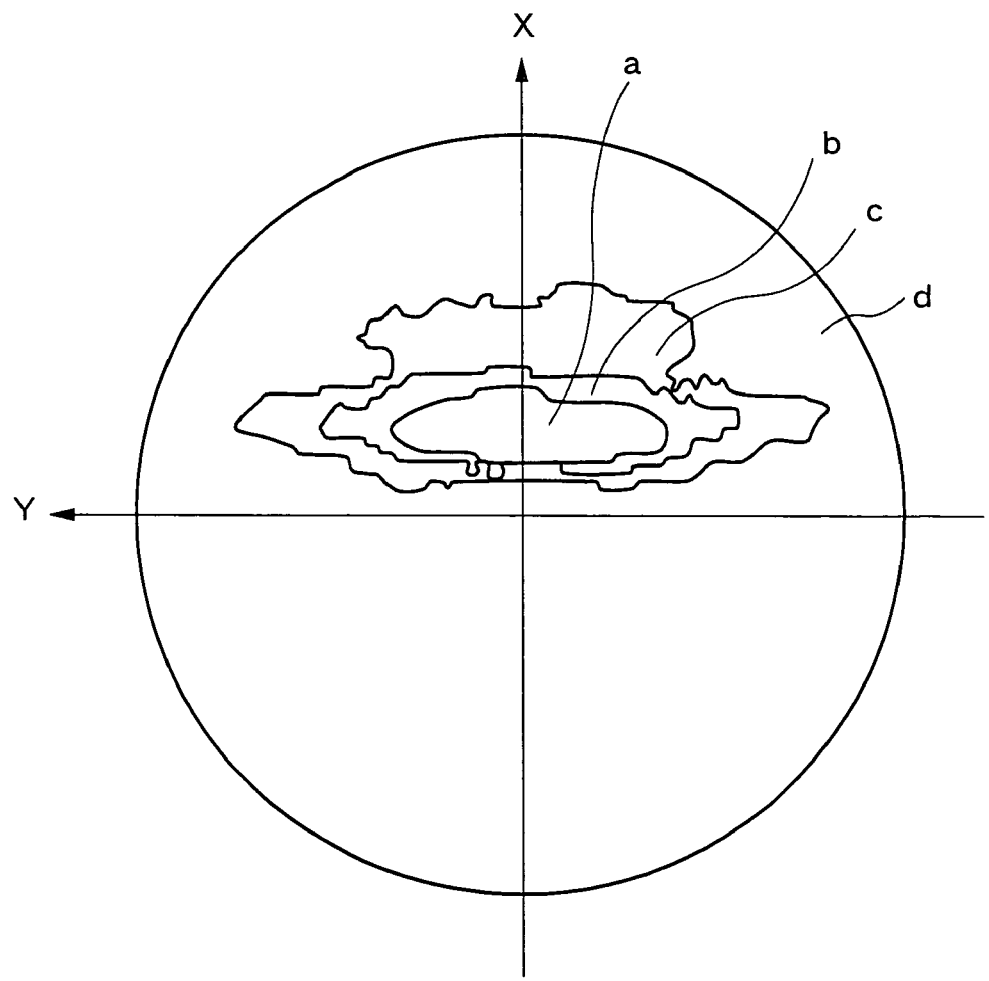
FIG. 17 is a diagram illustrating the results of simulation when the wide-view light source is turned on according to the first embodiment of the invention,ÿand illustrating a light intensity distribution particularly when light is output from the light guide plate.
Figure 18:
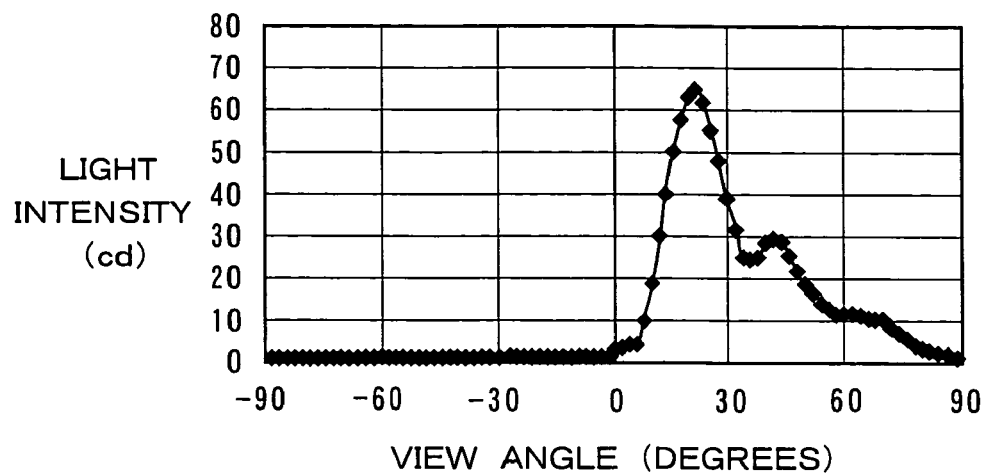
FIG. 18 is a graph illustrating the results of simulation when the wide-view light source is turned on according to the first embodiment of the invention,ÿand illustrating the light intensity distribution in the X-axial direction particularly when light is output from the light guide plate.
Figure 19:
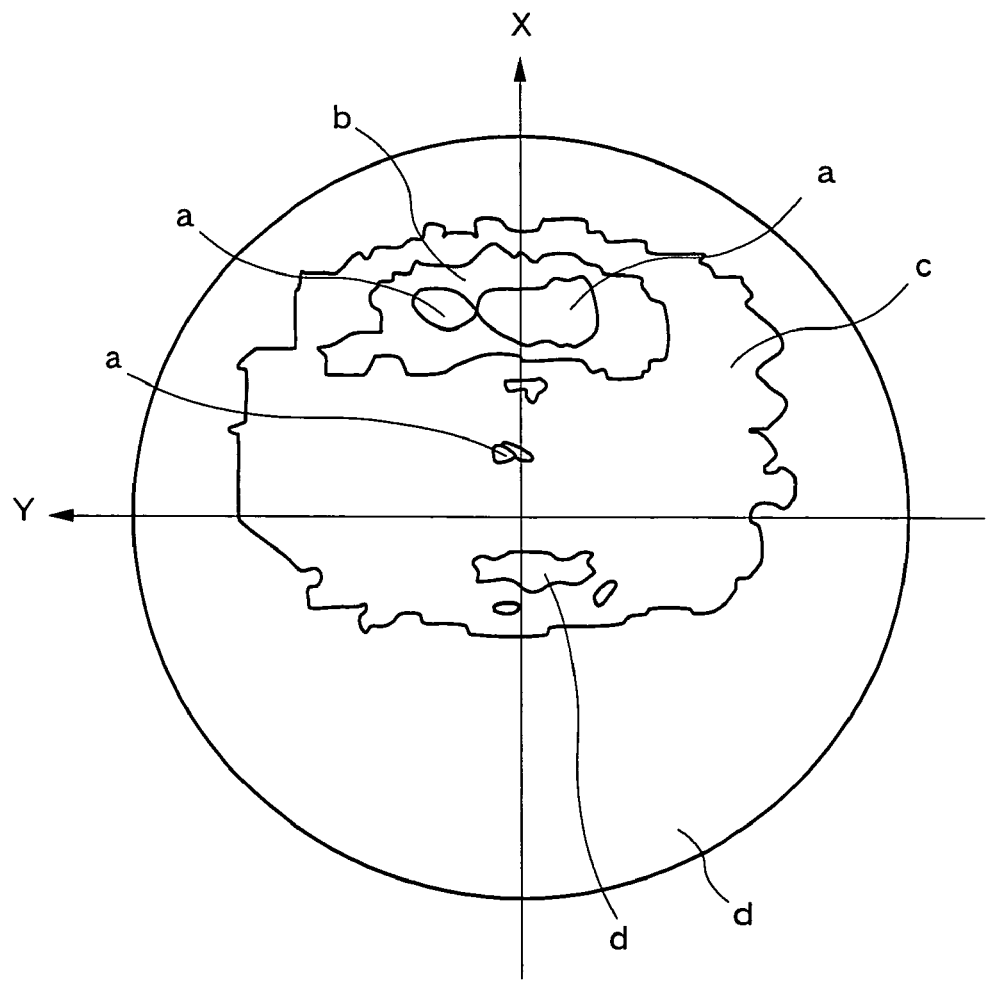
FIG. 19 is a diagram illustrating the results of simulation when the wide-view light source is turned on according to the first embodiment of the invention,ÿand illustrating a light intensity distribution particularly when light is output from the conical sheet.
Figure 20:
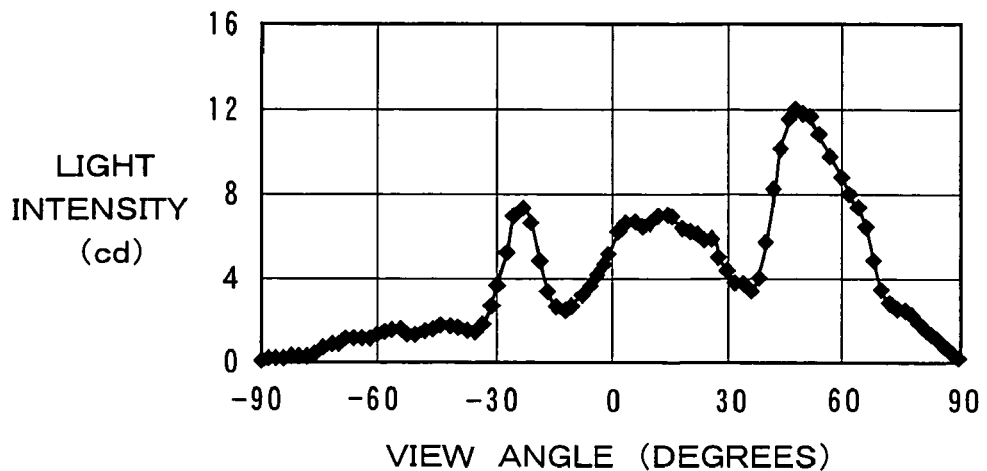
FIG. 20 is a graph illustrating the results of simulation when the wide-view light source is turned on according to the first embodiment of the invention,ÿand illustrating the light intensity distribution in the X-axial direction particularly when light is output from the conical sheet.
Figure 21:
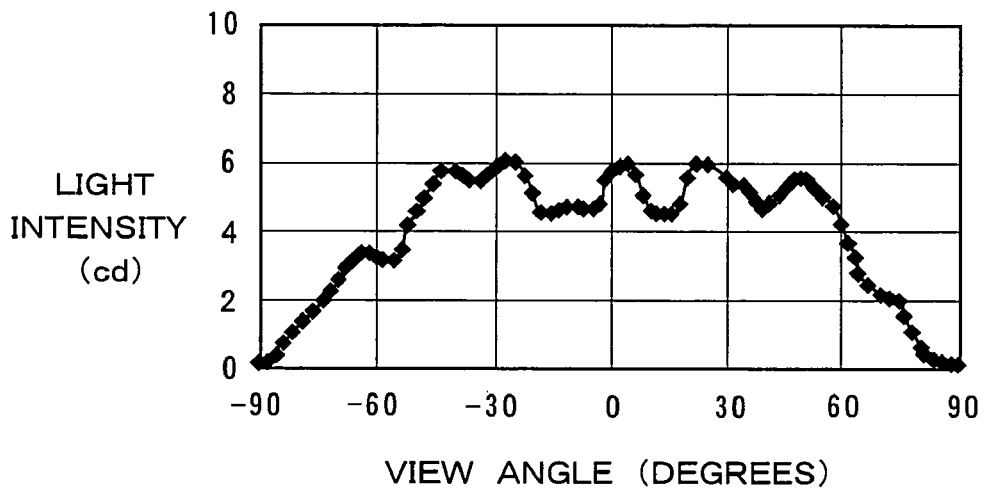
FIG. 21 is a graph illustrating the results of simulation when the wide-view light source is turned on according to the first embodiment of the invention,ÿand illustrating the light intensity distribution in the Y-axial direction particularly when light is output from the conical sheet.

Next, the light intensity distribution when the wide-view light source is turned on will be explained. FIG. 17 is a polar coordinate diagram illustrating the light intensity distribution when the wide-view light source is turned on, and shows the X direction and the Y direction. FIG. 18 is a graph illustrating the light intensity distribution in the X-axial direction in the light intensity distribution shown in FIG. 17, with the horizontal axis representing the view angle in the X-axial direction and the vertical axis representing the light intensity. FIG. 19 is a polar coordinate diagram illustrating the intensity distribution of the light output from the conical sheet when the wide-view light source is turned on, and shows the X direction and the Y direction. FIG. 20 is a graph illustrating the light intensity distribution in the X-axial direction in the light intensity distribution shown in FIG. 19, with the horizontal axis representing the view angle in the X-axial direction and the vertical axis representing the light intensity. FIG. 21 is a graph illustrating the light intensity distribution in the Y-axial direction in the light intensity distribution shown in FIG. 19, with the horizontal axis representing the view angle in the Y-axial direction and the vertical axis representing the light intensity.

As shown in FIGS. 17 and 18, the light intensity distribution when the light is output from the light guide plate 3 has a peak in the direction inclined by +20 degrees in the X-axial direction from the Z-axial direction. It is to be noted that the peak is broader than the peak of +65 degrees when the narrow-view light source shown in FIG. 12 is turned on. The inclination angle in the Y-axial direction is widely distributed over the range of 0 degree to 90 degrees. As shown in FIGS. 19 to 21, the light intensity when the light is output from the conical sheet 6 is distributed over a wide range both in the X-axial direction and the Y-axial direction. It is understood that when the wide-view light source is turned on, the illumination range of the light source apparatus is distributed over a wide angular range.

Apparently, it is confirmed through the computer simulation that a light source apparatus capable of changing the angular range of the illuminated light can be realized by switching the activation of the light sources, provided at two facing sides of the light guide plate having two inclined surfaces with different inclination angles, from one to the other.

The light source apparatus according to the invention can change the angular range of the illuminated light merely by switching the activation of the light sources. Because the light source apparatus has only the light guide plate and the conical sheet in the thicknesswise direction and the light converging action and the light diffusion action of the conical sheet are switched from one to the other according to the incident angle distribution of the light from the light guide plate, it is unnecessary to provide a special member for switching between light convergence and light diffusion particularly in the thicknesswise direction. The light source apparatus can be designed thinner than the conventional switching apparatus.

When the narrow-view light source is turned on, the illumination range of the light source apparatus is restricted to a narrow angular range as described above. Accordingly, the view angle of the display apparatus falls in a narrow angular range, thus achieving narrow view angle display. When the wide-view light source is turned on, the illumination range of the light source apparatus is distributed over a wide angular range. Accordingly, the view angle of the display apparatus falls in a wide angular range, thus achieving wide view angle display. The display apparatus according to the invention can therefore change the view angle merely by switching the activation of the light sources. Because the light source apparatus is thinner than the conventional switching apparatus as mentioned above, the display apparatus can also be made thinner.

The inclination angle of the inclined surface of the light guide plate is not limited to the aforementioned values, but may take different values as long as similar effects are demonstrated. The inclined surface 42 which is illuminated with the light from the wide-view light source may be a curved surface. This can ensure a greater number of scattering directions, and can improve the uniform illumination range. The material for the light guide plate is not limited to the aforementioned material. Further, the depths and the pitches of the two inclined surfaces are not limited to the aforementioned values, but may take different values in the light guide plate, and the inclination angles of the inclined surfaces may have distributions in the light guide plate. The distribution in the light output surface of the light source apparatus can be made homogeneous by increasing the pitch of the inclined surface which is closer to the light source in the light guide plate. Furthermore, the two inclined surfaces may have a coupled shape.

The apex angle, the height, the pitch, the thickness and the like of the conical sheet are not limited to the aforementioned values, but may take different values as long as similar effects are demonstrated. The material for the conical sheet is not limited to the aforementioned material. Although the vertexes of the cone are laid out to form a right triangle, the shape is not restrictive but may take other shapes than the right triangle, or one side of the triangle may not be completely in parallel to the Y-axial direction. To prevent a moire between the light source apparatus and the liquid crystal panel, the conical sheet may be arranged at an angle with respect to the Y-axial direction. It is preferable that the positions of the vertexes of the cone be such that with regard to the Y-axial direction, the phase in the X-axial direction is not homogeneous. Accordingly, the light output from the light guide plate when the narrow-view light source is turned on can be converged in the Z-axial direction efficiently, as compared with the case where with regard to the Y-axial direction, the phase in the X-axial direction is homogeneous. Further, a diffusion pattern may be provided on that side of the conical sheet which is opposite to the side where the cones are formed. This can prevent a moire between the light source apparatus and the liquid crystal panel. The cone may have such a shape that the length in the Z-axial direction is longer than the length in the Y-axial direction. This can reduce the convergence in the X-axial direction when the narrow-view light source is turned on, and provide the view-angle switching effect only in the right and left direction of the screen.

Figure 22:
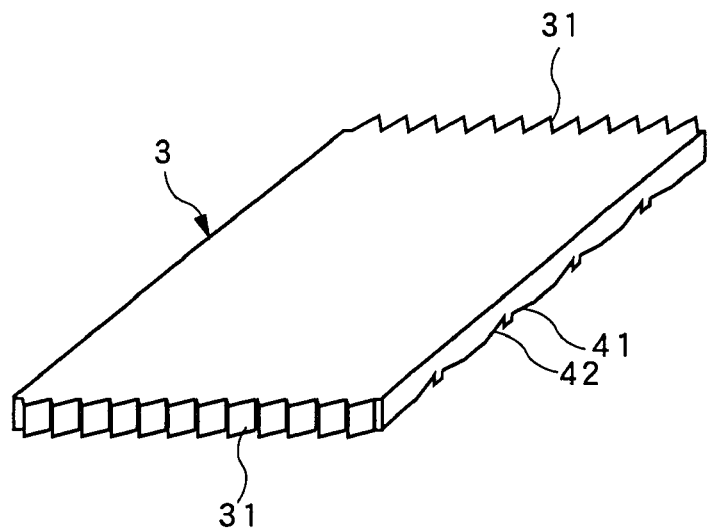
FIG. 22 is a perspective view showing a case where a diffusion pattern is provided on the light input surface of the light guide plate.
Figure 23:
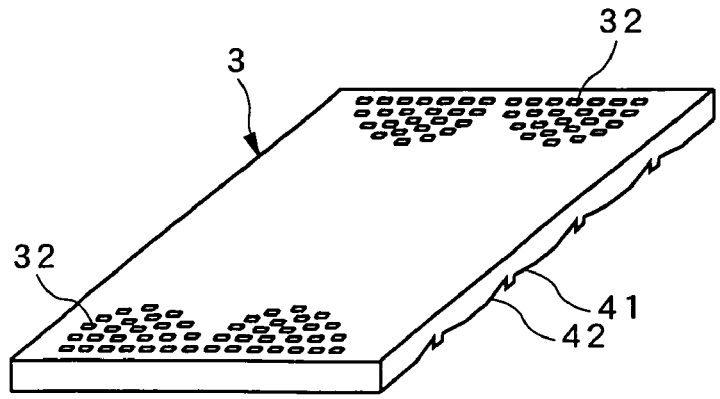
FIG. 23 is a perspective view showing a case where a two-dimensional pattern is provided on that side of the light guide plate which is perpendicular to the Z-axial direction.

A line light source, such as a cathode ray tube, may be used, or a point light source, such as an LED (Light Emitting Diode), may be used as the light source. When the LED is used, particularly, it is possible to make the light source thinner. To uniformly turn a point light source to a line light source, however, it is effective to provide a diffusion pattern 31 on the light input surface of the light guide plate as shown in FIG. 22. A two-dimensional pattern 32 may be formed on that side of the light guide plate which is perpendicular to the Z direction as shown in FIG. 23. The two-dimensional pattern 32 comprises, for example, a plurality of recesses distributed in a semicircular area. It is particularly effective to provide the two-dimensional pattern 32 near the light source to make the light from the light source homogeneous. A plurality of LEDs may be laid out on the light input surface of the light guide plate. In this case, because the light from the light source is converged and output in a narrow angular range particularly when the narrow-view light source is turned on, it is possible to reduce the amount of light from the light source more than when the wide-view light source is turned on. That is, the number of the LEDs of the narrow-view light source can be made smaller than the number of the LEDs of the wide-view light source, leading to cost reduction. As power consumption is made less in narrow view mode than in wide view mode, low power consumption can be ensured. Although the foregoing description has been given of the case where the narrow-view light source is turned off when the wide-view light source is turned on, the narrow-view light source should not necessarily be turned off but may be turned on as well. Further, an adjusting section which mutually independently adjusts the amounts of lights of the wide-view light source and the narrow-view light source may be provided, or the ratio of emissions of both light sources may be changed when the light sources are in use.

When the wide-view light source comprises a point light source, such as an LED, the other area of the light input surface of the light guide plate on the wide-view light source side than the area facing the LED may be colored. While the color is not particularly limited as long as it can reduce light reflection in that area, an achromatic color, particularly, black can be used suitably. Accordingly, it is possible to suppress reflection of the light emitted from the narrow-view light source at the light input surface of the light guide plate on the wide-view light source side when the narrow-view light source is turned on. As such reflection works similarly to the case where the wide-view light source is turned on even though the wide-view light source is off, the reflection is a factor to reduce the directivity in narrow view mode. Therefore, the directivity in narrow view mode can be further improved by reducing reflection at the light input surface on the wide-view light source side.

A display panel which is used in combination with the light source apparatus of the invention is not limited to a transmission display panel, but any display panel which uses the light source apparatus can be used. Particularly, a liquid crystal panel which has a low view angle dependency can be used suitably. The examples of the modes of such a liquid crystal panel include an IPS (In-Plane Switching) mode, FFS (Fringe Field Switching) mode, and AFFS (Advanced Fringe Field Switching) mode for the horizontal field mode. For the vertically aligned mode, there are an MVA (Multidomain Vertical Alignment) mode which is multidomained to reduce the view angle dependency, PVA (Patterned Vertical Alignment) mode, and ASV (Advanced Super V) mode. Further, a liquid crystal display panel of a film-compensated TN mode can be suitably used. The liquid crystal panel is not limited to the transmission type, but any type of liquid crystal panel can be used as long as each pixel has a transmission area. A semi-transmission type liquid crystal panel, a visible everywhere transflective type liquid crystal panel, and a fine reflective liquid crystal panel each of which has a reflection area in a part of each pixel can be used.

The light source apparatus according to the embodiment can be suitably adapted to a portable terminal device, such as a cellular phone, to enable switching of the view angle of a display apparatus to be mounted in a portable terminal device. When the light source apparatus according to the embodiment is mounted in a cellular phone, particularly, two light sources can be laid out above and under the display screen by setting the horizontal direction and the vertical direction of the cellular phone to the Y-axial direction and the X-axial direction of the light source apparatus respectively. In general, while the horizontal width of the cellular phone is restrictive for the handy size, there is a tendency of reducing the non-display area in the horizontal width of the cellular phone for it is preferable to increase the horizontal width of the display area to display text information. The use of the light source apparatus of the embodiment eliminates the need for mounting light sources to the right and left of the display screen, and is therefore more suitable. The light source apparatus of the embodiment can be adapted to various portable terminal devices, such as a PDA (Personal Digital Assistant), a game machine, a digital camera, a digital video camera, and a notebook type personal computer, besides the cellular phone. The light source apparatus of the embodiment can be adapted to not only portable terminal devices, but also various fixed type terminal devices, such as a cash dispenser and an automatic vending machine.

The portable terminal device in which the light source apparatus of the embodiment is mounted may comprise an adjusting section which mutually independently adjusts the amounts of lights of the wide-view light source and the narrow-view light source, or the adjusting section may set the ratio of emissions of both light sources. Accordingly, the user can set the optimal view angle according to the use environment. The portable terminal device may comprise a detector which detects the amount of remaining battery power, and a control section which controls the amounts of lights of the light sources 51 and 52 according to the detected remaining battery power, or switches the ON/OFF states of the light sources 51 and 52 to automatically change the view angle.

Figure 24:
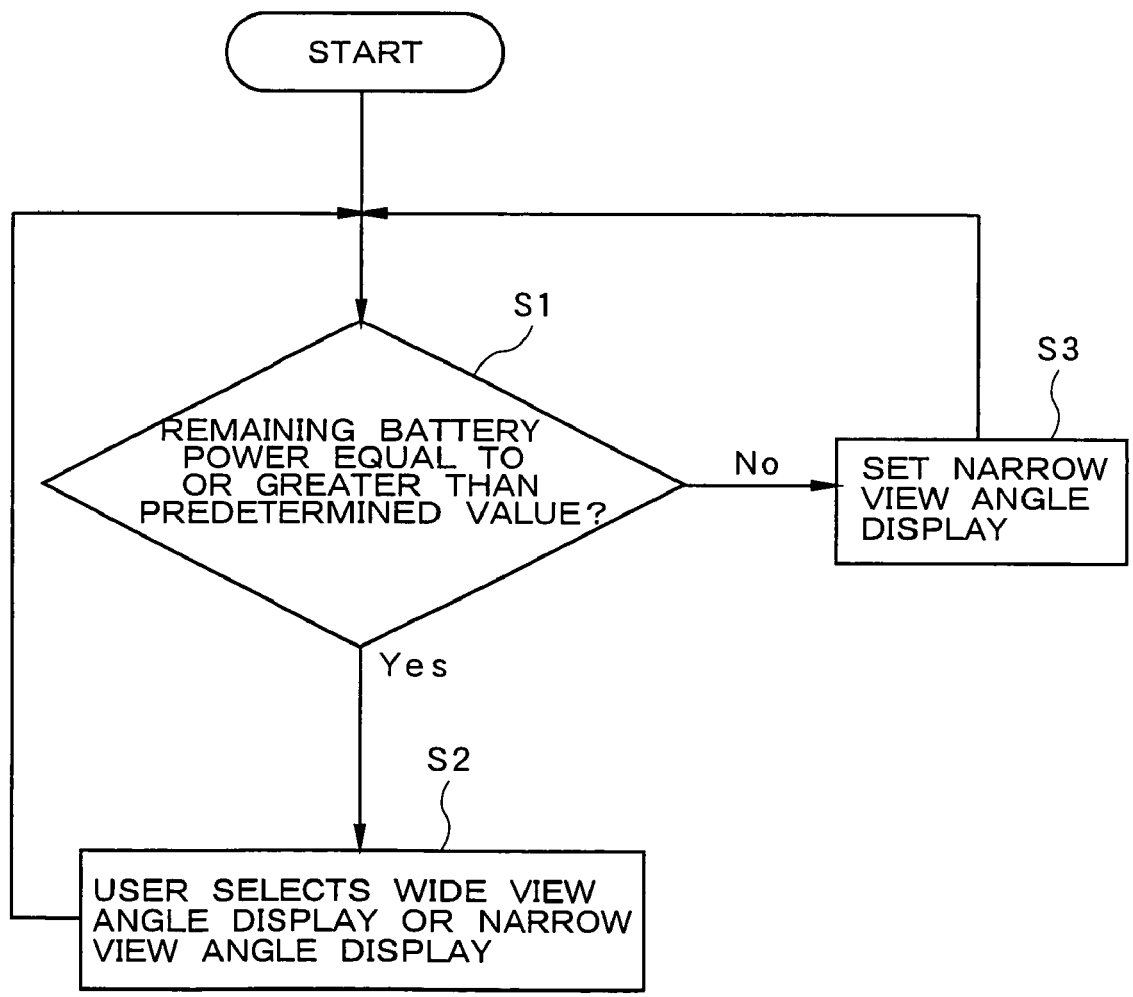
FIG. 24 is a flowchart illustrating the operation of a portable terminal device according to a first modification of the first embodiment.

A first modification of the embodiment will be described below. A portable terminal device according to the first modification has a remaining battery power detector (not shown) which detects the remaining power in the battery, so that the display mode is automatically switched to the narrow view mode when the remaining battery power is less than a predetermined value. The operation of the portable terminal device will be explained below. FIG. 24 is a flowchart illustrating the operation of the portable terminal device according to the first modification.

In the initial state, the portable terminal device has been powered off by the user (observer). When the portable terminal device is powered on as shown at step S1 in FIG. 24, the remaining battery power detector detects the remaining battery power and determines whether the remaining battery power is equal to or greater than a predetermined amount, or is less than the predetermined amount. When the remaining battery power is equal to or greater than the predetermined amount, the view-angle control section comes to a mode of allowing the user to select between wide view angle display and narrow view angle display as shown at step S2. Accordingly, the user can selectively use the wide view angle display or narrow view angle display, whichever intended, according to the use environment. Then, the flow returns to step S1. When the remaining battery power is less than the predetermined amount, the view-angle control section sets the narrow view angle display to turn on the light source 51 alone as shown at step S3. Then, the flow returns to step S1.

Because the light source apparatus of the embodiment can reduce power in narrow view angle display mode more than in wide view angle display mode, the portable terminal device of the modification can reduce power consumption by automatically changing the display to the narrow view angle display when the remaining battery power becomes short, thereby elongating the activation time of the portable terminal device.

Figure 25:
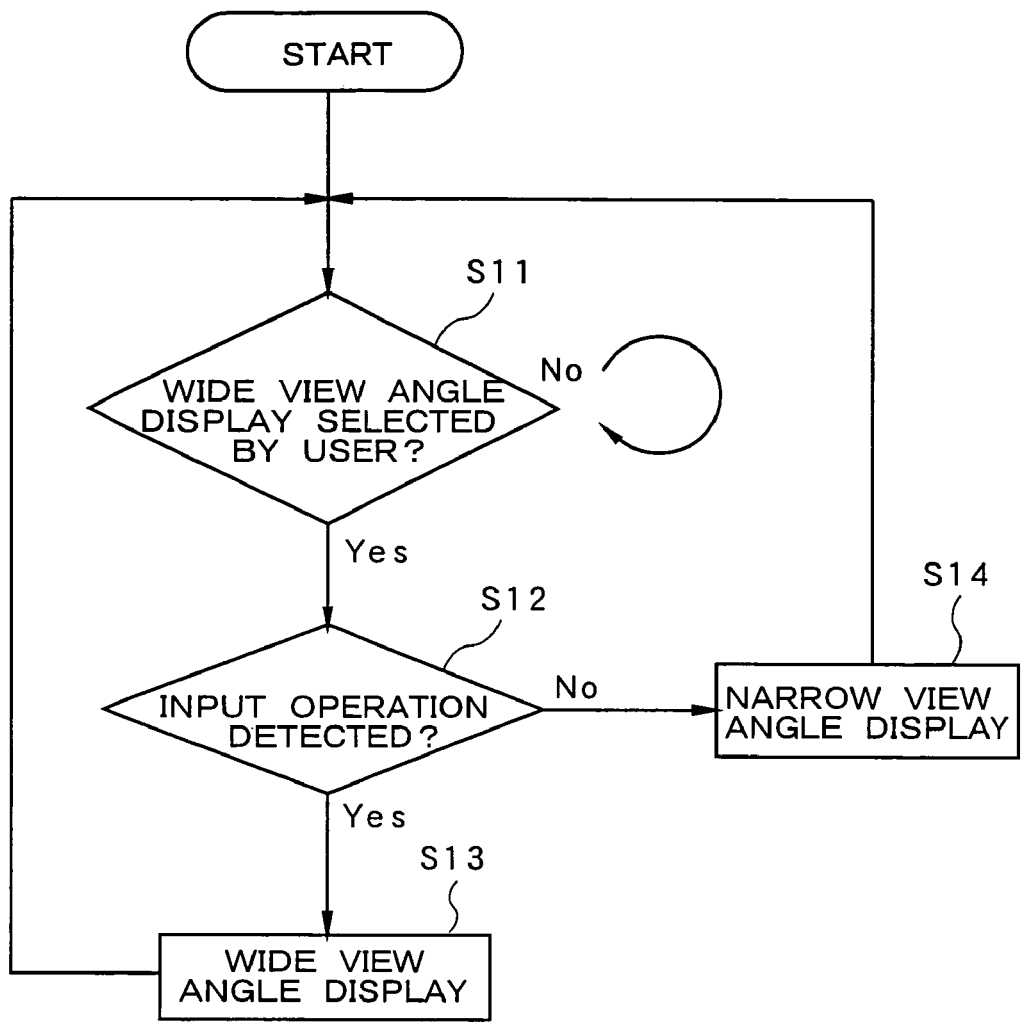
FIG. 25 is a flowchart illustrating the operation of a portable terminal device according to a second modification of the first embodiment.

A second modification of the embodiment will be described next. A portable terminal device according to the second modification comprises an input detector (not shown) which detects an input operation, a timer (not shown) which measures a given time, and a view-angle control section (not shown) which controls the view angle based on the result of detection by the input detector. When no input operation has been detected in a given time measured by the timer in wide view angle display mode, the display is automatically switched to the narrow view angle display. The operation of the portable terminal device will be explained below. FIG. 25 is a flowchart illustrating the operation of the portable terminal device according to the second modification.

In the initial state, the portable terminal device has been powered off by the user (observer). When the portable terminal device is powered on as shown at step S11 in FIG. 25, the portable terminal device detects whether the user has selected the wide view angle display or the narrow view angle display. When the detection result is the narrow view angle display, the flow returns to step S11 to resume the narrow view angle display. When the detection result is the wide view angle display, on the other hand, the flow proceeds to step S12 where the portable terminal device activates the timer. Then, the input detector detects if there is any input operation of the portable terminal device done in the given time measured by the timer. When an input operation is detected in the given time, the view-angle control section sets the wide view angle display mode selected by the user as shown at step S13. That is, the wide view angle display is resumed. Then, the flow returns to step S11. When no input operation is detected in the given time at step S12, the view-angle control section switches the display of the portable terminal device to the narrow view angle display and turns on the light source 51 alone. Then, the flow returns to step S11.

Accordingly, the portable terminal device of the modification, when in an input ready state, automatically switches the display to the narrow view angle display to reduce power consumption thereby elongating the activation time of the portable terminal device. When no input operation is detected, the loop of steps S11, S12 and S14 is repeated, and when the input detector detects an input operation after the display is automatically switched to the narrow view angle display, the display can be automatically returned to the wide view angle display.

Figure 26:
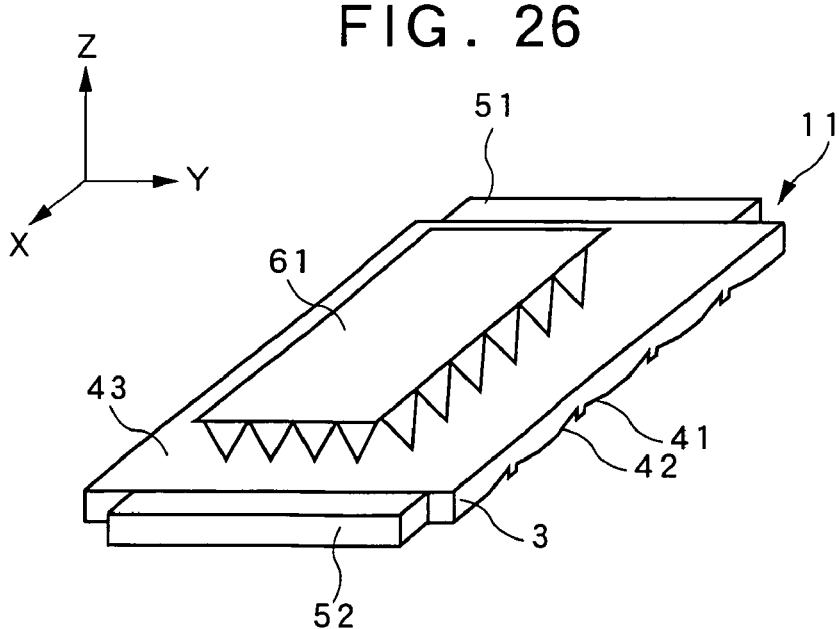
FIG. 26 is a perspective view of a light source apparatus according to a second embodiment of the invention.

A light source apparatus according to the second embodiment of the invention will be described next. FIG. 26 is a perspective view of a light source apparatus 11 according to the second embodiment, and FIG. 27 is a cross-sectional view of a conical sheet along the XZ plane, which is used in the light source apparatus 11 according to the second embodiment. As shown in FIGS. 26 and 27, the light source apparatus 11 according to the embodiment is provided with a conical sheet 61 in place of the conical sheet 6 in the light source apparatus 1 according to the first embodiment (see FIG. 1). In the conical sheet 61, the cones 64 are inclined by 10 degrees in the +X direction or toward the wide-view light source 52. The other structure of the embodiment is the same as the corresponding structure of the first embodiment.

The operation of the thus constituted light source apparatus 11 of the second embodiment will be explained below. The operation of the second embodiment up to the point where the lights from the light sources 51 and 52 are output from the light guide plate 3 is the same as that of the first embodiment. The second embodiment differs from the first embodiment in the operation of the conical sheet 61. Attention is therefore paid to the operation of the conical sheet 61 having inclined cones. FIGS. 28A to 28G are diagrams illustrating the results of simulation on the behavior of output light while changing the direction of rays of light incident to the conical sheet 61 having inclined cones, which is used in the embodiment, for illustrating the optical operation of the conical sheet 61, and respectively illustrate the simulation results at the inclination angles of 10 degrees, 20 degrees, 30 degrees, 40 degrees, 50 degrees, 60 degrees, and 70 degrees from the Z axis. In FIGS. 28A to 28G, arrow-headed two-dot chain lines indicate the outer edge of the input light flux, and the solid lines without arrow heads indicate outgoing rays of light.

Referring to FIGS. 28A to 28G, it is apparent that as the inclination angle of the input light is changed, the output light travels in a variety of directions. When the wide-view light source is turned on, particularly, the rays of light input to the conical sheet 61 are distributed in a range of 10 degrees from 70 degrees as explained in the description of the first embodiment of the invention, so that the output can be allowed to travel in various directions. This can result in more uniform irradiation.

Figure 29:
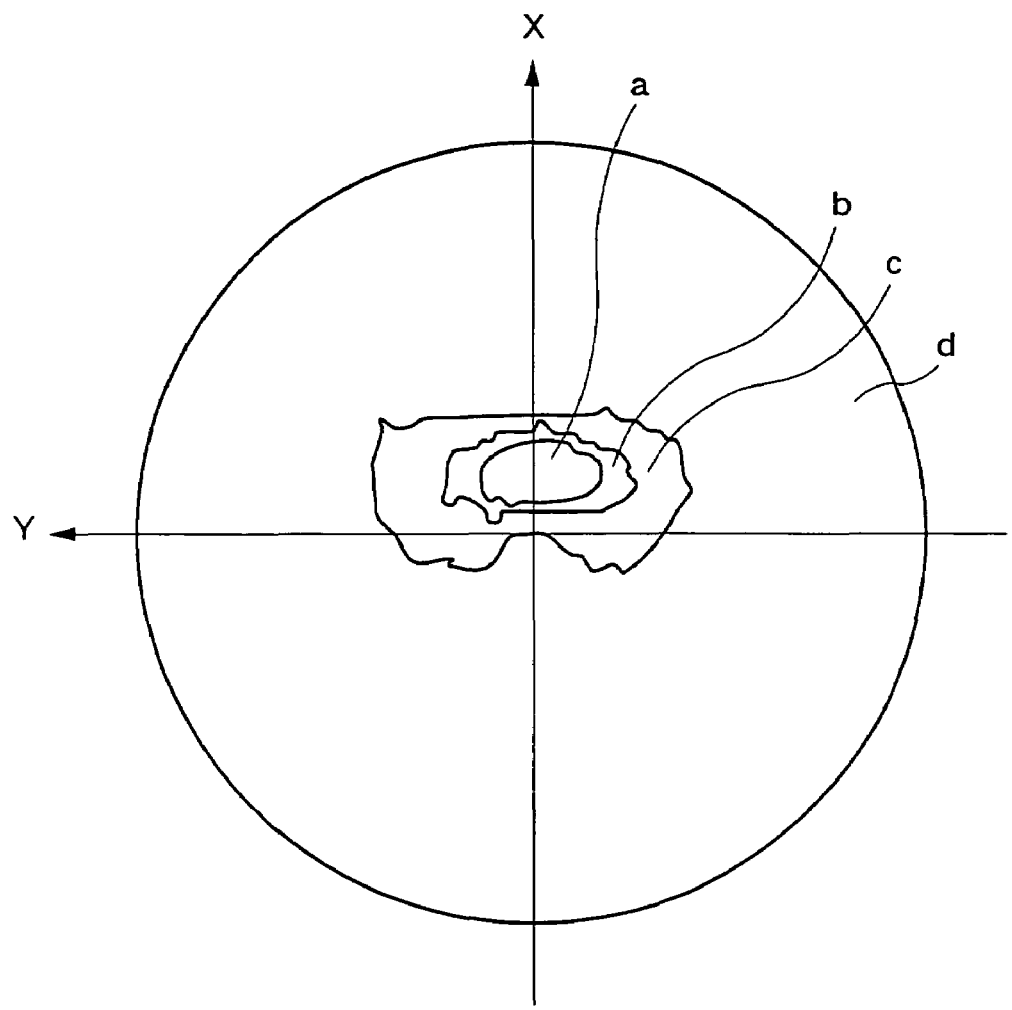
FIG. 29 is a diagram illustrating the results of simulation when the narrow-view light source is turned on according to the second embodiment of the invention,ÿand illustrating a light intensity distribution particularly when light is output from the conical sheet.
Figure 30:
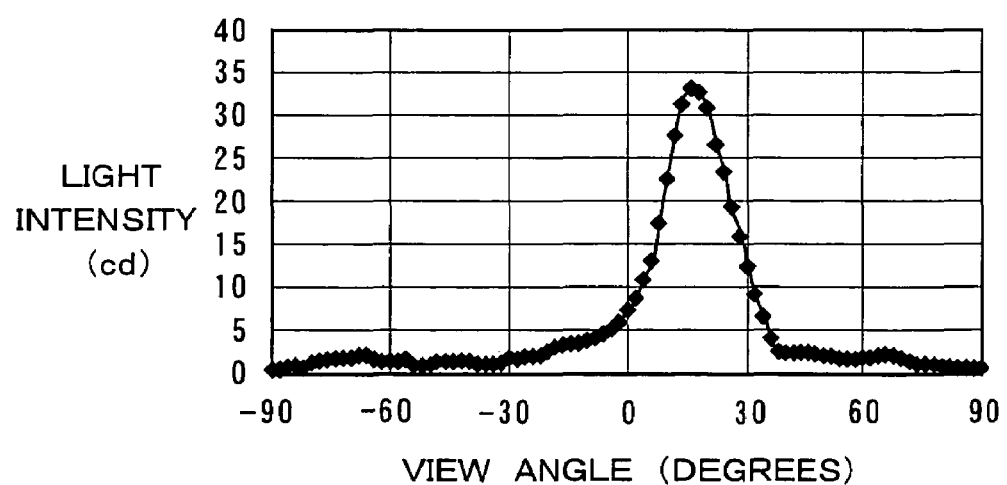
FIG. 30 is a graph illustrating the results of simulation when the narrow-view light source is turned on according to the second embodiment of the invention,ÿand illustrating the light intensity distribution in the X-axial direction particularly when light is output from the conical sheet.
Figure 31:
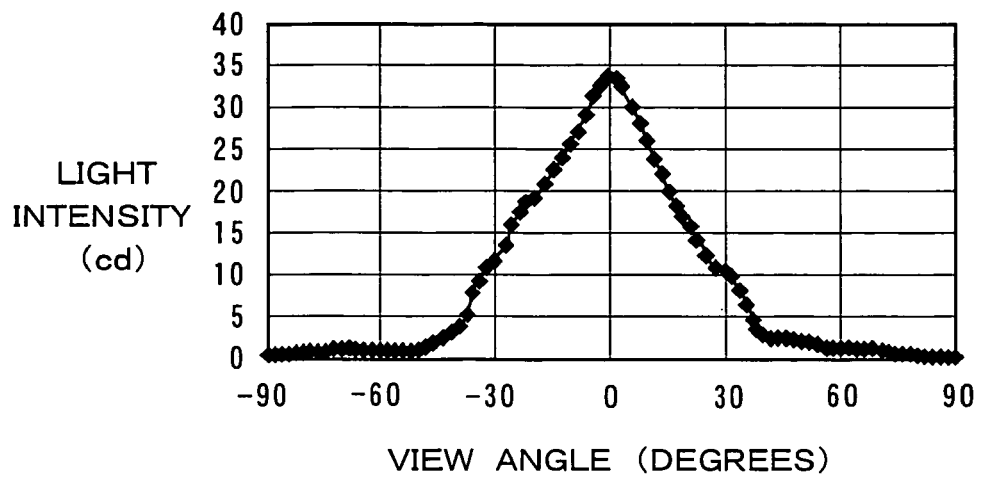
FIG. 31 is a graph illustrating the results of simulation when the narrow-view light source is turned on according to the second embodiment of the invention,ÿand illustrating the light intensity distribution in the Y-axial direction particularly when light is output from the conical sheet.

To check the adequacy of the design, computer simulation was conducted using a commercially available ray tracing simulator as per the first embodiment. The optical model is the same as that of the first embodiment except that the cones are inclined by 10 degrees in the +X direction. FIG. 29 is a polar coordinate diagram illustrating the light intensity distribution of the light output from the conical sheet when the narrow-view light source is turned on, and shows the X direction and the Y direction. FIG. 30 is a graph illustrating the light intensity distribution in the X-axial direction in the light intensity distribution shown in FIG. 29, with the horizontal axis representing the view angle in the X-axial direction and the vertical axis representing the light intensity. FIG. 31 is a graph illustrating the light intensity distribution in the Y-axial direction in the light intensity distribution shown in FIG. 29, with the horizontal axis representing the view angle in the Y-axial direction and the vertical axis representing the light intensity. As shown in FIGS. 29 to 31, the light is converged within 30 degrees both in the X-axial direction and the Y-axial direction in the light intensity distribution when the light is output from the conical sheet.

Figure 32:
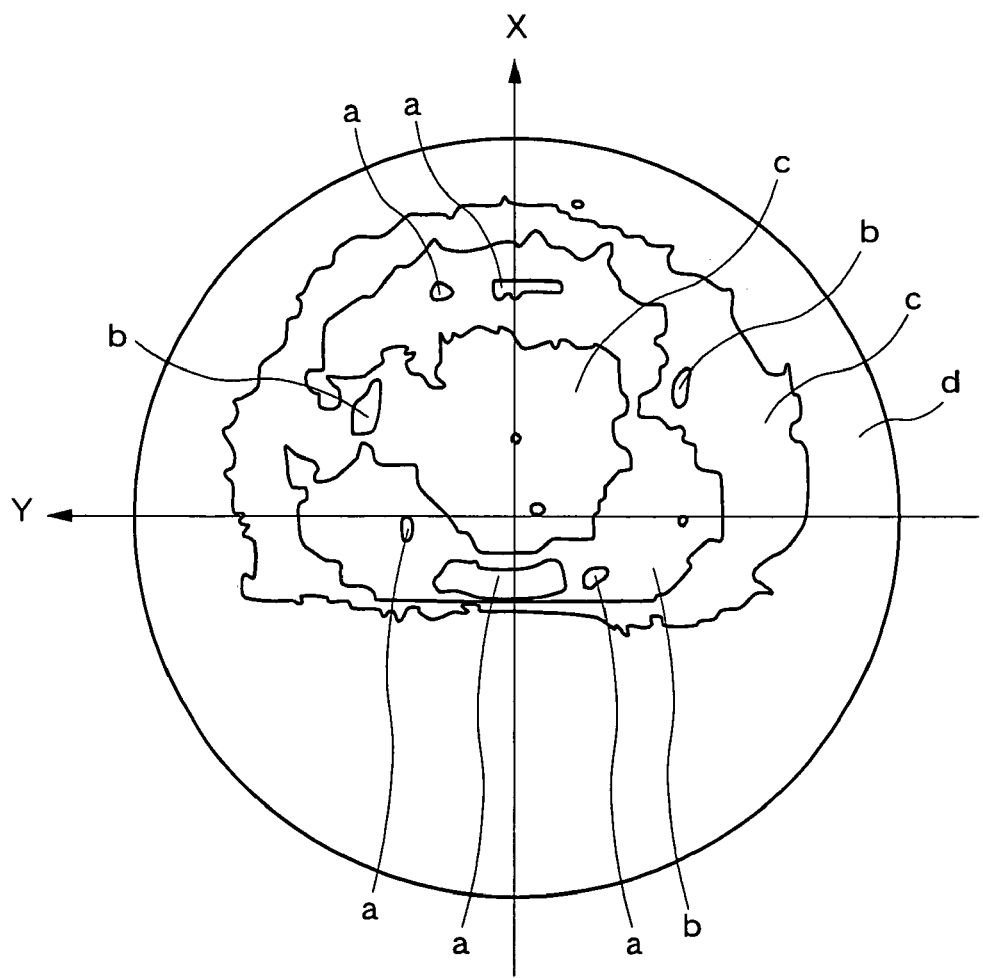
FIG. 32 is a diagram illustrating the results of simulation when the wide-view light source is turned on according to the second embodiment of the invention,ÿand illustrating a light intensity distribution particularly when light is output from the conical sheet.
Figure 33:
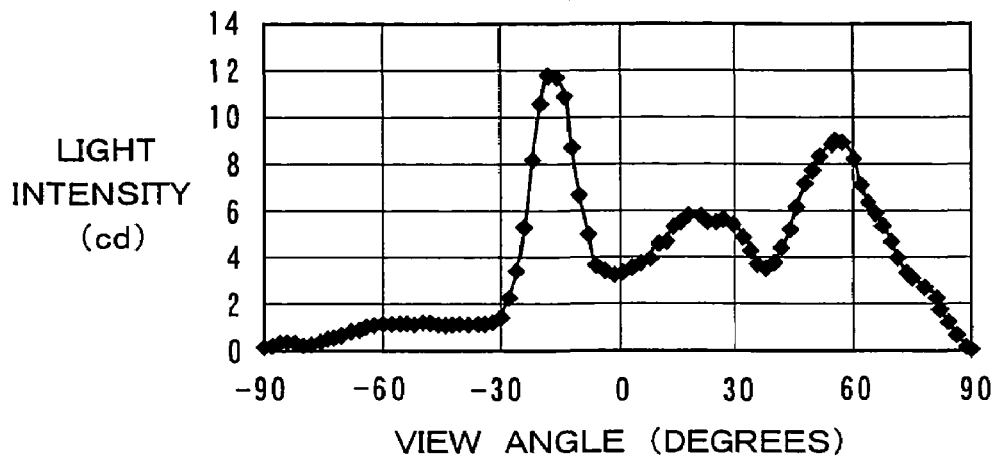
FIG. 33 is a graph illustrating the results of simulation when the wide-view light source is turned on according to the second embodiment of the invention,ÿand illustrating the light intensity distribution in the X-axial direction particularly when light is output from the conical sheet.
Figure 34:
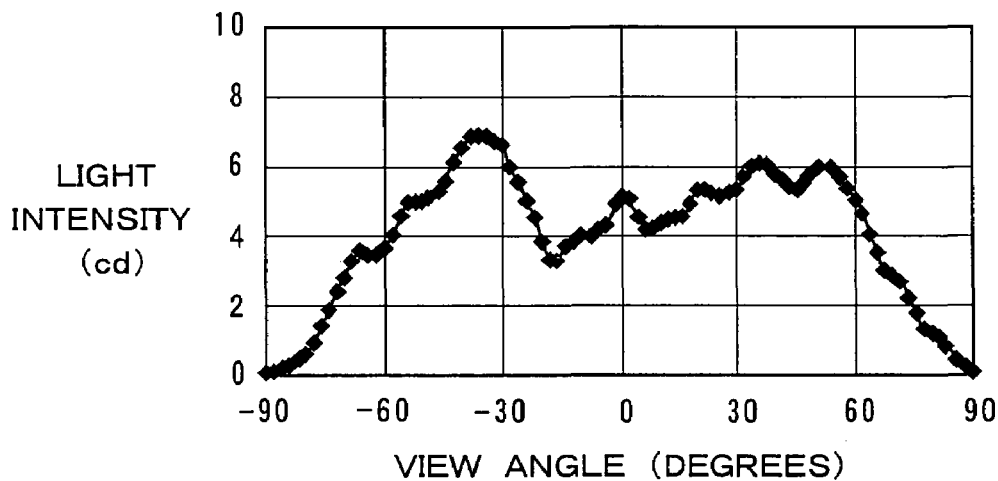
FIG. 34 is a graph illustrating the results of simulation when the wide-view light source is turned on according to the second embodiment of the invention,ÿand illustrating the light intensity distribution in the Y-axial direction particularly when light is output from the conical sheet.

FIG. 32 is a polar coordinate diagram illustrating the light intensity distribution of the light output from the conical sheet when the narrow-view light source is turned on, and shows the X direction and the Y direction. FIG. 33 is a graph illustrating the light intensity distribution in the X-axial direction in the light intensity distribution shown in FIG. 32, with the horizontal axis representing the view angle in the X-axial direction and the vertical axis representing the light intensity. FIG. 34 is a graph illustrating the light intensity distribution in the Y-axial direction in the light intensity distribution shown in FIG. 32, with the horizontal axis representing the view angle in the Y-axial direction and the vertical axis representing the light intensity. As shown in FIGS. 32 to 34, the luminance when the light is output from the conical sheet is distributed over a wide range both in the X-axial direction and the Y-axial direction, and no significant deviation in a specific direction occurs, yielding a more uniform distribution.

The uniformness of the illumination range particularly when the wide-view light source is turned on can be improved by tilting the cones on the conical sheet. The inclination angle of the cones is not limited to 10 degrees, but different values may be used as long as similar effects are demonstrated.

Figure 35:
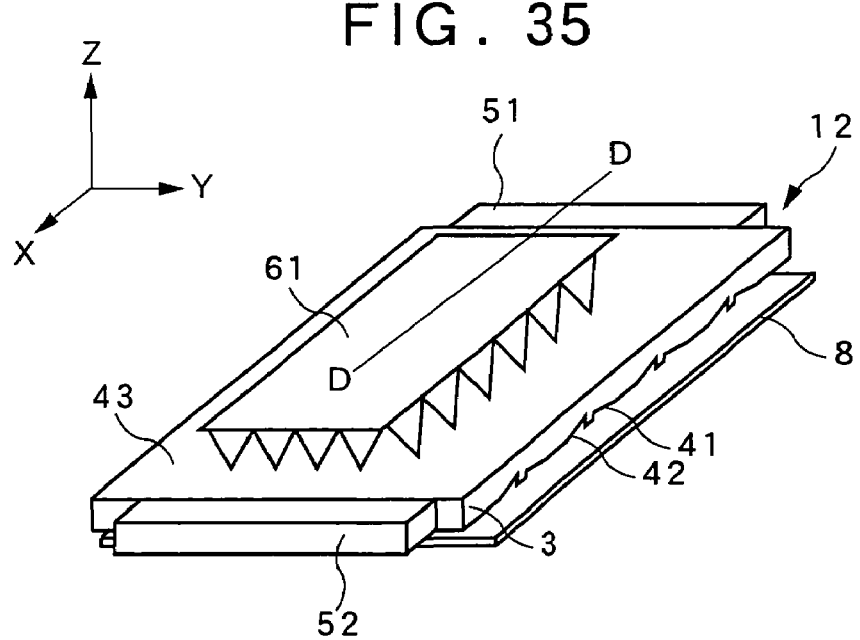
FIG. 35 is a perspective view of a light source apparatus according to a third embodiment of the invention.

A light source apparatus 12 according to the third embodiment of the invention will be described next. FIG. 35 is a perspective view of the light source apparatus 12 according to the third embodiment. As shown in FIG. 35, the light source apparatus 12 according to the embodiment is provided with a reflector 8 in the −Z direction as seen from the light guide plate 3 in such a way as to face the light diffusion surface 44 of the light guide plate 3. The reflector 8 reflects the light output from the light guide plate 3 toward the light guide plate 3.

Figure 36:
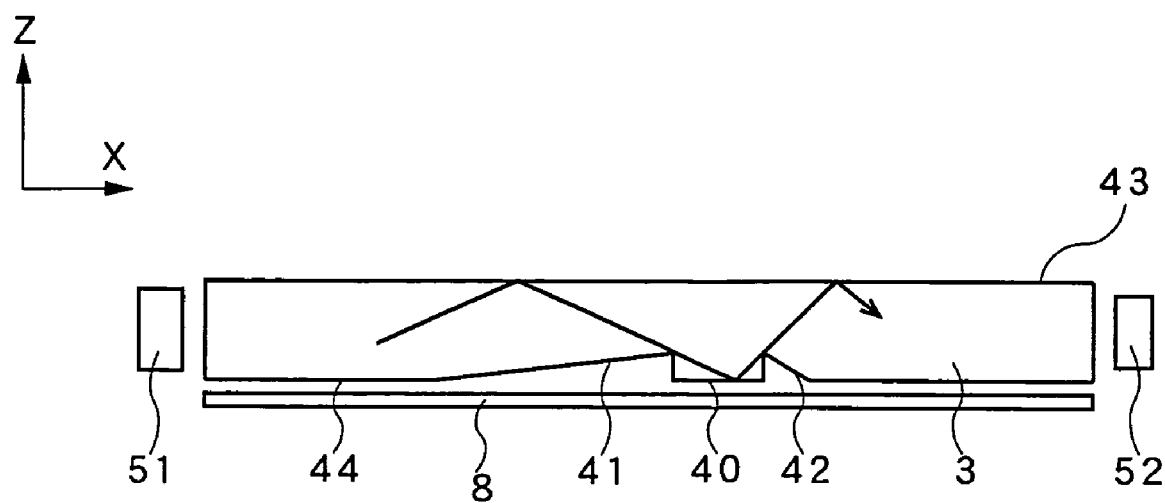
Figure 37:
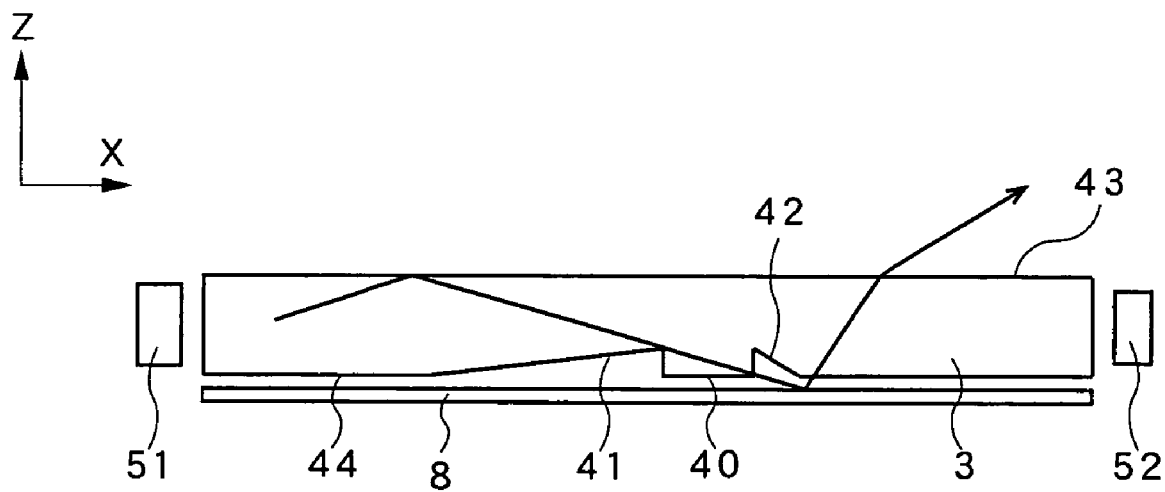

The operation of the thus constituted light source apparatus 12 of the third embodiment will be explained next. FIGS. 36 and 37 are cross-sectional views along line D-D in FIG. 35, and particularly show an optical model when the narrow-view light source is turned on. The light emitted from the narrow-view light source 51 enters the light guide plate 3 and propagates in the light guide plate 3. The rays of light which are input to the vertical portion between the inclined surface 42 having an inclination angle of 45 degrees and the flat surface 40 partly go out of the light guide plate 3, re-enter the light guide plate 3 from the inclined surface 42, and propagate in the light guide plate 3 again, as shown in FIG. 36. Some of the rays of light do not re-enter the light guide plate 3 from the inclined surface 42 with the inclination angle of 45 degrees after going out from the vertical portion, and propagate toward the reflector 8. One example of such rays of light is the rays of light which propagate in the light guide plate 3 the direction inclined from the Z axis by 70.5 degrees and input to the vertical portion. The incident angle to the vertical portion is 19.5 degrees, and the rays go out from the vertical portion at an angle of 30 degrees. The rays enter the reflector 8 at an angle of 60 degrees from the direction normal to the reflector 8, and is directly reflected in the direction of 60 degrees. The angle at which the rays re-enter the light guide plate 3 is 60 degrees from the Z axis, and the angle of the rays after being input to the light guide plate 3 becomes 35.3 degrees from the Z axis. As this angle is smaller than the angle of total reflection of the light guide plate 3, the rays go out of the light guide plate 3 at an angle of 60 degrees from the Z axis. That is, the rays of light directly reflected at the reflector 8 are output from the light guide plate 3 with high directivity at a large angle from the Z axis in the XZ plane. As a result, the optical efficiency of the light source apparatus can be improved, and the light intensity of the screen can be enhanced without increasing the outputs of the light sources 51 and 52.

Figure 38:
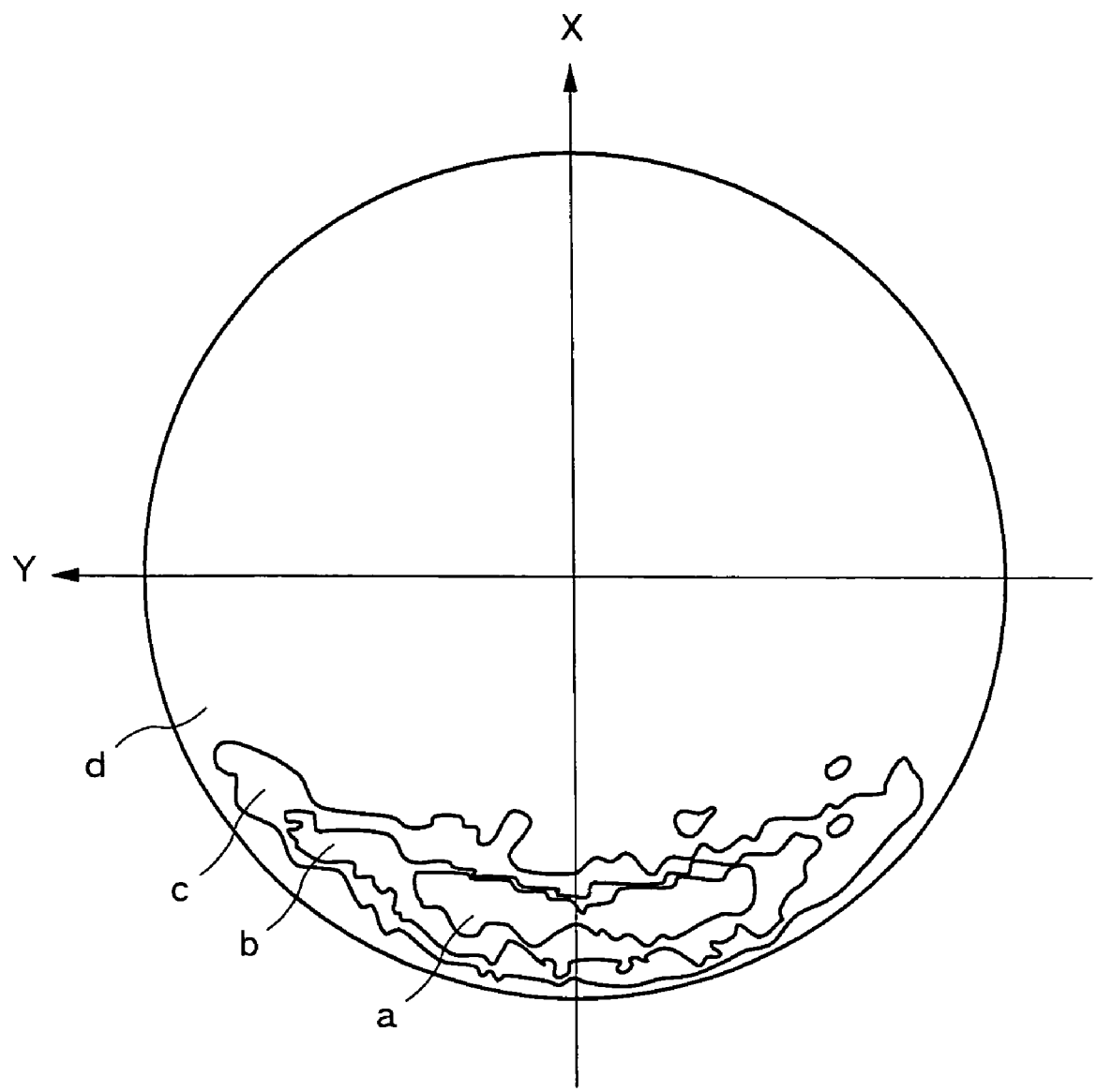
FIG. 38 is a diagram illustrating the results of simulation when the narrow-view light source is turned on according to the third embodiment of the invention,ÿand particularly illustrating a light intensity distribution on the reflector.
Figure 39:
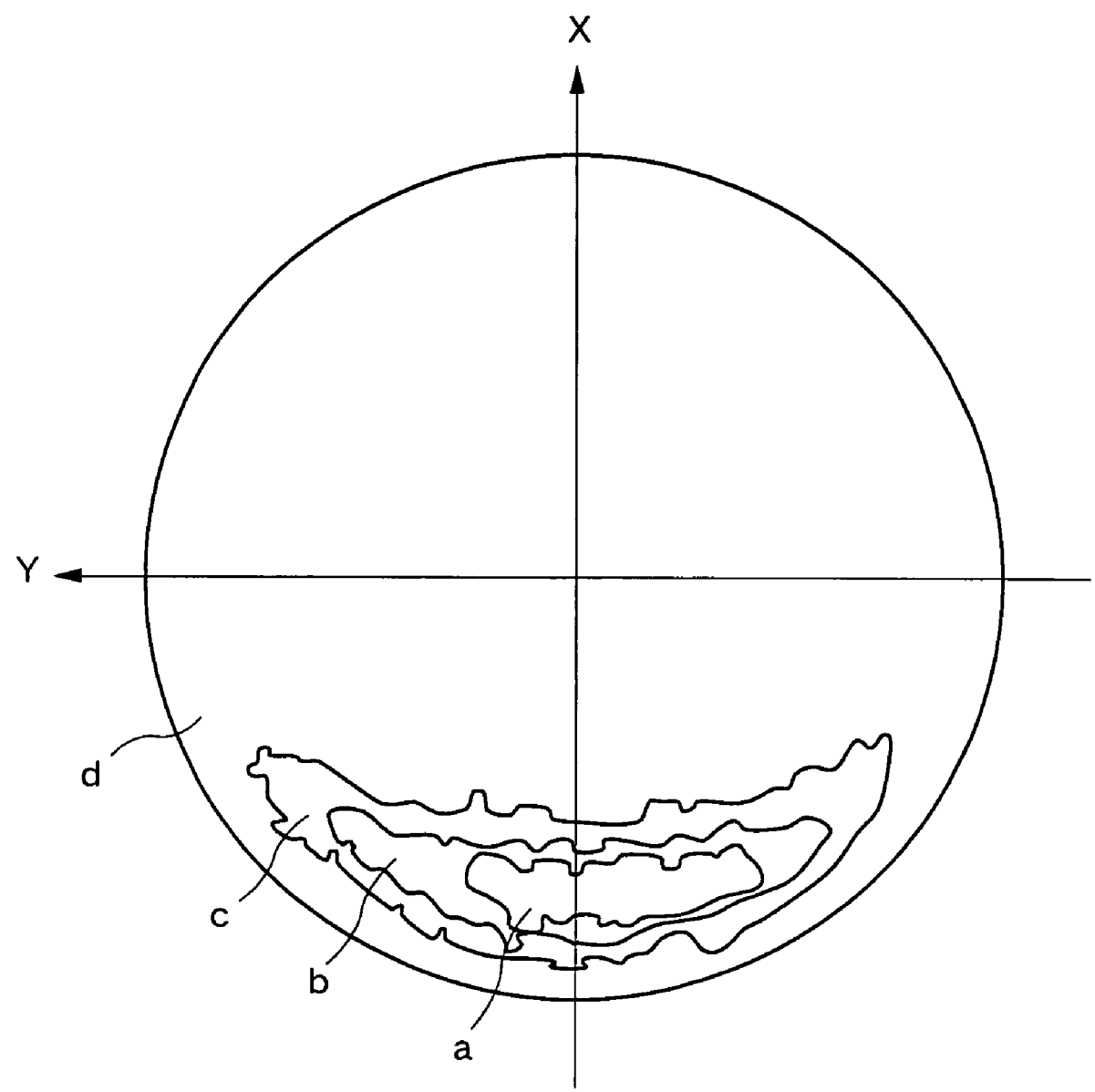
FIG. 39 is a diagram illustrating the results of simulation when the narrow-view light source is turned on according to the third embodiment of the invention,ÿand illustrating a light intensity distribution particularly when light is output from the light guide plate.
Figure 40:
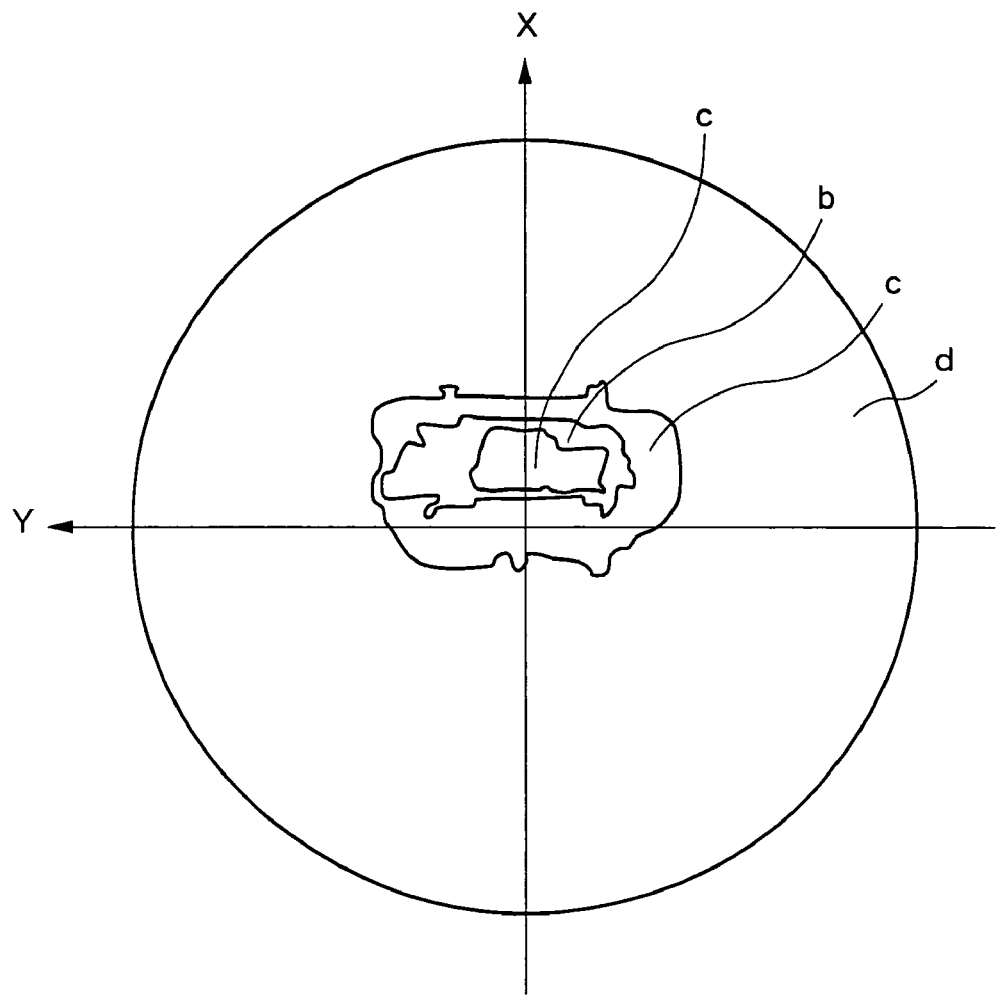
FIG. 40 is a diagram illustrating the results of simulation when the narrow-view light source is turned on according to the third embodiment of the invention,ÿand illustrating a light intensity distribution particularly when light is output from a conical sheet.
Figure 41:
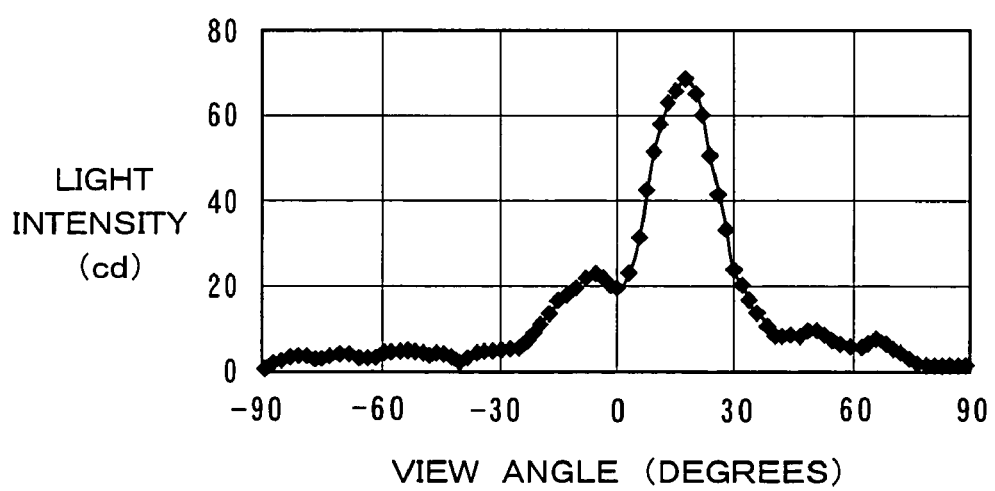
FIG. 41 is a graph illustrating the results of simulation when the narrow-view light source is turned on according to the third embodiment of the invention,ÿand illustrating the light intensity distribution in the X-axial direction particularly when light is output from the conical sheet.
Figure 42:
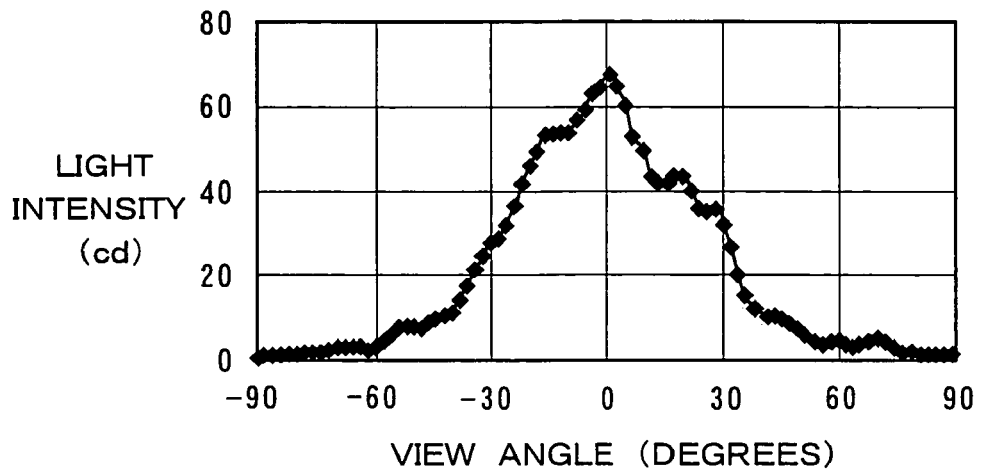
FIG. 42 is a graph illustrating the results of simulation when the narrow-view light source is turned on according to the third embodiment of the invention,ÿand illustrating the light intensity distribution in the Y-axial direction particularly when light is output from the conical sheet.

To check the adequacy of the design, computer simulation was conducted using a commercially available ray tracing simulator as per the first embodiment. The optical model is the same as that of the first embodiment except that the reflector 8 is provided on the −Z-direction side of the light guide plate 3. FIGS. 38 to 40 are polar coordinate diagrams illustrating the light intensity distribution of the light on the reflector, the light output from the light guide plate and the light intensity distribution of the light output from the conical sheet when the narrow-view light source is turned on, and show the X direction and the Y direction. FIG. 41 is a graph illustrating the light luminance distribution in the X-axial direction in the light intensity distribution when the light is output from the conical sheet shown in FIG. 40, with the horizontal axis representing the view angle in the X-axial direction and the vertical axis representing the light intensity. FIG. 42 is a graph illustrating the light luminance distribution in the Y-axial direction in the light intensity distribution when the light is output from the conical sheet shown in FIG. 40, with the horizontal axis representing the view angle in the Y-axial direction and the vertical axis representing the light intensity.

As shown in FIG. 39, the light intensity distribution when the light is output from the light guide plate has a peak in the direction of 65 degrees from the Z axis, and does not show a drop in directivity as compared with the first embodiment of the invention. The reason for the result seems be that as shown in FIG. 38, the light intensity distribution on the reflector also has a high intensity peak in the direction of 65 degrees from the Z axis. It is construed that although the light intensity distribution on the reflector is directly added to the light intensity distribution when the light is output from the light guide plate as mentioned above, the directivity of the light intensity distribution when the light is output from the light guide plate does not drop because of the high directivity of the light intensity distribution on the reflector. As shown in FIGS. 41 and 42, the light is converged within 30 degrees both in the X-axial direction and the Y-axial direction in the light intensity distribution when the light is output from the conical sheet, and the light intensity is enhanced by two times or so as compared with the first embodiment of the invention where no reflector is provided. That is, when the narrow-view light source is turned on, the light from the light source can be used more effectively without degrading the directivity.

Figure 43:
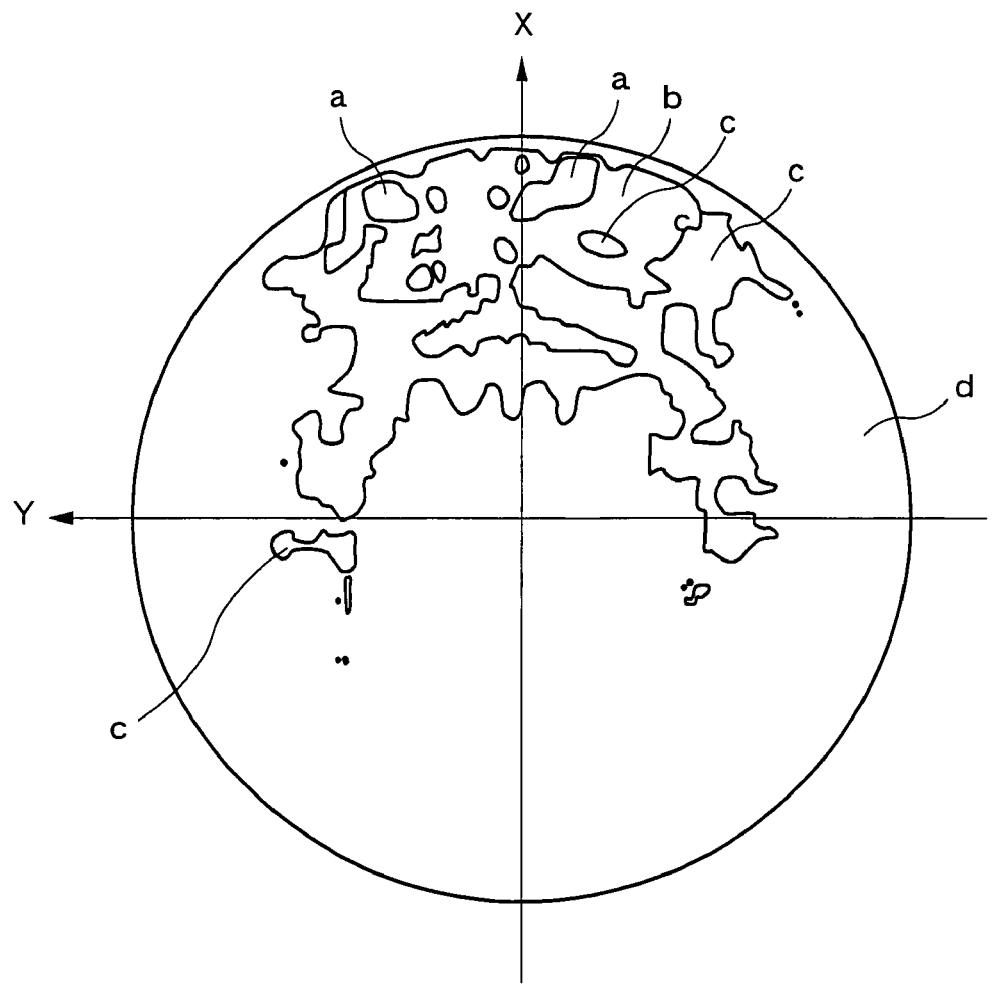
FIG. 43 is a diagram illustrating the results of simulation when the wide-view light source is turned on according to the third embodiment of the invention,ÿand particularly illustrating a light intensity distribution on the reflector.
Figure 44:
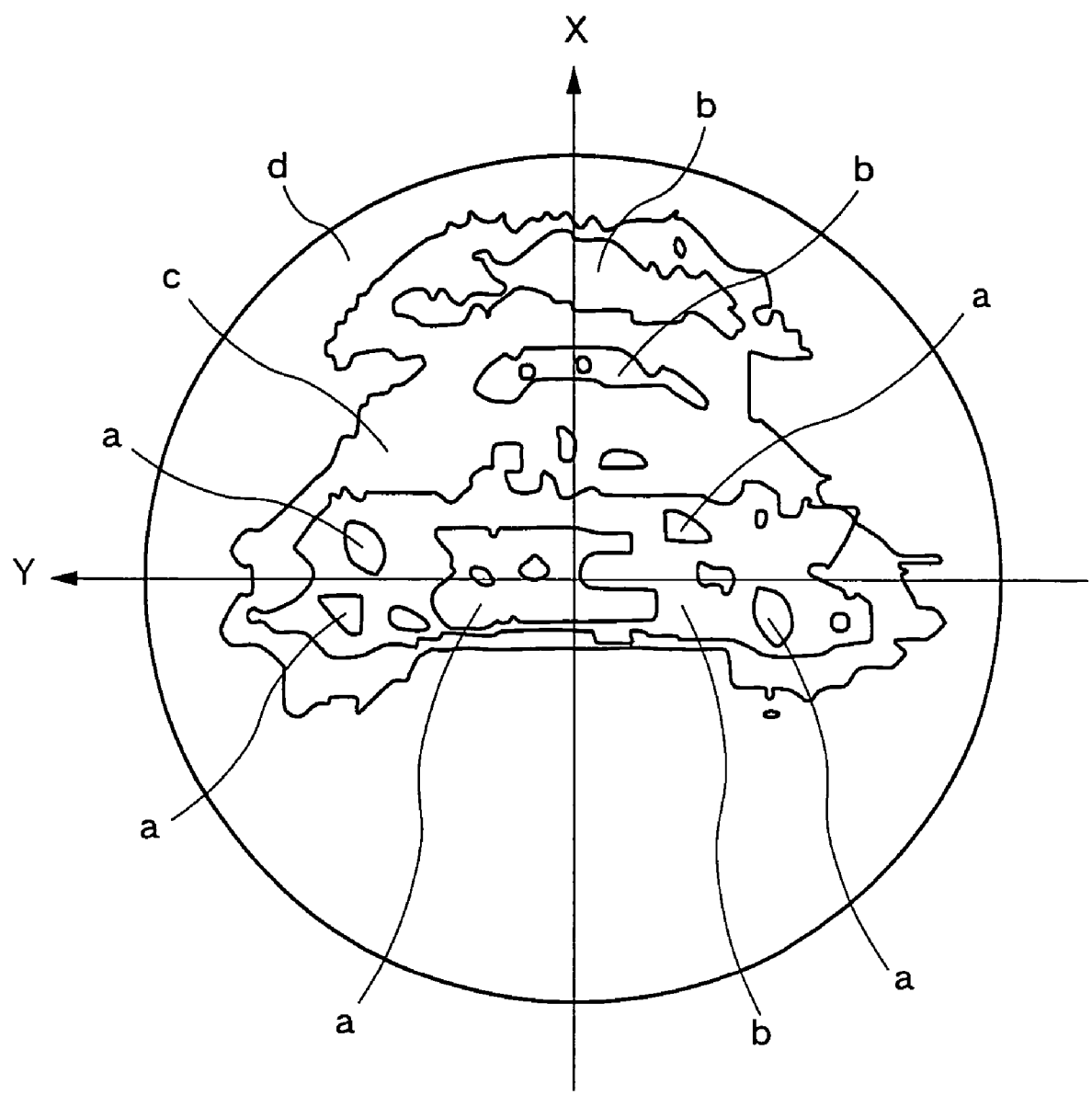
FIG. 44 is a diagram illustrating the results of simulation when the wide-view light source is turned on according to the third embodiment of the invention,ÿand illustrating a light intensity distribution particularly when light is output from the light guide plate.
Figure 45:
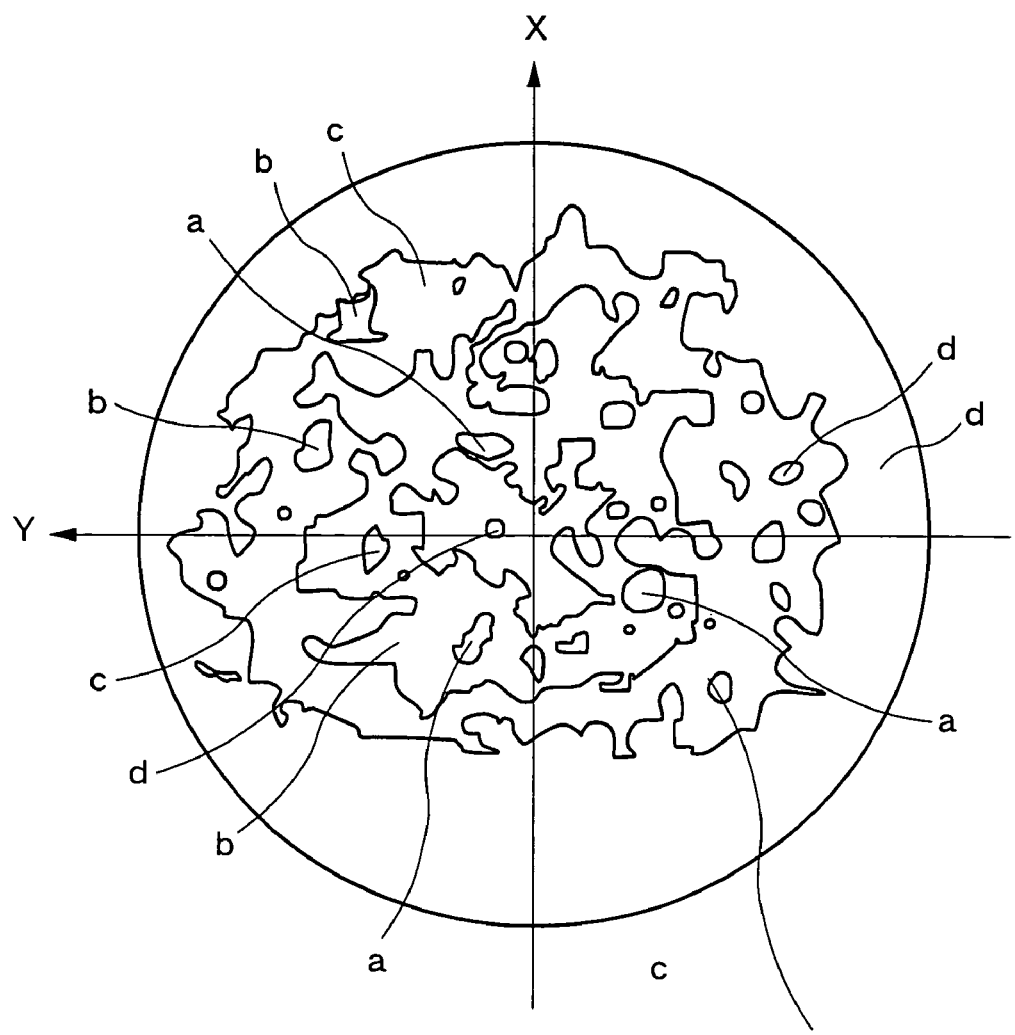
FIG. 45 is a diagram illustrating the results of simulation when the light source is turned on according to the third embodiment of the invention,ÿand illustrating a light intensity distribution particularly when light is output from the conical sheet.
Figure 46:
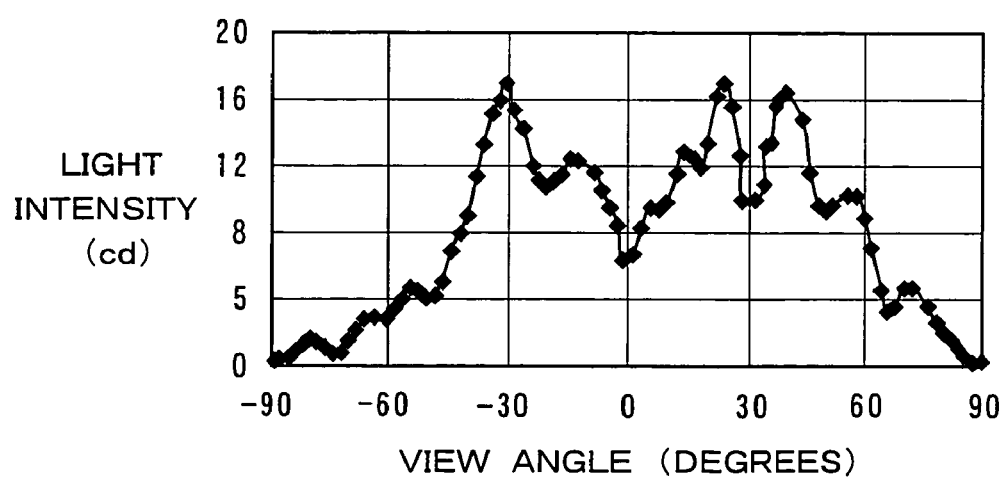
FIG. 46 is a graph illustrating the results of simulation when the wide-view light source is turned on according to the third embodiment of the invention,ÿand illustrating the light intensity distribution in the X-axial direction particularly when light is output from the conical sheet.
Figure 47:
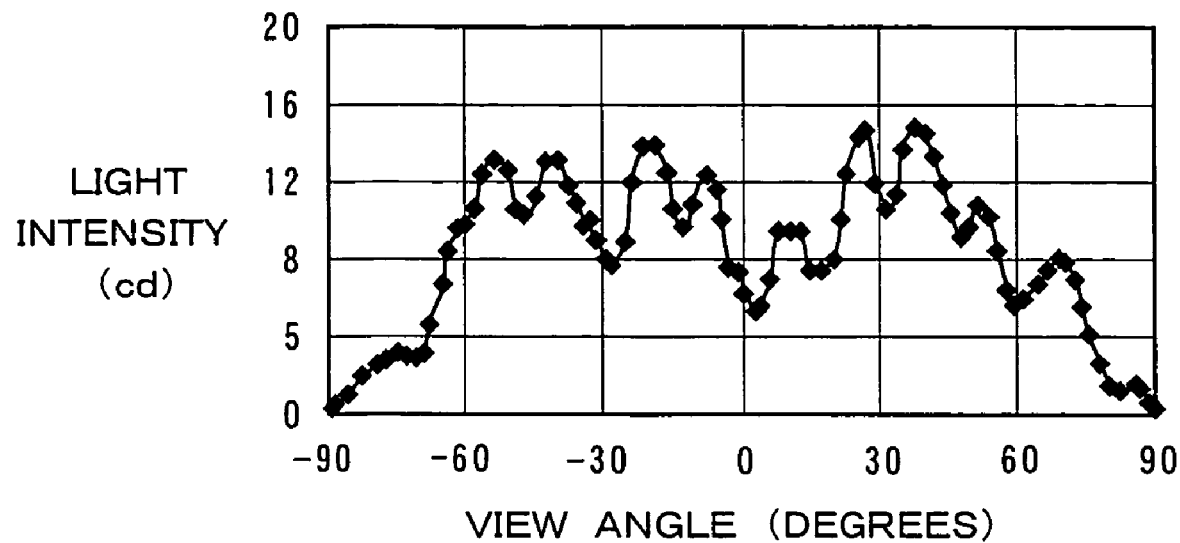
FIG. 47 is a graph illustrating the results of simulation when the wide-view light source is turned on according to the third embodiment of the invention,ÿand illustrating the light intensity distribution in the Y-axial direction particularly when light is output from the conical sheet.

FIGS. 43 and 44 respectively illustrate the light intensity distribution on the reflector and the light intensity distribution of the light output from the light guide plate when the wide-view light source is turned on. FIG. 45 illustrates the light intensity distribution when light is output from the conical sheet. FIGS. 46 and 47 are graphs respectively illustrating the light intensity distributions in the X-axial direction and the Y-axial direction in the light intensity distribution of light output from the conical sheet shown in FIG. 45. As shown in FIG. 44, the light intensity near the point of 60 degrees from the Z axis in the light intensity distribution when the light is output from the light guide plate is higher than that of the first embodiment of the invention. The reason for the result seems be that as shown in FIG. 43, the light intensity distribution on the reflector also has a high intensity peak in the direction of 60 degrees from the Z axis. The light traveling in the direction of 60 degrees travels nearly in the Z-axial direction after being output from the conical sheet, and demonstrates an effect of improving the light intensity near the front which is relatively low in the first embodiment of the invention. As a result, the light intensity when the light is output from the conical sheet is distributed over a wide range both in the X-axial direction and the Y-axial direction, and no significant deviation in a specific direction occurs, yielding a more uniform distribution as compared particularly with the first embodiment of the invention. The light intensity as high as two times or so is acquired as per the case where the narrow-view light source is turned on.

As apparent from the above, the provision of the reflector on that side of the light guide plate where the inclined surface is provided can improve the light intensity when each light source is turned on, and can keep high directivity particularly when the narrow-view light source is turned on. When the wide-view light source is turned on, a more uniform luminance distribution can be achieved. A reflection sheet, a directivity reflection sheet or the like which has a reduced reflectance may be used as the reflector of the invention. The other structure and the operation of the light source apparatus 12 of the embodiment are the same as those of the first embodiment.

Figure 48:
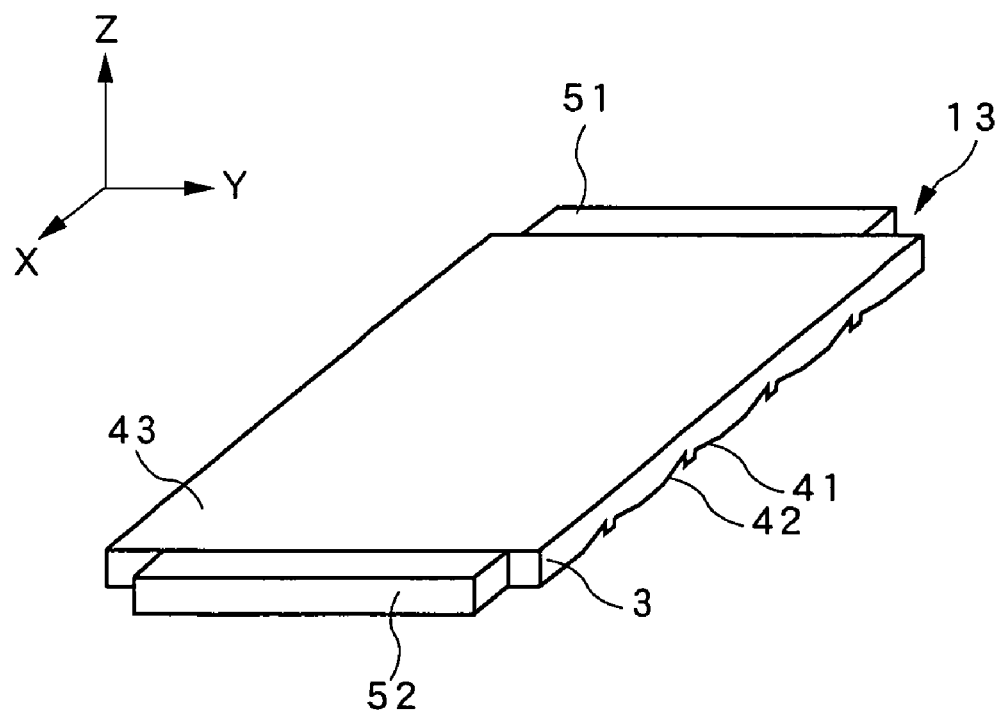
FIG. 48 is a perspective view of a light source apparatus according to a reference example of the invention.
Figure 49:
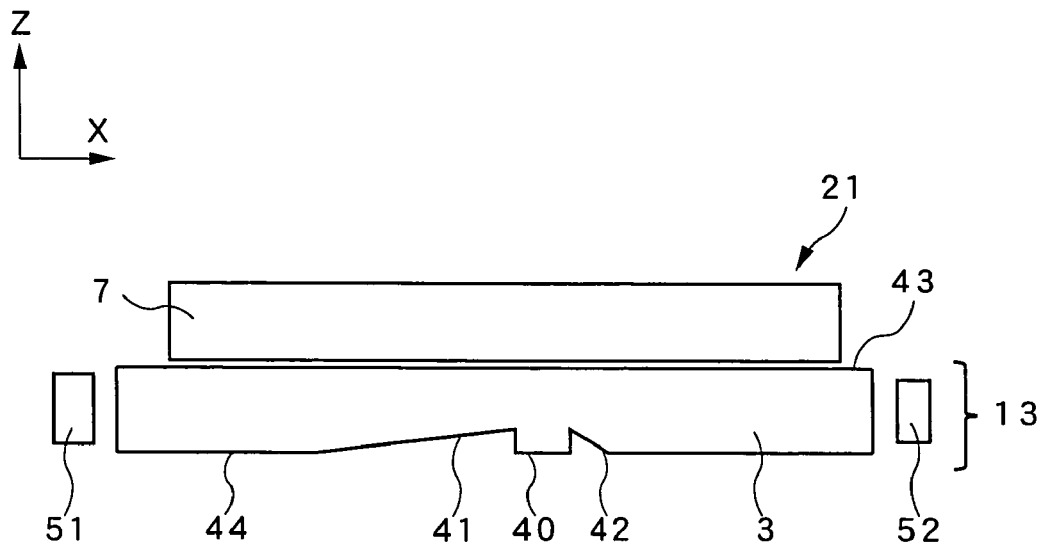
FIG. 49 is a cross-sectional view of a display apparatus along the XZ plane in which the light source apparatus according to the reference example is mounted.
Figure 50:
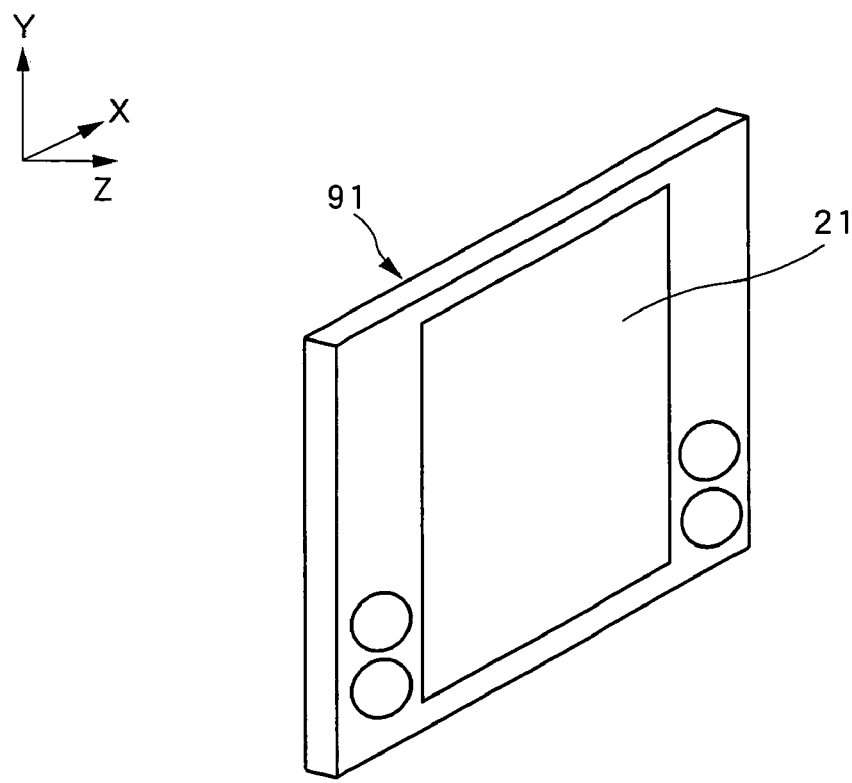
FIG. 50 is a perspective view of a terminal device in which the display apparatus using the light source apparatus according to the reference example is mounted.

A reference example of the invention will be explained next. FIG. 48 is a perspective view of a light source apparatus 13 according to the reference example, FIG. 49 is a cross-sectional view of a display apparatus 21 along the XZ plane which uses the light source apparatus, and FIG. 50 is a perspective view of a terminal device in which the display apparatus using the light source apparatus according to the reference example is mounted. As shown in FIGS. 48 and 49, the light source apparatus 13 according to the reference example does not have the conical sheet 6 (see FIG. 1) of the first embodiment. As shown in FIG. 49, the display apparatus 21 using the light source apparatus 13 according to the reference example is provided with the transparent liquid crystal panel 7 on the light output surface 43 of the light guide plate 3. As shown in FIG. 50, the display apparatus 21 using the light source apparatus 13 according to the reference example is mounted in, for example, a PDA 91. The horizontal direction and the vertical direction of the PDA 91 are so set as to be the X-axial direction and the Y-axial direction of the light source apparatus, respectively. That is, the two light sources are laid out in the transverse direction of the display screen. The other structure of the light source apparatus 13 of the reference example is the same as the corresponding structure of the light source apparatus 1 of the first embodiment. A reflector may be provided on the back side of the light guide plate 3 as per the third embodiment.

In the reference example, the action of the light guide plate 3 explained in the foregoing description of the first embodiment can allow the light illumination direction to be changed one-dimensionally by selectively turning on the light source 51 or 52. That is, the light intensity distribution when the narrow-view light source 51 is turned on becomes as shown in FIG. 12, and the light intensity distribution when the wide-view light source 52 is turned on becomes as shown in FIG. 17.

The reference example can realize the light source apparatus capable of switching the output direction of the illuminated light with fewer components and at a lower cost. Although two light sources are laid out on the right and left sides of the screen in the reference example, the display apparatus of the reference example can be mounted in portable terminal devices where space for the light sources on the right and left sides of the screen can be secured easily, e.g., a PDA, a game machine, a digital camera, a digital video camera and the like. However, the reference example has a problem such that the illumination direction is frontward, i.e., the illumination direction does not include the +Z direction, and the switching effect is one-dimensional and is hardly able to change the angular range.

Figure 51:
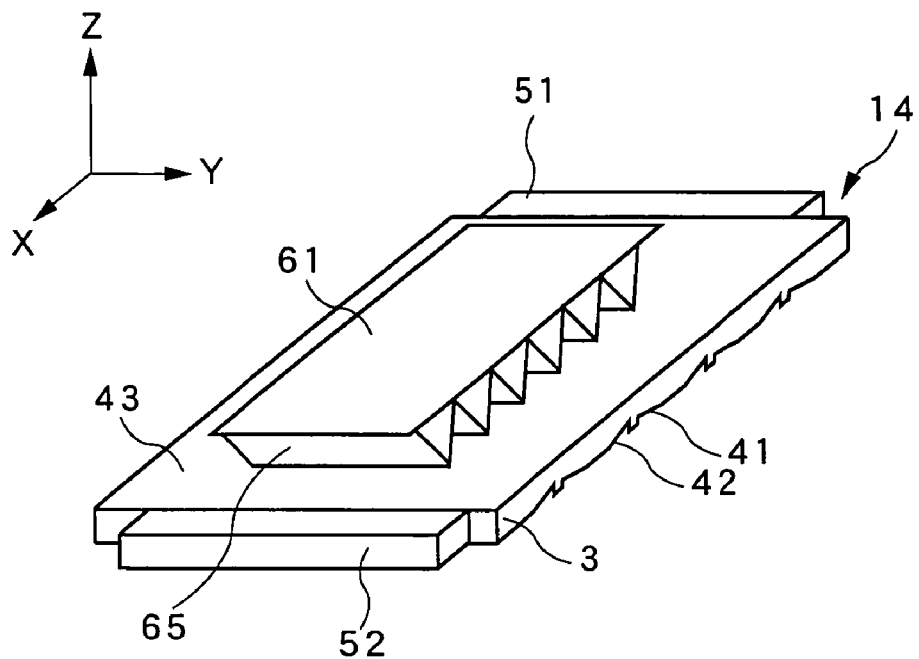
FIG. 51 is a perspective view of a light source apparatus according to a fourth embodiment of the invention.
Figure 52:
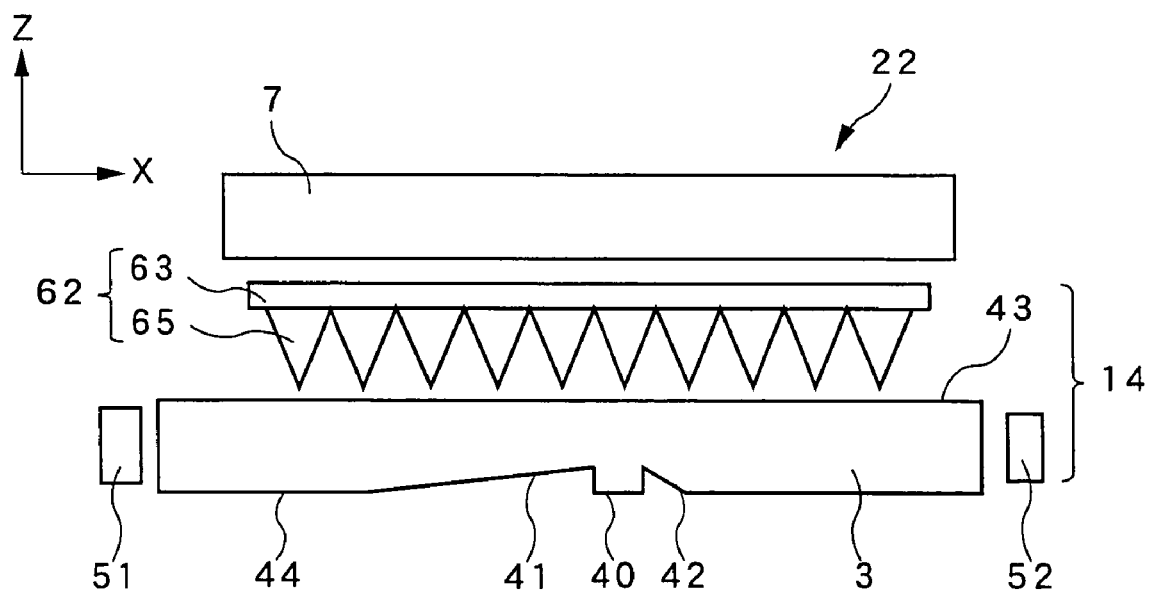
FIG. 52 is a cross-sectional view of a display apparatus along the XZ plane in which the light source apparatus according to the fourth embodiment of the invention is mounted.
Figure 53:
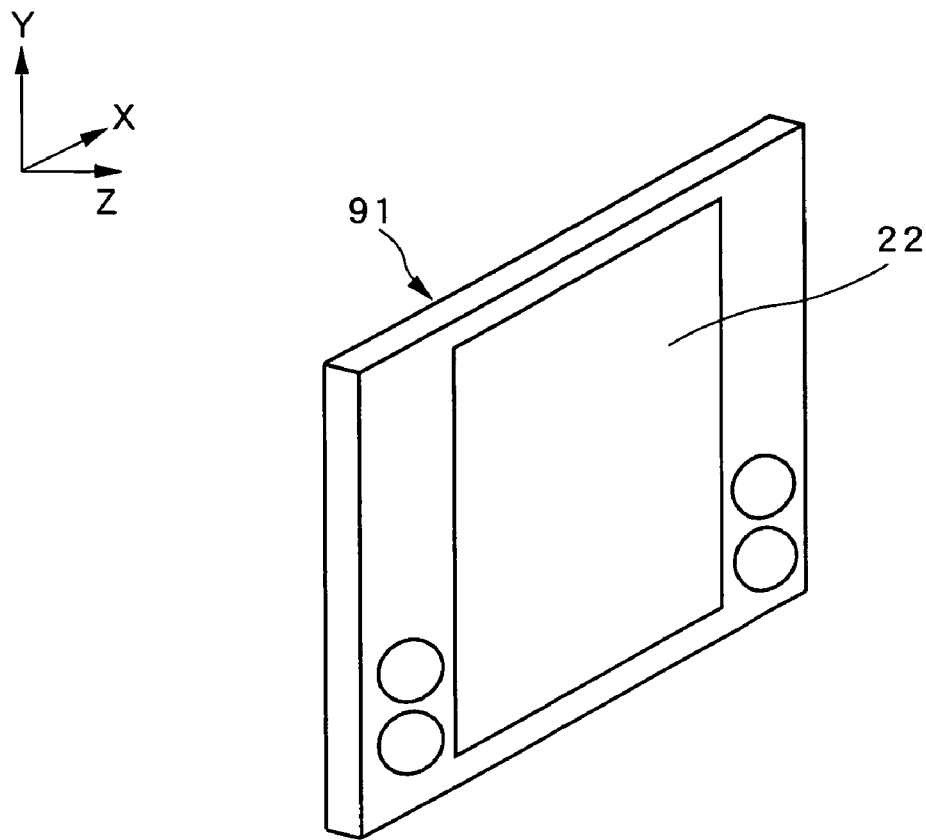
FIG. 53 is a perspective view of a terminal device in which the display apparatus using the light source apparatus according to the fourth embodiment of the invention is mounted.

A light source apparatus according to the fourth embodiment of the invention will be explained next. FIG. 51 is a perspective view of a light source apparatus 14 according to the fourth embodiment, FIG. 52 is a cross-sectional view of a display apparatus 22 along the XZ plane which uses the light source apparatus 14 according to the fourth embodiment, and FIG. 53 is a perspective view of a terminal device in which the display apparatus 22 using the light source apparatus 14 according to the fourth embodiment of the invention is mounted. As shown in FIGS. 51 and 52, the light source apparatus 14 of the embodiment differs from the light source apparatus according to the reference example in that a prism sheet 62 is provided on the +Z-directional side of the light guide plate 3. That is, the embodiment is provided with the prism sheet 62 in place of the conical sheet 6 (FIG. 1) of the first embodiment. The prism sheet 62 comprises a flat plate portion 63, and a plurality of one-dimensional prisms 65 formed on that side of the flat plate portion 63 which faces the light guide plate 3. The one-dimensional prisms 65 whose ridge lines extend in the Y-axial direction and which protrude in the −Z direction are laid out in the X-axial direction. The apex angle of the one-dimensional prisms 65, like the apex angle of the cones 64 of the conical sheet 6, is set to, for example, 70 degrees. The protruding direction of the one-dimensional prisms 6 or the direction parallel to the plane which bisects the side surfaces of the one-dimensional prisms 65 and perpendicular to the Y-axial direction coincides with the Z-axial direction.

As shown in FIG. 52, the structure of the display apparatus 22 of the embodiment is the same as the structure of the first embodiment, except that the light source apparatus 14 and the transparent liquid crystal panel 7 are provided.

As shown in FIG. 53, the display apparatus 22 is mounted in, for example, the PDA 91. The horizontal direction and the vertical direction of the PDA 91 are so set as to be the X-axial direction and the Y-axial direction of the light source apparatus, respectively. That is, the two light sources are laid out in the transverse direction of the display screen.

The embodiment can change the illumination angular range in the X-axial direction by performing an operation similar to the operation of the first embodiment explained above. This can realize a light source apparatus capable of changing the angular range of the illuminated light in the transverse direction (in the right and left direction) of the portable terminal device. Although the embodiment cannot change the angular range in the up and down direction of the portable terminal device, both the peek proof effect and the effect of simultaneous view by plural viewers/listeners can often be ensured by merely changing the angular range of the illuminated light changed in the right and left direction in the actual usage of the portable terminal device. The embodiment can set the illumination direction to the frontward direction as compared with the reference example. As the prism sheet having one-dimensional prisms formed thereon can be manufactured at a lower cost than the conical sheet that has a two-dimensional structure, the cost for the light source apparatus can be reduced.

Because the embodiment, like the reference example, requires that two light sources be laid out on both sides of the display screen, the display apparatus of the embodiment can be suitably used in portable terminal devices where space for the light sources on the right and left sides of the screen can be secured easily, such as a PDA, a game machine, a digital camera, and a digital video camera. A reflector may be provided on the back side of the light guide plate 3 as per the third embodiment.

Figure 54:
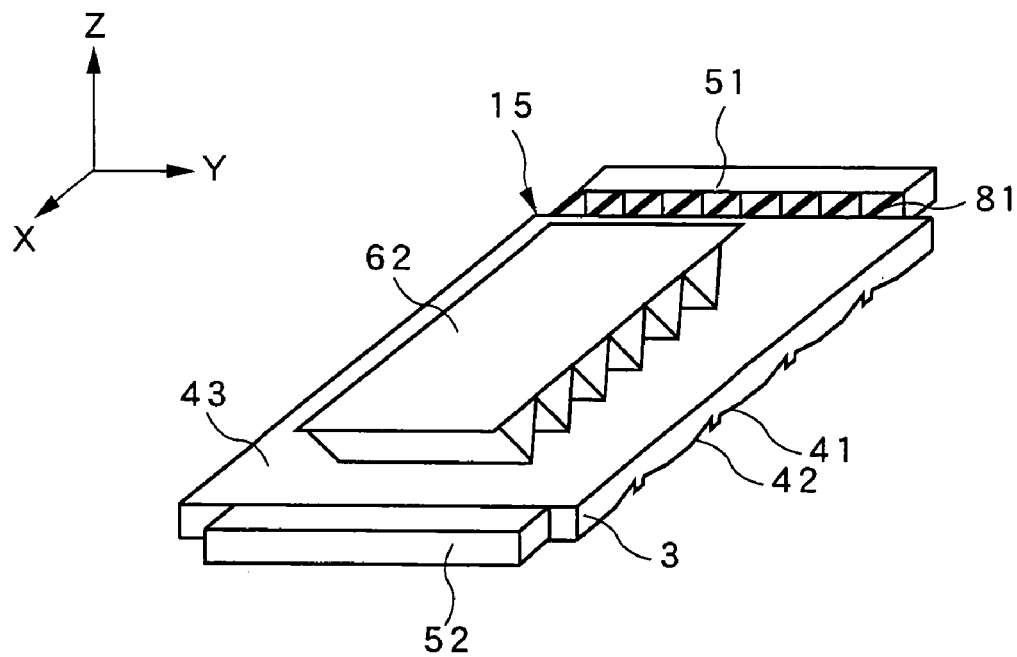
FIG. 54 is a perspective view of a light source apparatus according to a fifth embodiment of the invention.
Figure 55:
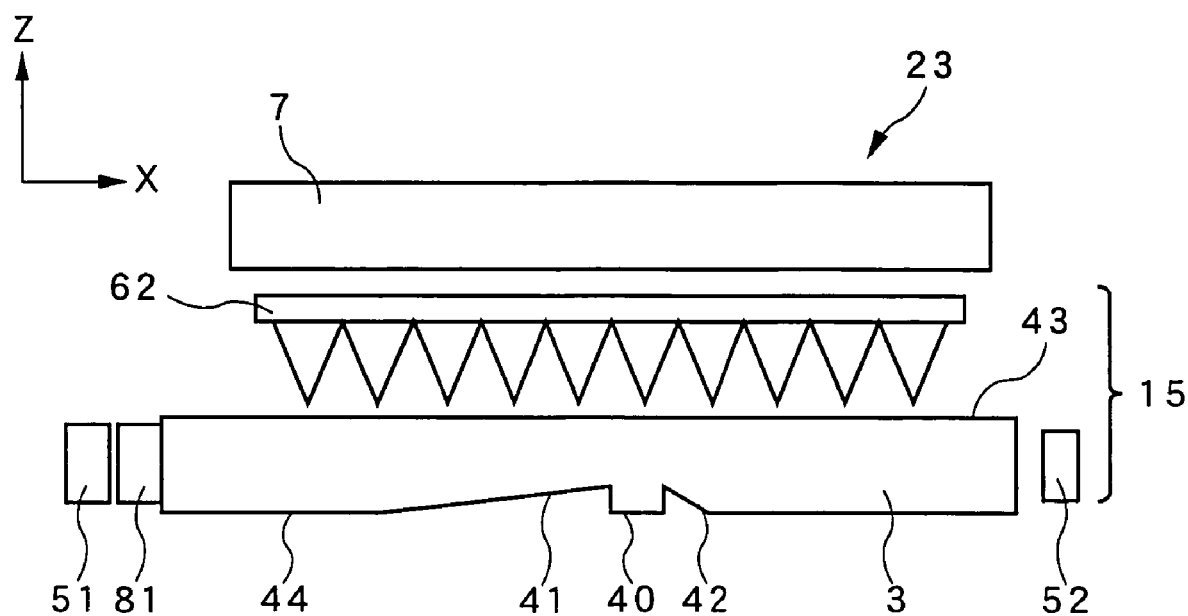
FIG. 55 is a cross-sectional view of a display apparatus along the XZ plane in which the light source apparatus according to the fifth embodiment of the invention is mounted.
Figure 56:
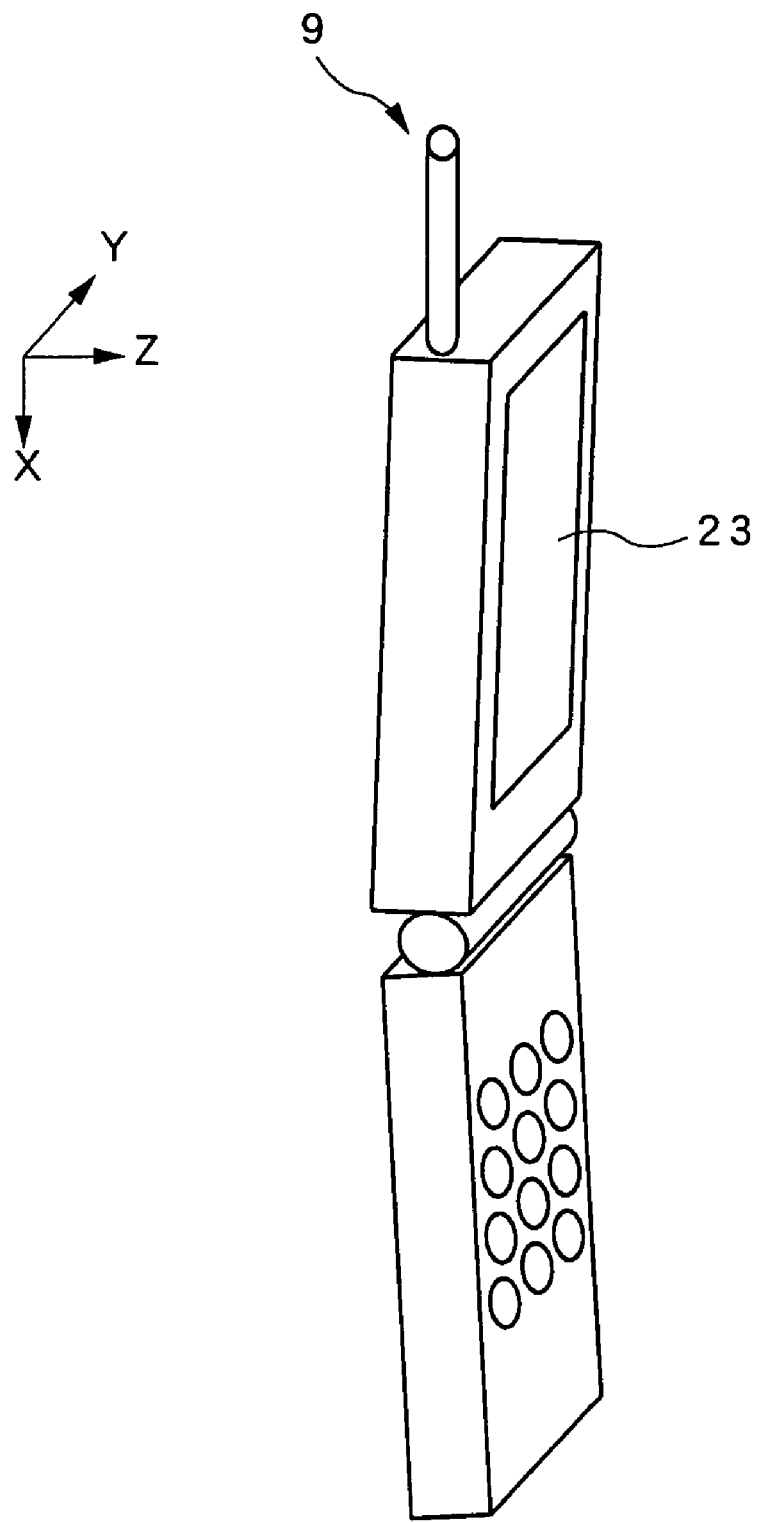
FIG. 56 is a perspective view of a terminal device in which the display apparatus using the light source apparatus according to the fifth embodiment of the invention is mounted.
Figure 57:
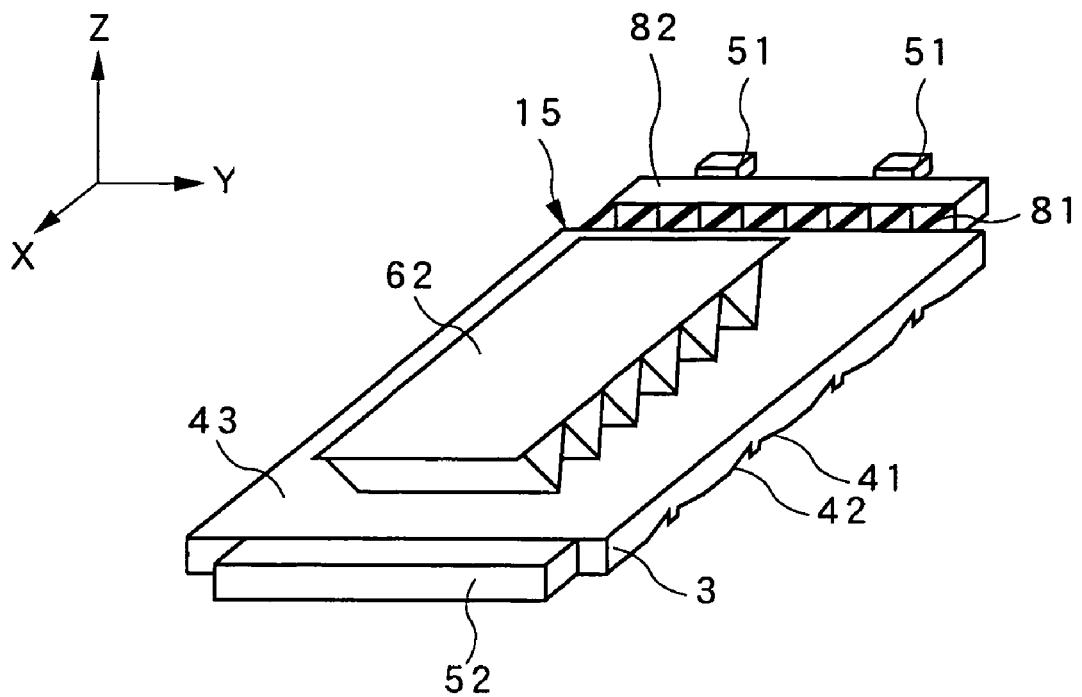
FIG. 57 is a perspective view when a diffusion light guide plate for turning a point light source to a line light source is provided between the narrow-view light source and a louver structure.

A light source apparatus according to the fifth embodiment of the invention will be described next. FIG. 54 is a perspective view of a light source apparatus 15 according to the fifth embodiment, FIG. 55 is a cross-sectional view of a display apparatus 23 along the XZ plane which uses the light source apparatus 15 according to the fifth embodiment, and FIG. 56 is a perspective view of a terminal device in which the display apparatus 23 using the light source apparatus 15 according to the fifth embodiment is mounted. As shown in FIGS. 54 and 55, the light source apparatus 15 of the fifth embodiment differs from the fourth embodiment in that a louver structure 81 is provided between the narrow-view light source 51 and the light guide plate 3 as compared with the light source apparatus 14 (see FIG. 51) according to the fourth embodiment. The louver structure 81 has, for example, a plurality of plate members arranged in parallel to the XZ plane and laid out in the Y-axial direction. The louver structure 81 enhances the directivity in the X-axial direction for the light output from the light source 51. A specific example of the louver structure 81 is a louver film.

As shown in FIG. 55, the display apparatus 23 using the light source apparatus 15 according to the fifth embodiment is provided with the transparent liquid crystal panel 7. As shown in FIG. 56, the display apparatus 23 is mounted in, for example, the cellular phone 9. The horizontal direction and the vertical direction of the cellular phone 9 are so set as to be the X-axial direction and the Y-axial direction of the light source apparatus, respectively. That is, the two light sources are laid out above and below the display screen in the up and down direction.

According to the embodiment, switching of the angular range of the illuminated light in the X direction which is the up and down direction of the portable terminal device is achieved by using a difference in optical effect between the two inclined surfaces 41 and 42, and the prism sheet 62 by selectively turning on the light source 51 or 52, as has been explained in the description of the second embodiment. Switching of the angular range of the illuminated light in the Y direction which is the transverse direction of the portable terminal device is achieved by using the effect of causing different directivities depending on whether or not the light from the light source transmits the louver structure 81 by selectively turning on the light source 51 or 52. That is, when the narrow-view light source 51 is turned on, the light emitted from the light source 51 is input to the light guide plate 3 after its directivity in the X direction is enhanced by the louver structure 81. As each of the light guide plate 3 and the prism sheet 62 has a one-dimensional structure having its components laid out continuously in the Y direction, there is no effect of diffusing light in the Y-axial direction. As a result, the directivity can be enhanced in the X direction and the Y direction. When the wide-view light source 52 is turned on, on the other hand, the light emitted from the light source 52 is directly input to the light guide plate 3 without going through the louver structure 81, and the light is diffused in the XY plane. Accordingly, the light source apparatus can illuminate over a wide range both in the X-axial direction and the Y-axial direction. Apparently, the embodiment can realize a light source apparatus capable of changing the angular range of the illuminated two-dimensionally in the X-axial direction and the Y-axial direction.

As all the components are realized in a one-dimensional structure and the angular range of the illuminated light is changed two-dimensionally in the embodiment, a high performance light source apparatus can be realized at a low cost. Because the louver structure is laid out between the narrow-view light source and the light guide plate, the thickness of the light source apparatus does not increase. Further, although some of the rays of light emitted from the narrow-view light source are absorbed by the louver structure, reducing the efficiency, the light is converged in a narrow range when the narrow-view light source is turned on, so that the reduced efficiency has a little influence. When the wide-view light source is turned on, the efficiency is important for a wide range is illuminated. The efficiency in this case does not however drop because there is no louver structure between the wide-view light source and the light guide plate. The light source apparatus of the embodiment, which can be suitably adapted to a portable terminal device, such as a cellular phone, has two light sources laid out above and below the display screen, and can therefore be suitably used in, particularly, a cellular phone as per the first embodiment of the invention.

When a point light source, such as an LED, is used as the narrow-view light source, a diffusion light guide plate 82 for turning a point light source to a line light may be provided between the narrow-view light source 51 and the louver structure 81. This can reduce uneven brightness originating from the location of the point light source. In the embodiment, a reflector may be arranged so as to face the light diffusion surface 44 of the light guide plate 3 as per the third embodiment. The other structure and the operation of the light source apparatus 15 of the embodiment are the same as those of the light source apparatus 1 of the first embodiment.

Figure 58:
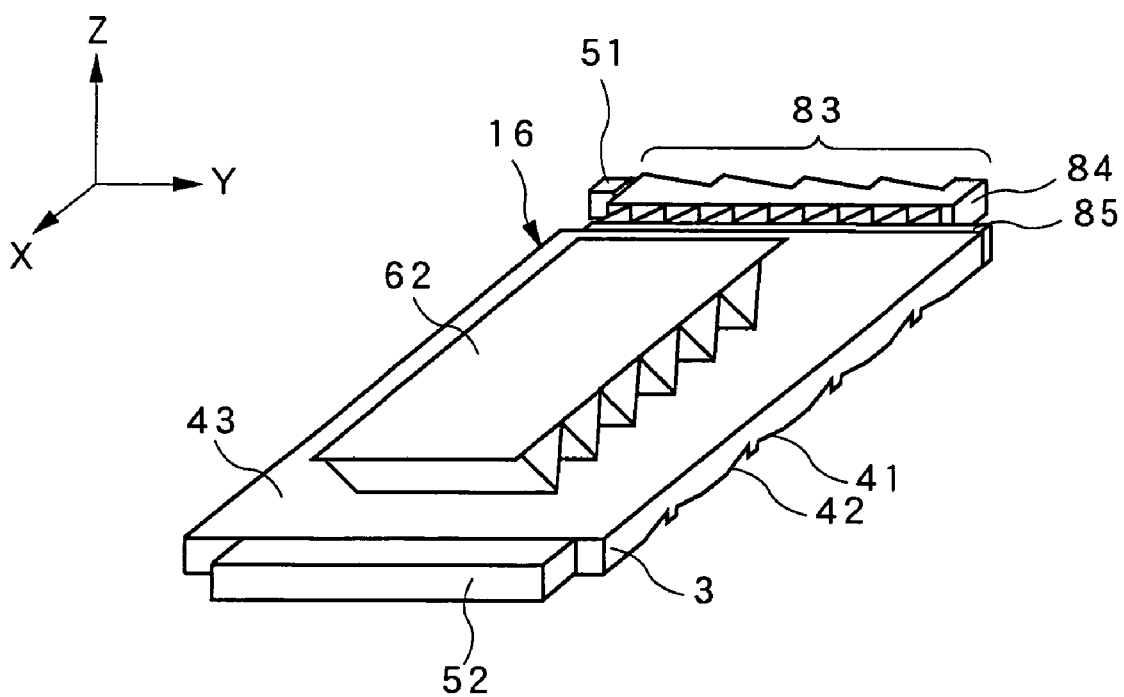
FIG. 58 is a perspective view of a light source apparatus according to a sixth embodiment of the invention.
Figure 59:
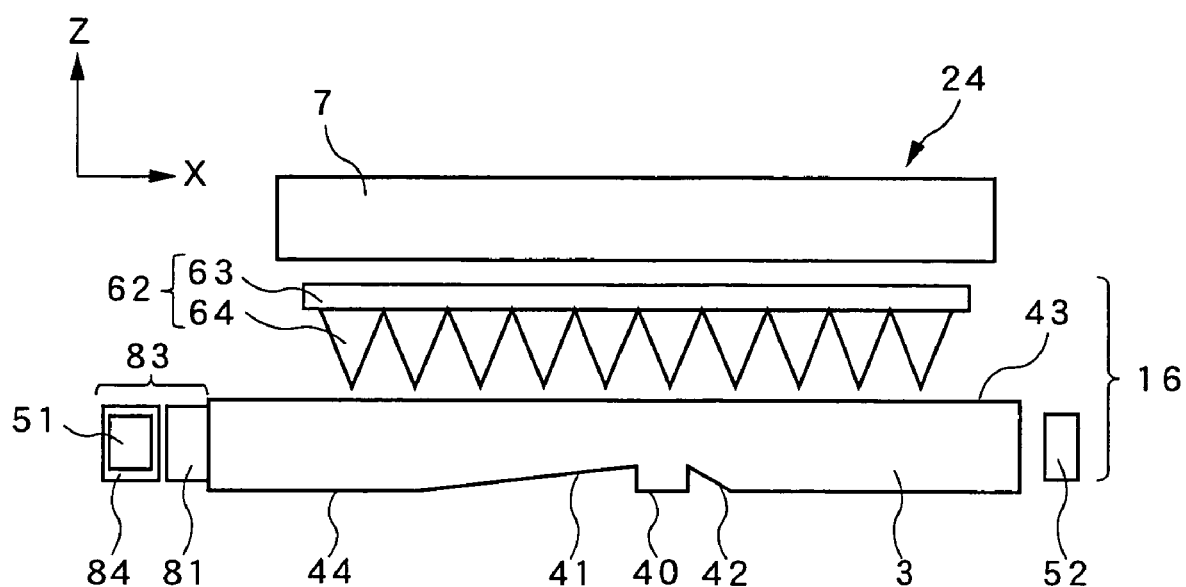
FIG. 59 is a cross-sectional view of a display apparatus along the XZ plane in which the light source apparatus according to the sixth embodiment of the invention is mounted.
Figure 60:
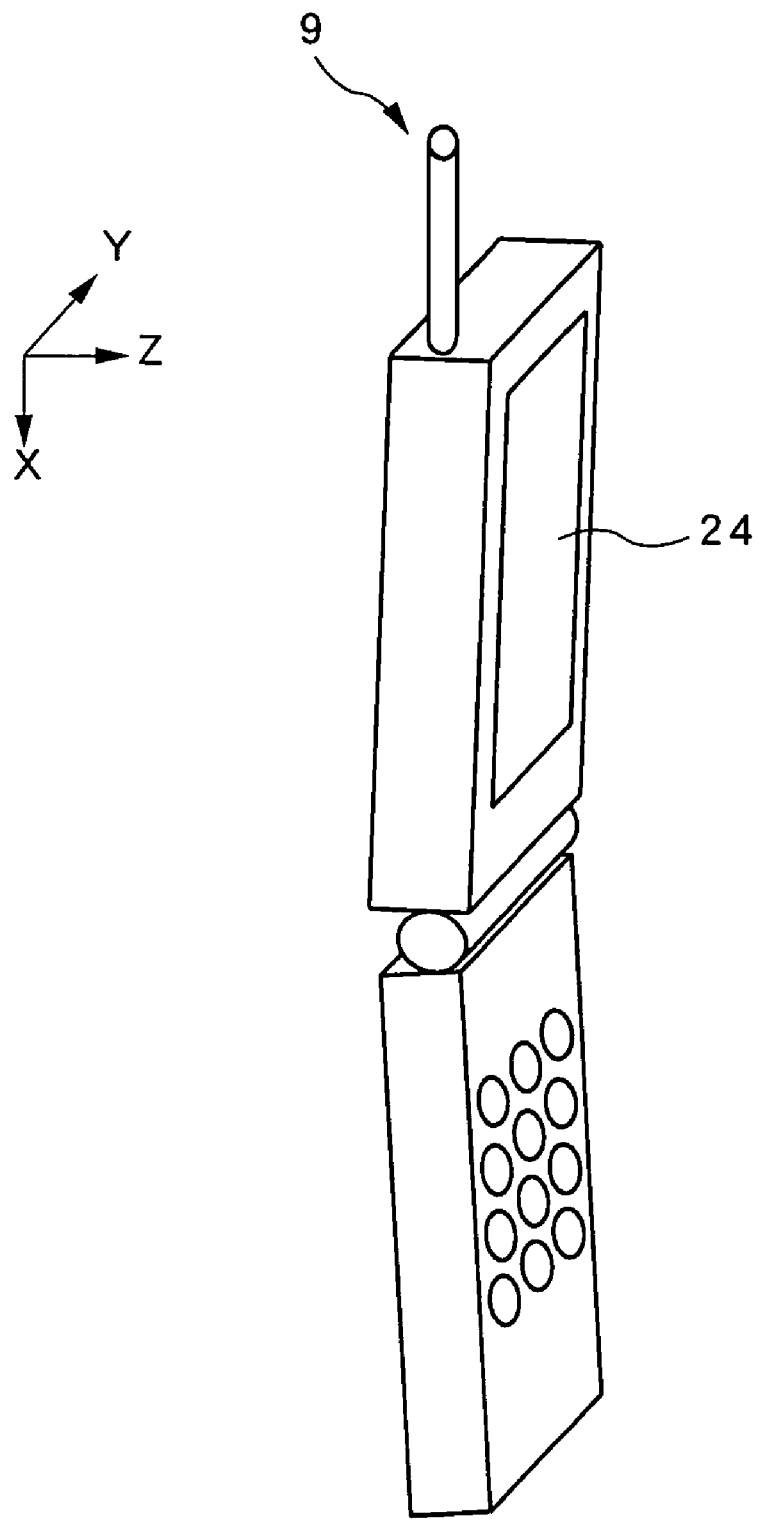
FIG. 60 is a perspective view of a terminal device in which the display apparatus using the light source apparatus according to the sixth embodiment of the invention is mounted.

Next, a light source apparatus according to the sixth embodiment of the invention will be described. FIG. 58 is a perspective view of a light source apparatus 16 according to the sixth embodiment, FIG. 59 is a cross-sectional view of a display apparatus 24 along the XZ plane which uses the light source apparatus 16, and FIG. 60 is a perspective view of a terminal device in which the display apparatus 24 using the light source apparatus 16 according to the sixth embodiment is mounted. As shown in FIGS. 58 and 59, the light source apparatus 16 according to the embodiment differs from the light source apparatus according to the fourth embodiment in that the narrow-view light source 51 is a point light source, such as an LED, and a guide rod 83 is provided on the optical path of the light source 51.

The light source 51 is laid out at the −Y-directional position on the −X-directional side as seen from the light guide plate 3, and emits light in the +Y direction. The guide rod 83 comprises a guide-rod light guide plate 84 located at a position where the light source 51 irradiates light, i.e., in the +Y direction as seen from the light source 51, and a one-dimensional prism member 85 laid out in the +X direction as seen from the guide-rod light guide plate 84, i.e., between the guide-rod light guide plate 84 and the light guide plate 3. A plurality of inclined surfaces with an inclination angle of 6 degrees are formed on the YZ plane of the guide-rod light guide plate 84 on the -X-directional side. The inclined surfaces are laid out in the Y-axial direction. The inclined surfaces are illuminated with the light emitted from the light source 51. A plurality of prisms which protrude toward the guide-rod light guide plate 84 and whose ridge lines extend in the Z-axial direction are laid out in the one-dimensional prism member 85 in the Y-axial direction.

As shown in FIG. 59, the display apparatus 24 using the light source apparatus 16 according to the sixth embodiment is provided with the transparent liquid crystal panel 7. As shown in FIG. 60, the display apparatus 24 is mounted in, for example, the cellular phone 9. The horizontal direction and the vertical direction of the cellular phone 9 are so set as to be the X-axial direction and the Y-axial direction of the light source apparatus, respectively. That is, the two light sources are laid out above and below the display screen in the up and down direction.

The basic principle of the guide rod 83 is the same as the principle of high directivity when the narrow-view light source is turned on, which has been discussed in the foregoing description of the first embodiment of the invention. The light from the narrow-view light source 51 is input to the guide-rod light guide plate 84, and propagates in the guide-rod light guide plate 84 while repeating total reflection. When the light is input to the inclined surfaces with an inclination angle of 6 degrees during propagation, however, the light is output from the guide-rod light guide plate 84 with strong directivity in the direction inclined by 60 degrees in the X-axial direction. The output rays of light are input to the one-dimensional prism member 85, changing the traveling direction by the prism structure, and are input to the light guide plate 3 with a strong directivity nearly in the X-axial direction. Accordingly, the light from the narrow-view light source 51 has a strong directivity in the X direction. As each of the light guide plate 3 and the prism sheet 62 has a one-dimensional structure having its components laid out continuously in the Y direction, there is no effect of diffusing light in the Y direction. As a result, the directivity can be enhance in the X direction and the Y direction. When the wide-view light source 52 is turned on, the light emitted from the light source 52 is directly input to the light guide plate 3 because of no guide rod intervening in the optical path, and the light is diffused in the XY plane as explained in the description of the first embodiment of the invention. Accordingly, the light source apparatus can illuminate over a wide range both in the X direction and the Y direction. Apparently, the embodiment can realize a light source apparatus capable of changing the angular range of the illuminated light two-dimensionally in the X direction and the Y direction without using the conical sheet. The other structure and the operation of the embodiment are the same as those of the first embodiment.

As all the components are realized in a one-dimensional structure and the angular range of the illuminated light is changed two-dimensionally in the embodiment, a high performance light source apparatus can be realized at a low cost. The reduction in efficiency originating from the louver structure does not occur because there is no louver structure of the fifth embodiment. The light source apparatus of the embodiment, which can be suitably adapted to a portable terminal device, such as a cellular phone, has two light sources laid out above and below the display screen, and can therefore be suitably used in, particularly, a cellular phone as per the first embodiment of the invention. Particularly, the guide-rod light guide plate can reduce its thickness in the X-axial direction, so that the X-directional size of the light source apparatus can be made small.

A reflector may be arranged at that position of the light guide plate 3 which faces the light diffusion surface 44 as per the third embodiment. The reflector may be provided so as to face that side of the guide-rod light guide plate 84 where the inclined surface is formed. Further, the one-dimensional prism member 85 may be formed integral with the light input side of the light guide plate 3 where the light from the narrow-view light source 51 is input. This can reduce the number of constituting parts, thus ensuring further cost reduction. The protruding direction of the prism portion of the one-dimensional prism member may be inclined as per the second embodiment of the invention. The mode of the guide rod 83 is not limited to the one in the embodiment, but a light guide plate having an effect of enhancing the directivity can be used as well. The embodiment may be combined with the fourth embodiment of the invention.

Figure 61:
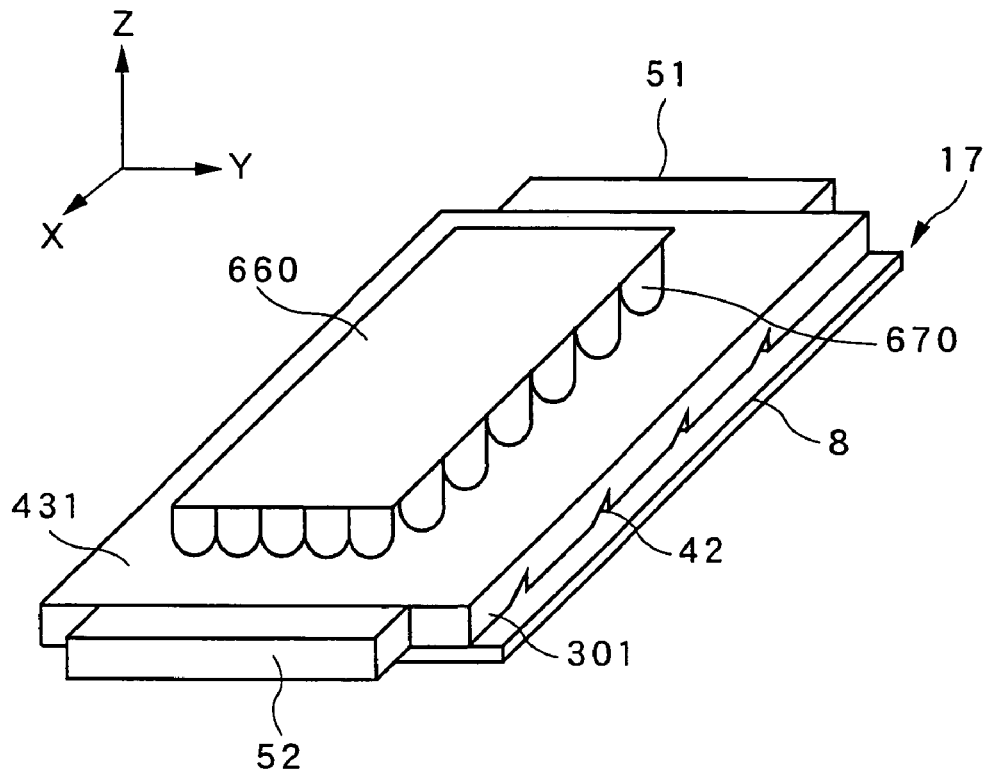
FIG. 61 is a perspective view of a light source apparatus according to a seventh embodiment of the invention.

Next, a light source apparatus according to the seventh embodiment of the invention will be described. FIG. 61 is a perspective view of a light source apparatus 17 according to the seventh embodiment, FIG. 62 is a cross-sectional view of a display apparatus 25 along the XZ plane in which the light source apparatus 17 is mounted, and FIG. 63 is a perspective view of a terminal device in which the display apparatus 25 using the light source apparatus 17 is mounted.

Figure 62:
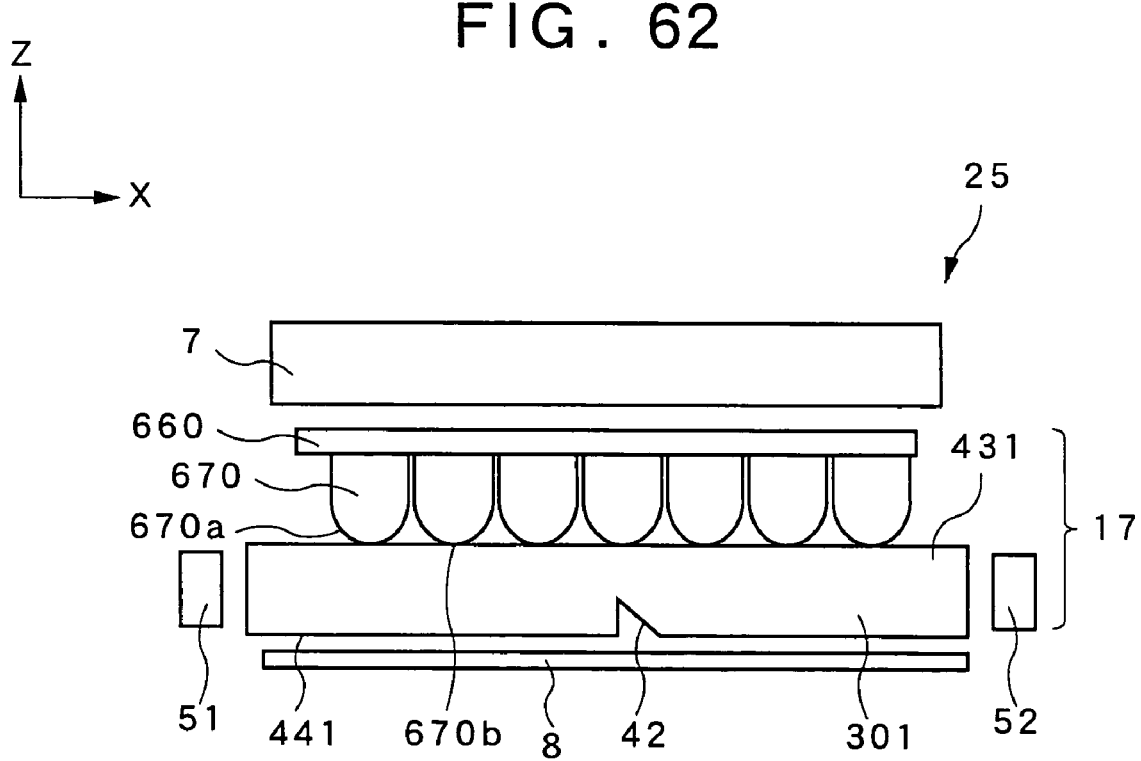
FIG. 62 is a cross-sectional view of a display apparatus along the XZ plane in which the light source apparatus is mounted.
Figure 63:
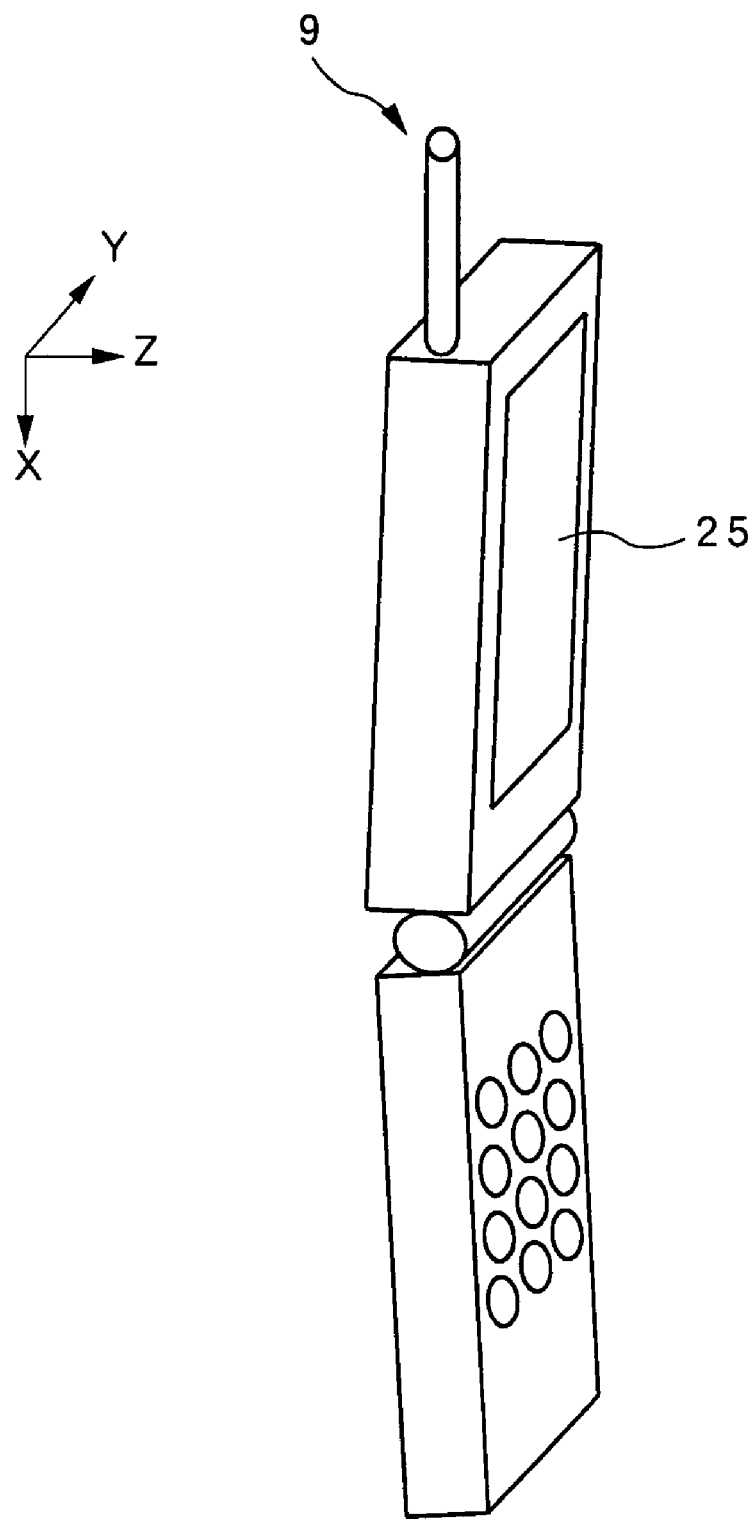
FIG. 63 is a perspective view of a terminal device in which the display apparatus using the light source apparatus is mounted.

As shown in FIGS. 61 and 62, the light source apparatus 17 of the embodiment, unlike the light source apparatus 12 (see FIG. 35) according to the third embodiment, is provided with a light guide plate 301 in place of the light guide plate 3 and an output light control sheet 660 in place of the conical sheet 61. Protruding portions 670 are formed on the light guide plate (301) side of the output light control sheet 660. The shape of the output light control sheet 660 includes a part of a sphere or an oval sphere, and vertexes 670b are optically in contact with a light output surface 431 of the light guide plate 301. The side extending from the vertex 670b of each protruding portion 670 to the fringe portion serves as a reflection surface 670a which reflects the light, output from the light output surface 431 of the light guide plate 301, passing the vertex 670b and input to the protruding portion 670, in the frontward direction (+Z direction). The cross-sectional shape of the reflection surface 670a by the XY plane is circular. Only the inclined surface 42 inclined in the direction in which the light emitted from the wide-view light source 52 and propagated inside the light guide plate 301 in the −X direction, is irradiated is formed at a light diffusion surface 441 of the light guide plate 301, and the inclined surface 41 (see FIG. 35) is not formed. The light guide plate 301 and the output light control sheet 660 constitute an optical unit.

As shown in FIG. 62, the display apparatus 25 using the light source apparatus 17 according to the seventh embodiment is provided with the transparent liquid crystal panel 7 arranged on the light output surface side of the light source apparatus 17. As shown in FIG. 63, the display apparatus 25 is mounted in, for example, the cellular phone 9. The display apparatus 25 is laid out in the cellular phone 9 in such a way that the horizontal direction and the vertical direction of the display screen of the cellular phone 9 respectively become the X-axial direction and the Y-axial direction of the light source apparatus 17. That is, the two light sources 51 and 52 are laid out in the transverse direction of the display screen of the cellular phone 9. The other structure of the embodiment is the same as the corresponding structure of the third embodiment.

Figure 64:
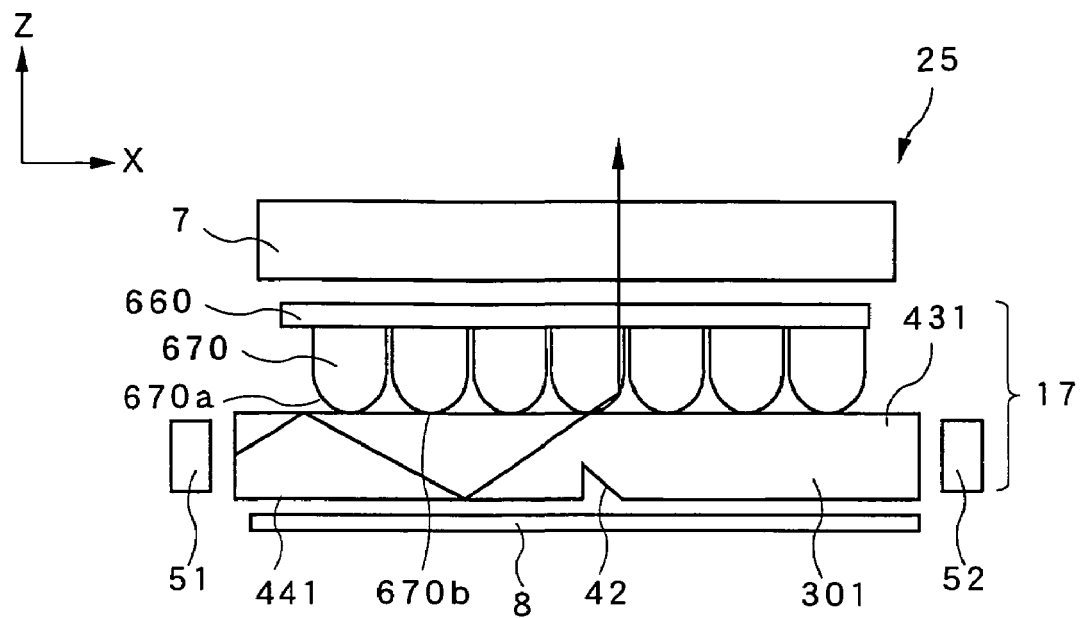
FIG. 64 is an optical model diagram illustrating the behavior of light when the narrow-view light source is turned on according to the seventh embodiment of the invention.
Figure 65:
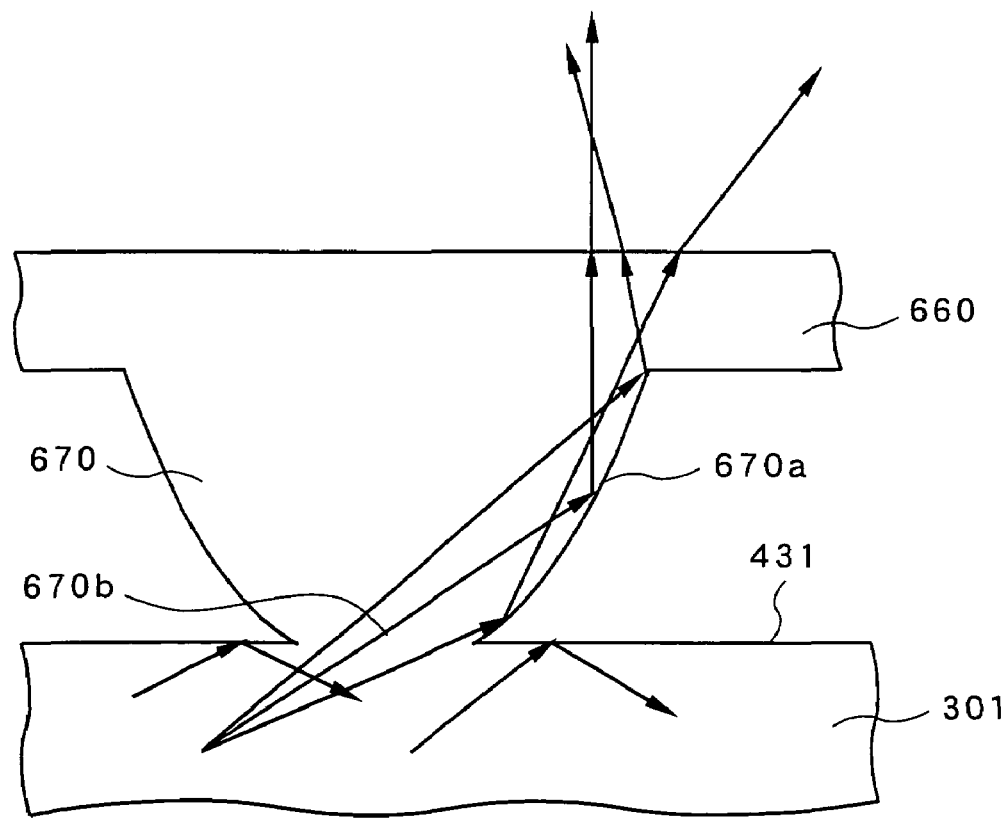

The operation of the thus constituted light source apparatus 17 of the embodiment will be explained next. FIG. 64 is an optical model diagram illustrating the behavior of light when the narrow-view light source is turned on, FIG. 65 is a partly enlarged cross-sectional view illustrating the behavior of light near the protruding portion when the narrow-view light source is turned on, FIG. 66 is a perspective view of the protruding portion, and FIG. 67 is an optical model diagram illustrating the behavior of light when the wide-view light source is turned on.

First, a description will be given of the case where the narrow-view light source is turned on. As shown in FIG. 64, the light emitted from the narrow-view light source 51 is input to the light guide plate 301 and propagates in the light guide plate 301. When the light propagating in the light guide plate 301 is irradiated on the area on the light output surface 431 that does not contact the vertexes 670b of the protruding portions 670 of the output light control sheet 660, the light is totally reflected at the light output surface 431 and keeps propagating in the light guide plate 301. When the light propagating in the light guide plate 301 is irradiated on the area on the light output surface 431 that contacts the vertexes 670b of the protruding portions 670 of the output light control sheet 660, the light is led into the vertexes 670b via the protruding portions 670, is reflected at the reflection surfaces 670a or the inner surfaces of the protruding portions 670, and are output in the direction close to the +Z direction, as shown in FIGS. 64 and 65. The reflection at the reflection surface 670a, like the reflection at the inner surface of the cone in the first embodiment, is total reflection using a difference in refractive index between the protruding portion 670 and the air.

Figure 66:
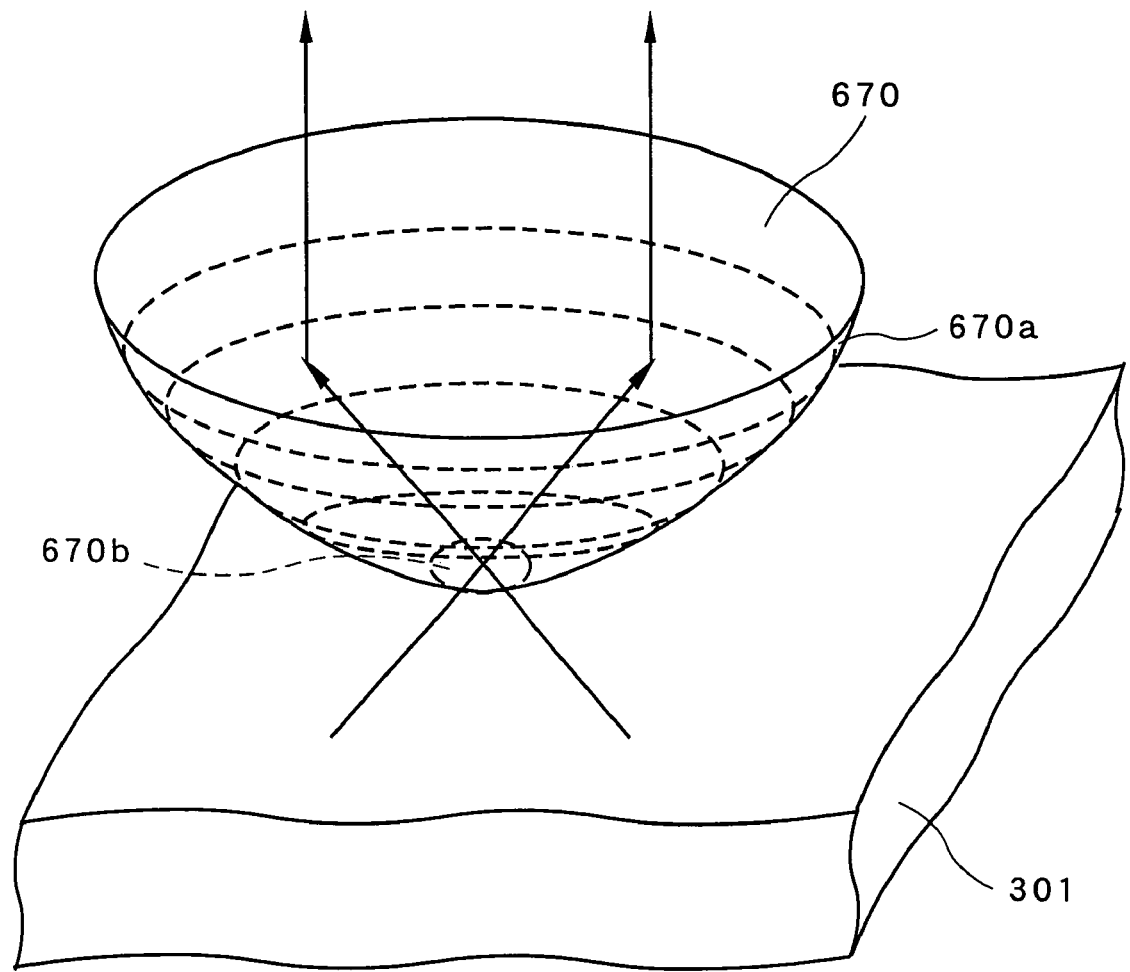
FIG. 66 is a perspective view of the protruding portion.
Figure 67:
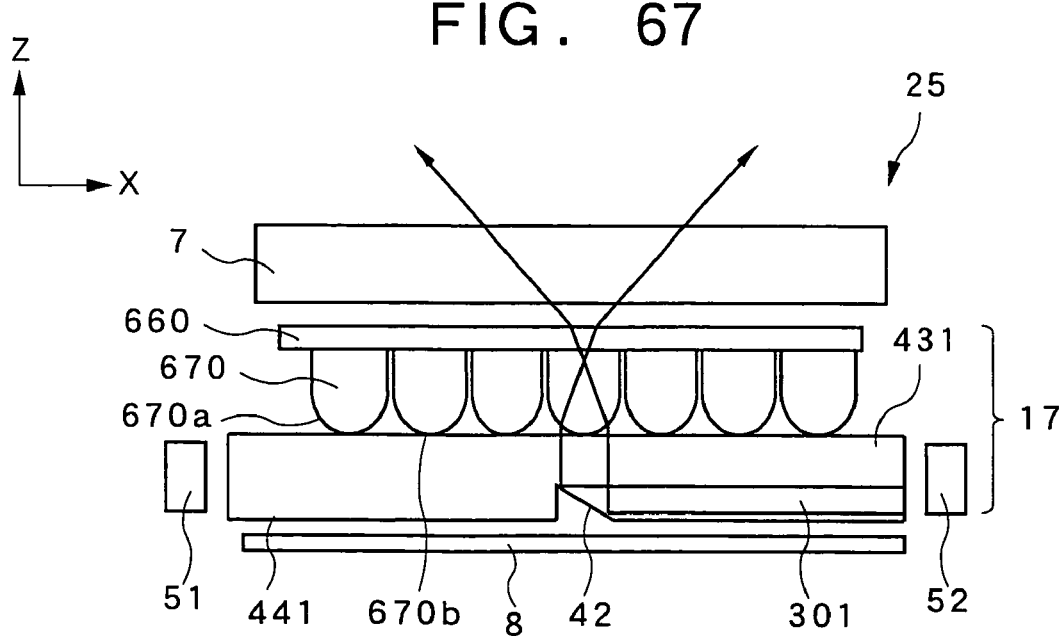
FIG. 67 is an optical model diagram illustrating the behavior of light when the wide-view light source is turned on according to the seventh embodiment of the invention.

At this time, the reflection surface 670a of the protruding portion 670 is a curved surface as shown in FIG. 66, and the cross-sectional shape by the XY plane is arcuate. The reflection surface 670a can reflect rays of light output from mutually separate positions of the light source 51 in approximately the same direction, i.e., in the +Z direction.

The rays of light input to the vertical portion of the light diffusion surface 441 of the light guide plate 301 between the inclined surface 42 and the flat surface 40 partly go out of the light guide plate 301, but re-enter the light guide plate 301 from the inclined surface 42, and propagate in the light guide plate 301 again. In this manner, the output characteristic of the light source apparatus when the narrow-view light source 51 is turned on has a strong directivity in the frontward direction, so that the illumination range is restricted to a narrow angular range.

A description will now be given of the case where the wide-view light source is turned on. As shown in FIG. 67, the light emitted from the wide-view light source 52 is input to the light guide plate 301 and propagates in the light guide plate 301. This is the same as the case where the narrow-view light source 51 is turned on, except that when the wide-view light source 52 is turned on, the light source 52 illuminates the inclined surface 42 with a large inclination angle of 45 degrees. The light input to the light guide plate 301 propagates in the light guide plate 3 in the −X direction, is irradiated on the inclined surface 42, and is totally reflected at the inclined surface 42. The light traveling direction after total reflection is the +Z direction. At this time, the light irradiated on the inclined surface 42 does not go out of the light guide plate 301 from the inclined surface 42.

The light output from the light guide plate 301 in the +Z direction is input to the output light control sheet 660. At this time, the light is refracted at the reflection surface 670a of the protruding portion 670, and is scattered in various directions. Accordingly, the output characteristic of the light source apparatus when the wide-view light source is turned on permits illumination of a wide angular range.

The embodiment can realize a light source apparatus capable of changing the angular range of the illuminated light by switching the activation of the light sources. As the light output from the output light control sheet 660 of the light source apparatus 17 transmits the transparent liquid crystal panel 7, an image is added to the light. This can allow the image to be displayed on the display apparatus 25 of the cellular phone 9. If the narrow-view light source 51 is turned on at this time, the angular range where the image is visible can be narrowed so that only the user of the cellular phone 9 can view the image, preventing nearly people from peeking. If the wide-view light source 52 is turned, on the other hand, the angular range where the image is visible can be widened to permit plural viewers/listeners to view the image at a time.

According to the embodiment, as the vertexes 670b of the protruding portions 670 of the output light control sheet 660 are made in close contact with the light output surface 431 of the light guide plate 301, the clearance between the output light control sheet 660 and the light guide plate 301 is eliminated, thus making the light source apparatus thinner.

The vertical portion between the inclined surface 42 and the flat surface 40, i.e., the vertical portion adjoining the inclined surface 42 may be colored. While the coloring dye is not particularly limited as long as it can reduce light reflection at the vertical portion, an achromatic color, particularly, black can be used suitably. Accordingly, it is possible to suppress the stray light originating from the vertical portion, thus further improving the directivity of the light when the narrow-view light source is turned on.

Figure 68:
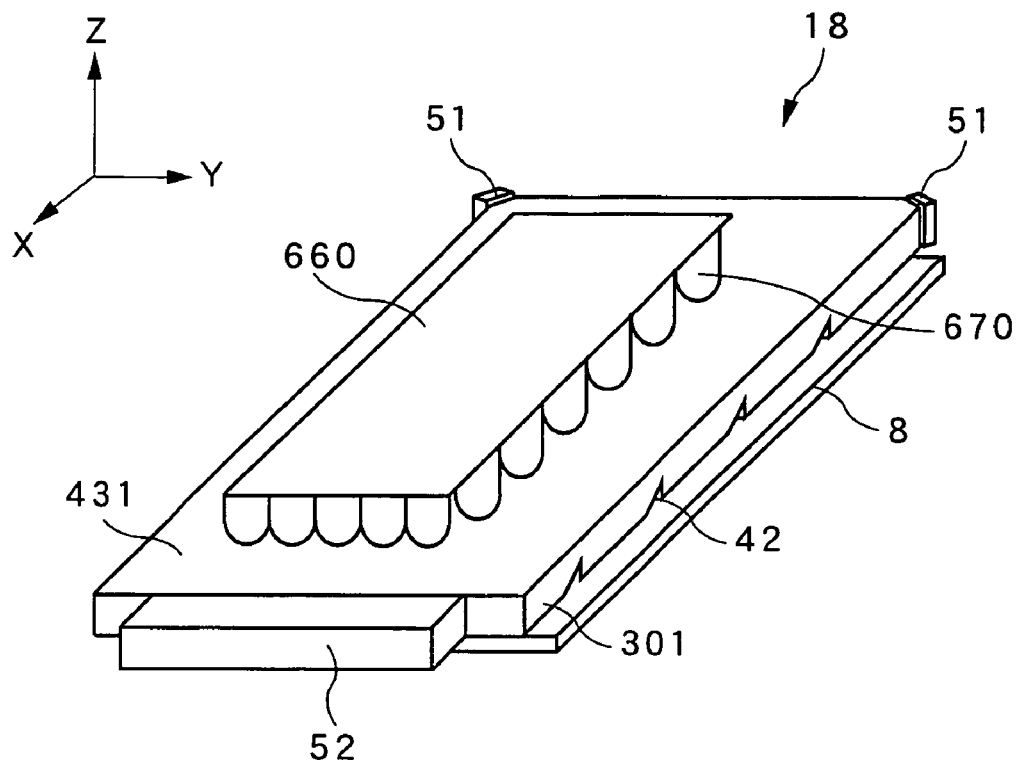
FIG. 68 is a perspective view of a light source apparatus according to an eighth embodiment of the invention.

Next, a light source apparatus according to the eighth embodiment of the invention will be described. FIG. 68 is a perspective view of a light source apparatus 18 according to the eighth embodiment. The light source apparatus 18 of the embodiment differs from the seventh embodiment in that the narrow-view light source 51 is a point light source like an LED, and two LEDs are located at the corner portions of the side of the light guide plate 301 which faces that side of the light guide plate 301 where the wide-view light source 52 is provided, one at a respective corner portion. The other structure of the embodiment is the same as the corresponding structure of the seventh embodiment.

The operation of the thus constituted light source apparatus 18 of the eighth embodiment will be explained next. First, a description will be given of the case where the narrow-view light source 51 is turned on. The light emitted from the narrow-view light source 51, located at the corner of the light guide plate 301, is input to the light guide plate 301 and propagates in the light guide plate 301. Because the narrow-view light source 51 is an LED, the angular range of the output light is wide so that the light propagates in the light guide plate 301 two-dimensionally in the XY plane. The light propagating in the light guide plate 301 enters the protruding portion 670 from the close contact portions of the protruding portion 670 of the output light control sheet 660, is reflected at the inner surfaces of the protruding portions 670, and is output in the direction close to the +Z direction, as per the seventh embodiment. As the cross-sectional shapes of the protruding portions 670 of the output light control sheet 660 are partly arcuate, therefore, the protruding portions 670 have the same reflection capability with respect to lights from different directions from a plurality of light sources laid out apart from one another on the light output surface. Accordingly, the output characteristic of the light source apparatus when the narrow-view light source is turned on has a strong directivity in the frontward direction and restricts the illumination range to a narrow angular range.

The operation when the wide-view light source is turned on is quite the same as is done in the seventh embodiment. The embodiment can realize a light source apparatus capable of changing the angular range of the illuminated light by switching the activation of the light sources.

As the narrow-view light sources are located at the corner portions of the light guide plate in the embodiment, it is unnecessary to turn a point light source to a line light source. In addition, it is possible to improve the homogeneousness in the light output surface of the light source apparatus as compared with the case where a point light source is located on the side surface of the light guide plate.

Figure 69:
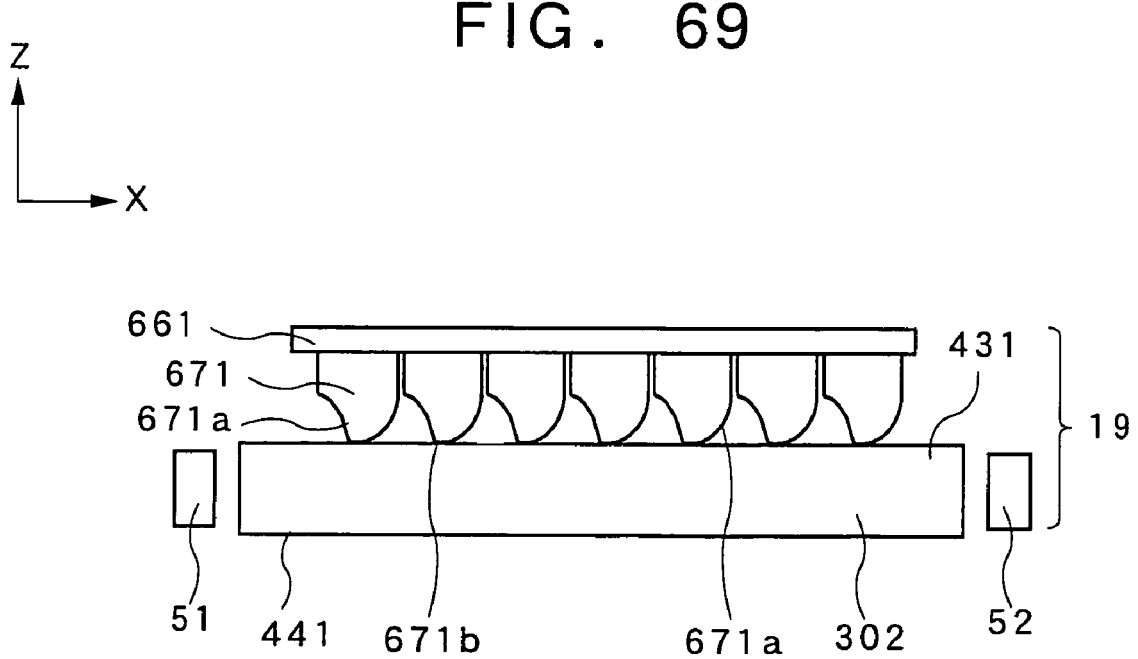
FIG. 69 is a cross-sectional view of a light source apparatus according to a ninth embodiment of the invention along the XZ plane.

Next, a light source apparatus according to the ninth embodiment of the invention will be described. FIG. 69 is a cross-sectional view of a light source apparatus 19 according to the ninth embodiment of the invention along the XZ plane. The light source apparatus 19 according to the embodiment differs from the light source apparatus according to the seventh embodiment in that the shape of protruding portions 671 of an output light control sheet 661 differs from the shape of the protruding portions 670 of the output light control sheet 660. Unlike the light guide plate 301 of the seventh embodiment, a light guide plate 302 is not provided with the inclined surface 42 (see FIG. 61), and has flat surfaces. Further, no reflection sheet is provided on the light diffusion surface (441) side of the light guide plate 302. The light guide plate 302 and the output light control sheet 661 constitute an optical unit. The other structure of the embodiment is the same as the corresponding structure of the seventh embodiment.

As shown in FIG. 69, the shape of the protruding portions 671 of the output light control sheet 661 according to the embodiment is such that the cross section of the protruding portion 671 as cut along the XZ plane including a vortex 671*b* of the protruding portion 671 is a reflection surface 671*a* comprising a downward protruding curved surface on the +X-directional side and has a light converging action with respect to the light output from the light source 51 as per the seventh embodiment. The −X-directional side, however, unlike the one in the seventh embodiment, is a scattering surface 671*c* comprising an upward protruding curved surface, and has a scattering action with respect to the light output from the light source 52.

Figure 70:
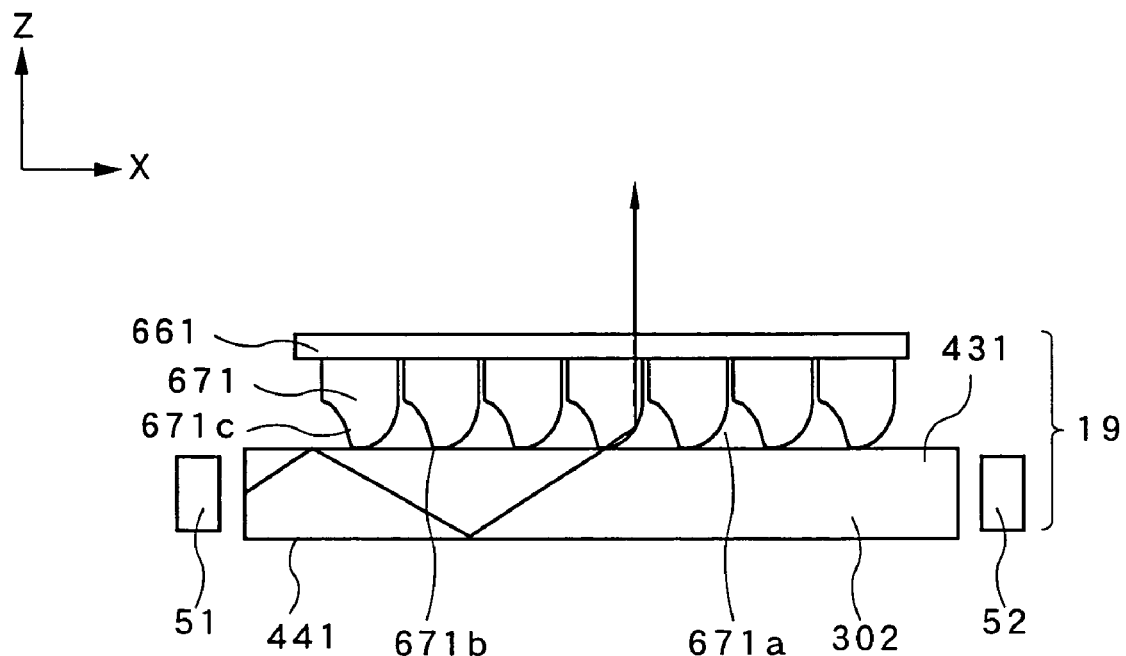
FIG. 70 is an optical model diagram illustrating the behavior of light when the narrow-view light source is turned on according to the ninth embodiment of the invention.
Figure 71:
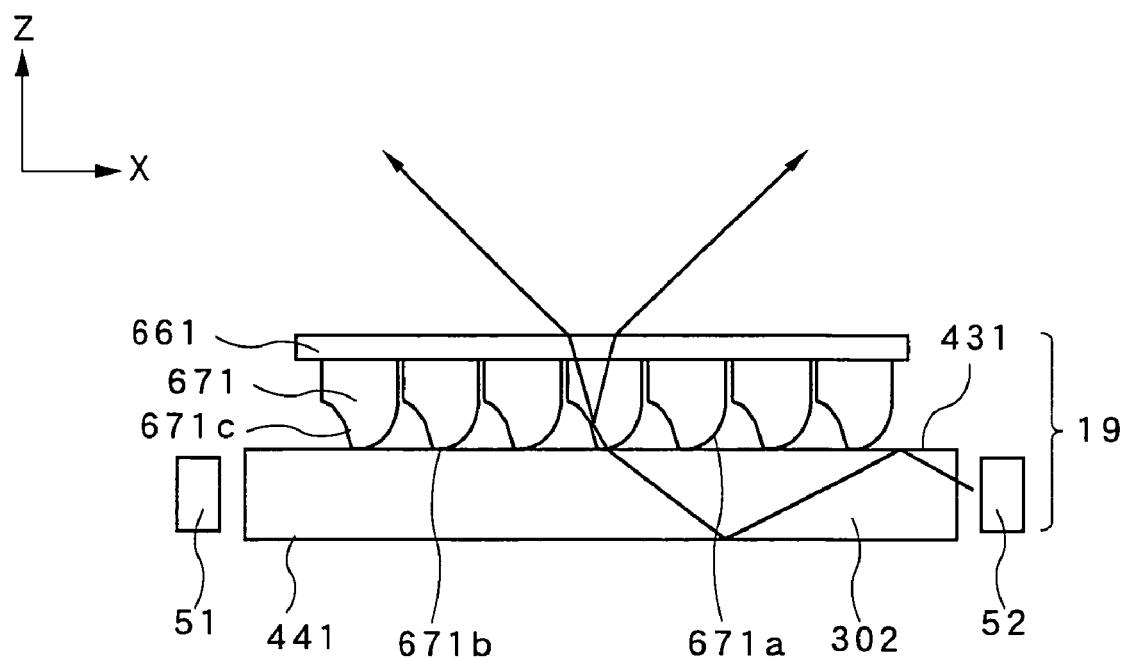
FIG. 71 is an optical model diagram illustrating the behavior of light when the wide-view light source is turned on according to the ninth embodiment of the invention.

The operation of the thus constituted light source apparatus 19 of the embodiment will be explained next. FIG. 70 is an optical model diagram illustrating the behavior of light when the narrow-view light source is turned on, and FIG. 71 is an optical model diagram illustrating the behavior of light when the wide-view light source is turned on. As shown in FIG. 70, the operation when the narrow-view light source is turned on is basically the same as that of the seventh embodiment. As the light guide plate 302 has no inclined surface formed thereon in the ninth embodiment, however, no light is basically output from the light diffusion surface 441 of the light guide plate 302. It is therefore unnecessary to provide a reflection sheet on the −Z-directional side of the light diffusion surface 441.

Next, a description will be given of the case where the wide-view light source is turned on. As shown in FIG. 71, the light emitted from the wide-view light source 52 is input to the light guide plate 302 and propagates in the light guide plate 302 in the −X direction. When the light propagating in the light guide plate 302 is irradiated on the area on the light output surface 431 that does not contact the vertexes 671*b* of the protruding portions 671, the light is totally reflected at the light output surface 431 and propagates in the light guide plate 302 again. When the light propagating in the light guide plate 302 is irradiated on the area on the light output surface 431 that contacts the vertexes 671*b* of the protruding portions 671, the light is led into the vertexes 671*b* via the protruding portions 671, is irradiated on the scattering surfaces 671*c* on the inner surfaces of the protruding portions 671, and is reflected at the scattering surface 671*c* to be scattered. That is, the light emitted from the wide-view light source 52 is irradiated on the curved surface protruding frontward, and is scattered in various directions by the curved surface. The output characteristic of the light source apparatus when the wide-view light source is turned on ensures illumination over a wide angular range.

The embodiment can change the angular range of the output lights by making, different from one another, the shapes of the side surfaces of the protruding portions of the output light control sheet where the lights from the respective light sources are irradiated by switching the activation of the light sources. As a result, the scattering characteristic when the wide-view light source is turned on can be set more freely.

The foregoing description of the light source apparatus of the embodiment has been given of the example where the light guide plate is provided with no inclined surfaces which are illuminated with the lights from the narrow-view light source and the wide-view light source, or is provided with no reflection sheet. The protruding portions which have asymmetrical shapes which characterizes the embodiment may be adequately combined with the light guide plate formed with inclined surfaces and the reflection sheet. If the inclined surfaces which are illuminated with the light from the wide-view light source are formed on the light guide plate, particularly, the efficiency of acquiring the light from the light guide plate when the wide-view light source is turned on can be improved, thus improving the luminance.

Figure 72:
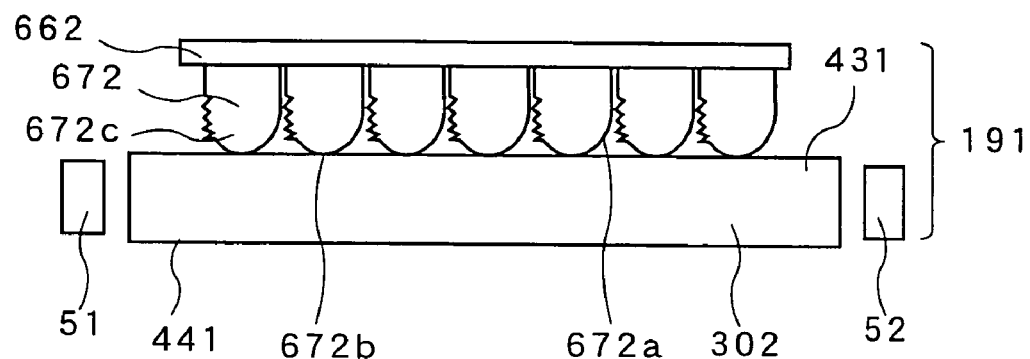
FIG. 72 is a cross-sectional view of a light source apparatus according to a tenth embodiment of the invention along the XZ plane.

Next, a light source apparatus according to the tenth embodiment of the invention will be described. FIG. 72 is a cross-sectional view of a light source apparatus 191 according to the tenth embodiment along the XZ plane. The light source apparatus 191 according to the embodiment differs from the light source apparatus according to the ninth embodiment in that an output light control sheet 662 is provided in place of the output light control sheet 661 (see FIG. 69), and a scattering surface 672c of each protruding portion 672 on the output light control sheet 662 has a rough surface. The light guide plate 302 and the output light control sheet 662 constitute an optical unit. The other structure of the embodiment is the same as the corresponding structure of the ninth embodiment.

As shown in FIG. 72, the shape of the protruding portions 672 of the output light control sheet 662 according to the embodiment is such that the cross section of the protruding portion 672 as cut along the XZ plane including a vortex 672b of the protruding portion 672 differs between the +X side and the −X side. The +X side is a reflection surface 672a comprising a downward protruding curved surface, as per the ninth embodiment. The −X-directional side, however, unlike the one in the ninth embodiment, is a scattering surface 672c comprising a rough surface.

Figure 73:
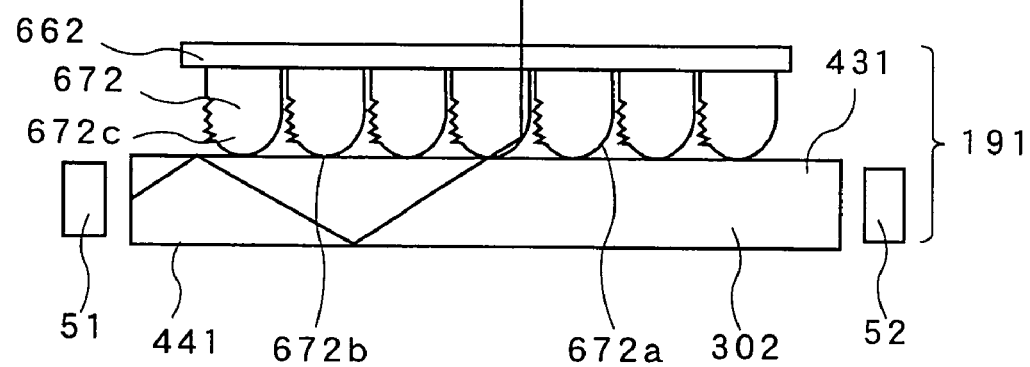
FIG. 73 is an optical model diagram illustrating the behavior of light when the narrow-view light source is turned on according to the tenth embodiment of the invention.
Figure 74:
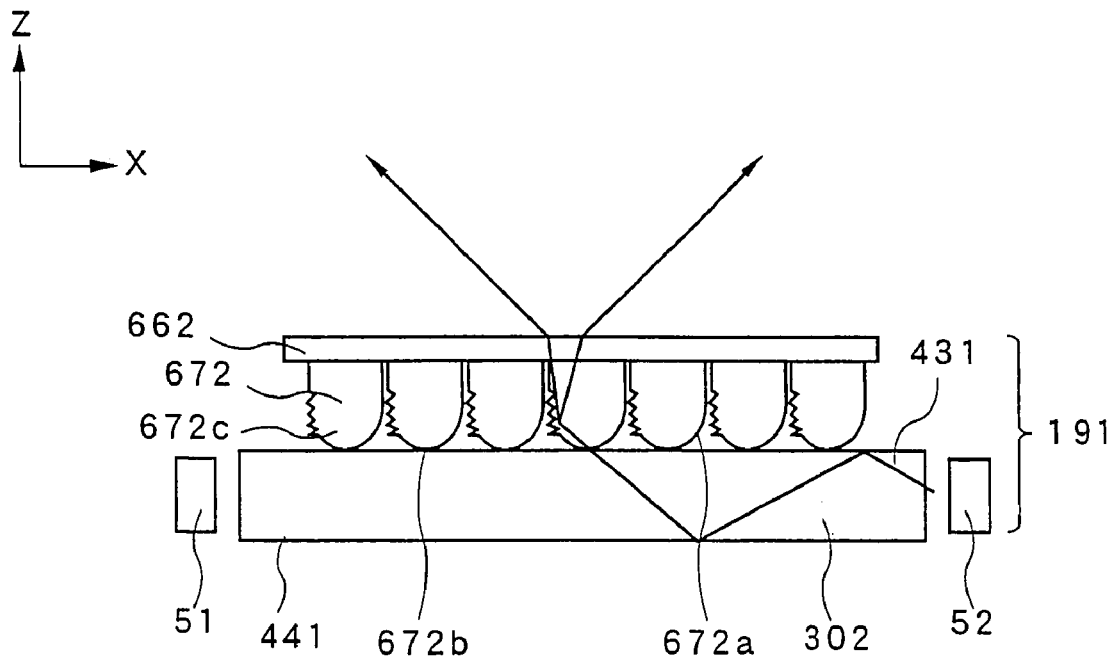
FIG. 74 is an optical model diagram illustrating the behavior of light when the wide-view light source is turned on according to the tenth embodiment of the invention.
Figure 75:
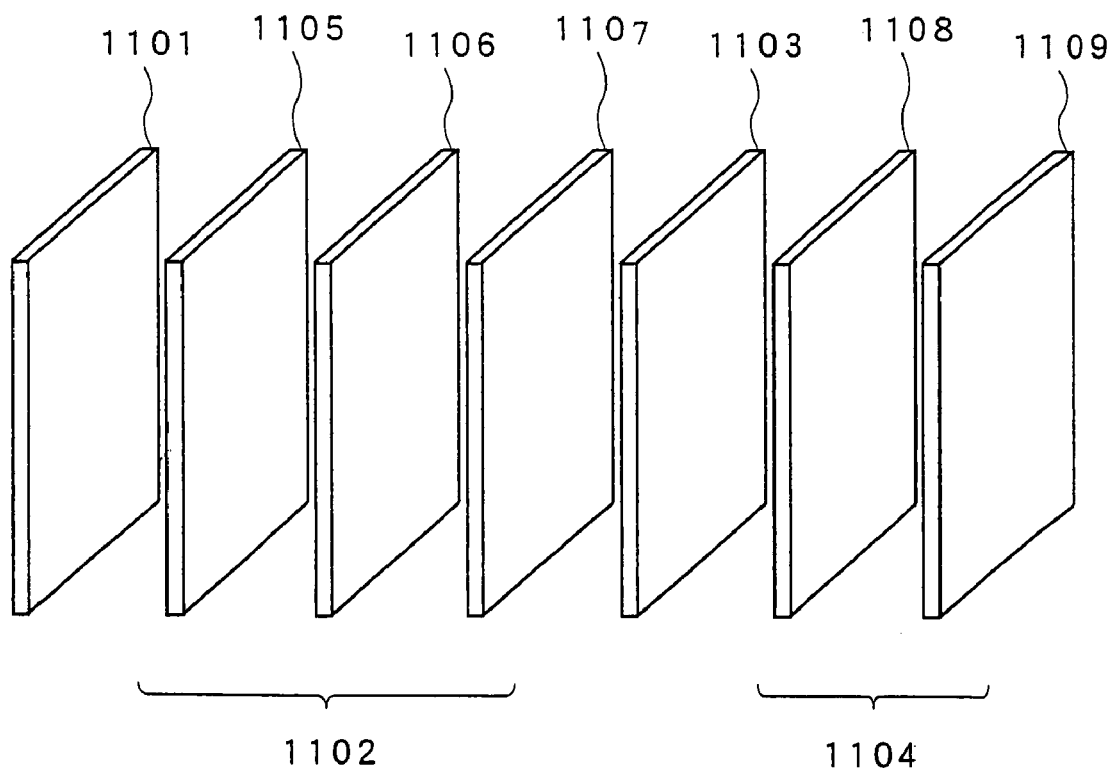
FIG. 75 is a perspective view of the view-angle controlled display apparatus described in Patent Literature 1.
Figure 76A:
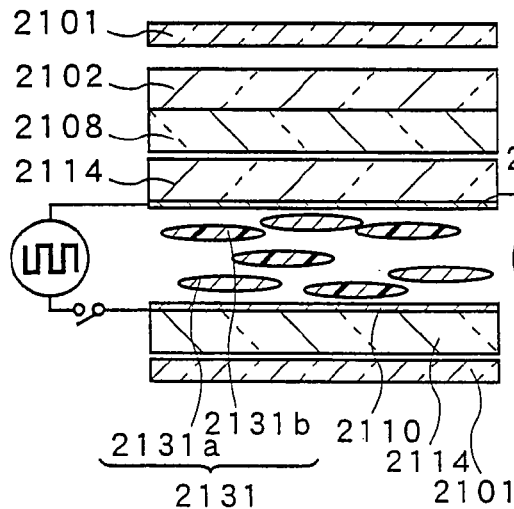
FIGS. 76A and 76B are cross-sectional views of the view-angle controlled display apparatus described in Patent Literature 2, respectively showing when no voltage is applied and when a voltage is applied.
Figure 76B:
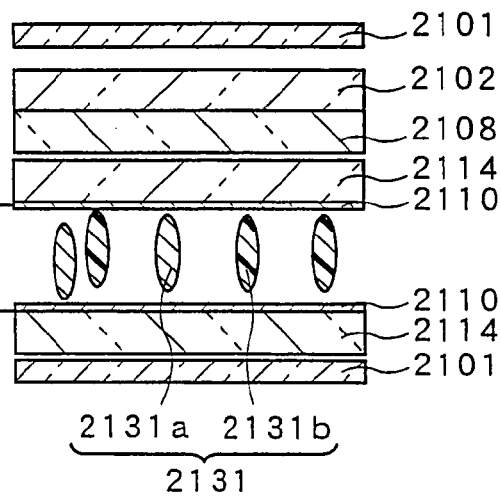
Figure 77:
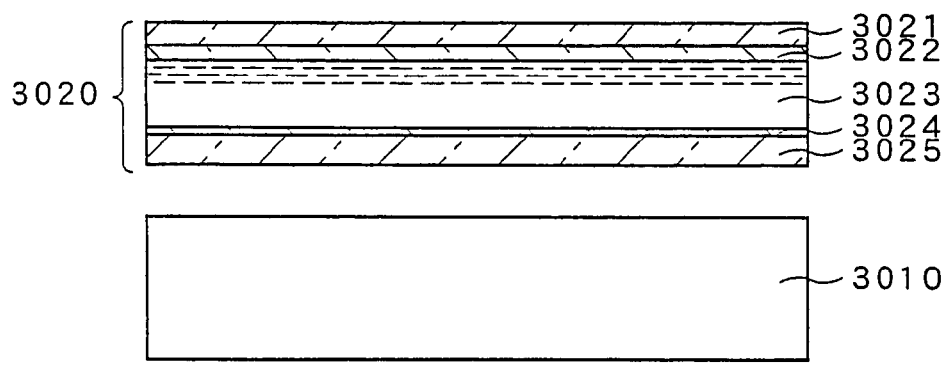
FIG. 77 is a cross-sectional view of the view-angle controlled display apparatus described in Patent Literature 3.
Figure 78:
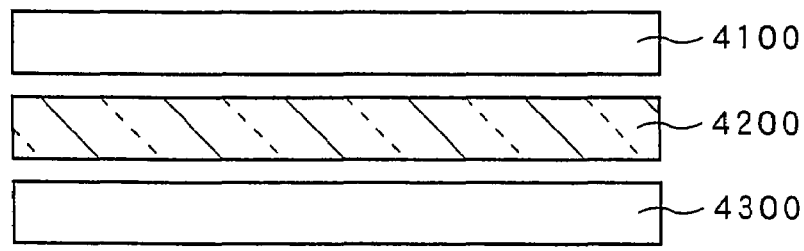
FIG. 78 is a cross-sectional view of the view-angle controlled display apparatus described in Patent Literature 4.
Figure 79:
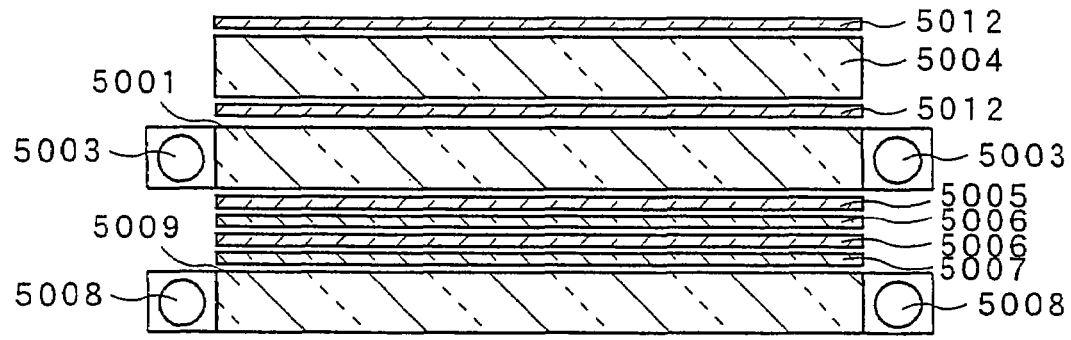
FIG. 79 is a cross-sectional view of the view-angle controlled display apparatus described in Patent Literature 5.
Figure 80:
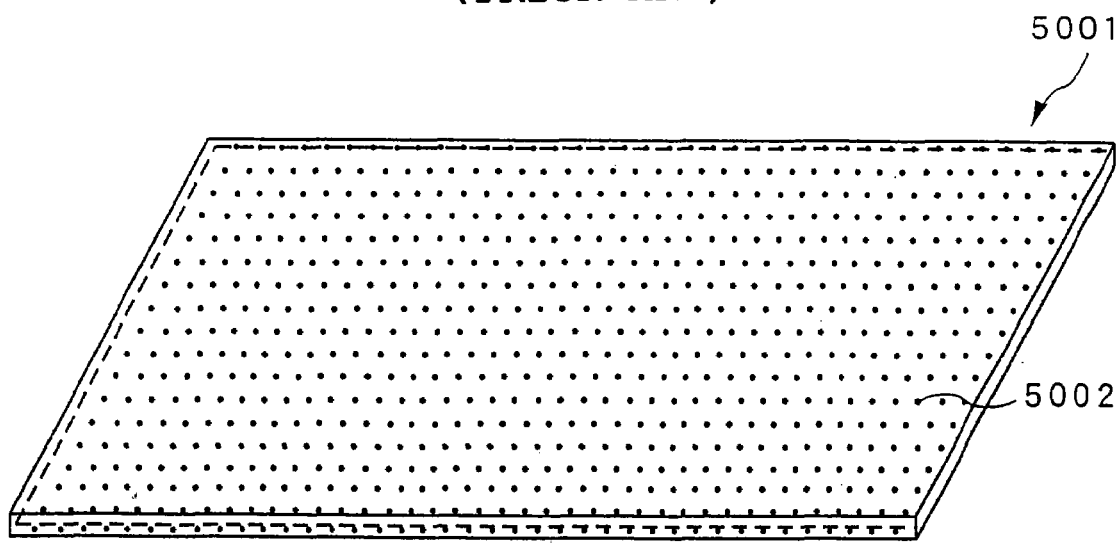
FIG. 80 is a perspective view of a diffusion light guide plate in the view-angle controlled display apparatus described in Patent Literature 5.

The operation of the thus constituted light source apparatus 191 of the embodiment will be explained next. FIG. 73 is an optical model diagram illustrating the behavior of light when the narrow-view light source is turned on, and FIG. 74 is an optical model diagram illustrating the behavior of light when the wide-view light source is turned on. As shown in FIG. 73, the operation when the narrow-view light source 51 is turned on is basically the same as that of the ninth embodiment.

Next, a description will be given of the case where the wide-view light source 52 is turned on. As shown in FIG. 74, the light emitted from the wide-view light source 52 is input to the light guide plate 302 and propagates in the light guide plate 302 in the −X direction. The light propagating in the light guide plate 302 enters the protruding portions 672 from close contact portions 672b of the protruding portions 672 of the output light control sheet 662. The light is irradiated on the scattering surfaces 672c on the inner surfaces of the protruding portions 672, and is reflected at the scattering surfaces 672c to be scattered. That is, the light emitted from the wide-view light source 52 is irradiated on the rough surface, and is scattered in various directions by the rough surface. The output characteristic of the light source apparatus when the wide-view light source is turned on ensures illumination over a wide angular range.

The first to tenth embodiments can be combined with one another as needed. For example, the layout cycle of the inclined surfaces 42 may be made homogeneous in the light guide plate, the inclined surfaces 42 may be formed by a curved surface, or the light source 51 and/or the light source 52 may comprise a point light source in the second to eight embodiments. The amount of light from the light source 51 may be made smaller than the amount of light from the light source 52 in the second to tenth embodiments. In this case, the light source 51 may comprise a single point light source, such as an LED, or a plurality of point light sources, the light source 52 may comprise a plurality of point light sources, such as LEDs, and the quantity of the point light sources of the light source 51 may be set smaller than the quantity of the point light sources of the light source 52.

The portable terminal device according to each of the second to tenth embodiments may be provided with an adjusting section which mutually independently adjusts the amounts of lights of the light source 51 and the light source 52. The first modification of the first embodiment may be combined with any of the seventh to tenth embodiments, so that when the remaining battery power of the portable terminal device is less than a predetermined value, the light source 51 alone is forcibly turned on to set the narrow view angle display. The second modification of the first embodiment may be combined with any of the seventh to tenth embodiments, so that when no input operation has been done in a given time, the display is automatically set to the narrow view angle display.

The invention can be suitably adapted to portable terminal devices, such as a PDA, a game machine, a digital camera, a digital video camera and a notebook type personal computer, and a display apparatus for a fixed type terminal device, such as a cash dispenser or an automatic vending machine.

What is claimed is:

1. A light source apparatus, comprising:
   a light guide member having a flat light output surface and a light diffusion surface opposite said light output surface,
   said light diffusion surface having plural diffusion features arrayed in rows that are parallel to a first side surface of said light guide member,
   each of said plural diffusion features having a first inclined surface inclined at a first angle relative to said light diffusion surface, a second inclined surface inclined at a second angle relative to said light diffusion surface, said second angle being greater than said first angle, and a flat center portion between said first and second inclined surfaces that is parallel to said light diffusion surface;
   a first light source on said first side surface of said light guide member and second light source on a second side surface of said light guide member opposite said first side surface, wherein light in said light guide member from said first light source internally reflects off said first inclined surfaces toward said light output surface and wherein light in said light guide member from said second light source internally reflects off said second inclined surfaces toward said light output surface; and
   an optical member adjacent and parallel to said light output surface, said optical member including a flat plate and an array of reflective surfaces that internally reflect, toward said flat plate, light received from said first inclined surfaces and that refract light received from said second inclined surfaces,
   wherein said first and second angles and said reflective surfaces are arranged to that said flat plate outputs light originating from said first light source in a first angular range and outputs light originating from said second light source in a second angular range that is wider than said first angular range.

2. The light source apparatus of claim 1, wherein said array of reflective surfaces is an array of prisms, wherein each of said prisms has a longitudinally extended apex that is parallel to said first side surface.

3. The light source apparatus of claim 1, further comprising a reflector opposite said light diffusion surface.

4. The light source apparatus of claim 1, wherein said first angle is less than 10° and said second angle is more than 40°, and wherein the first angular range is less than 20° and the second angular range is more 30°.

5. The light source apparatus of claim 1, wherein at least one of a said first and second side surfaces of said light guide member has plural indentations to define a diffusion pattern.

6. The light source apparatus of claim 1, wherein, adjacent to at least one of said first and second side surfaces, said light output surface of said light guide member includes an array of recesses.

7. The light source apparatus of claim 1, further comprising plural louvers between said second light source and said second side surface, said plural louvers being generally perpendicular to said second side surface.

8. The light source apparatus of claim 1, wherein said array of reflective surfaces is an array of cones having center axes parallel to each other.

9. The light source apparatus of claim 8, wherein said center axes are perpendicular to said flat plate.

10. The light source apparatus of claim 8, wherein said center axes are orthogonal to said flat plate.

11. A light source apparatus, comprising:
a light guide member having a flat light output surface and a light diffusion surface opposite said light output surface,
said light diffusion surface having plural inclined surfaces inclined relative to said light diffusion surface, said inclined surfaces being arrayed in rows that are parallel to a first side surface of said light guide member;
a first light source on said first side surface of said light guide member and second light source on a second side surface of said light guide member opposite said first side surface, wherein light in said light guide member from said first light source internally reflects off said light diffusion surface toward said light output surface and wherein light in said light guide member from said second light source internally reflects off said inclined surfaces toward said light output surface; and
an optical member adjacent and parallel to said light output surface, said optical member including a flat plate and a plurality of protruding portions with hemispherical ends directly contacting said light output surface of said light guide member, said protruding portions internally reflecting, toward said flat plate, light received from said first light source and refracting light received from said inclined surfaces,
wherein said inclined surfaces and said protruding portions are arranged so that said flat plate outputs light originating from said first light source in a first angular range and outputs light originating from said second light source in a second angular range that is wider than said first angular range.

12. The light source apparatus of claim 11, further comprising a reflector opposite said light diffusion surface.

13. A light source apparatus, comprising:
a light guide member having a flat light output surface and a flat light diffusion surface opposite said light output surface;
a first light source on a first side surface of said light guide member and second light source on a second side surface of said light guide member opposite said first side surface, wherein light in said light guide member from said first and second light sources internally reflects off said light diffusion surface toward said light output surface; and
an optical member adjacent and parallel to said light output surface, said optical member including a flat plate and an array of protruding portions with rounded ends directly contacting said light output surface of said light guide member,
each of said protruding portions having a first reflective area that faces said first side surface and that has a concavity therein that internally reflects, toward said flat plate, light received from said second light source, and a second reflective area that faces said second side surface and that is convex and that internally reflects, toward said flat plate, light received from said first light source,
wherein said first and second reflective areas are arranged so that said flat plate outputs light originating from said first light source in a first angular range and outputs light originating from said second light source in a second angular range that is wider than said first angular range.

14. A light source apparatus, comprising:
a light guide member having a flat light output surface and a flat light diffusion surface opposite said light output surface;
a first light source on a first side surface of said light guide member and second light source on a second side surface of said light guide member opposite said first side surface, wherein light in said light guide member from said first and second light sources internally reflects off said light diffusion surface toward said light output surface; and
an optical member adjacent and parallel to said light output surface, said optical member including a flat plate and an array of protruding portions with rounded ends directly contacting said light output surface of said light guide member,
each of said protruding portions having a convex roughened diffusion area that faces said first side surface and that internally reflects, toward said flat plate, light received from said second light source, and a convex reflective area that faces said second side surface and that internally reflects, toward said flat plate, light received from said first light source, wherein said roughened diffusion areas and said reflective areas are arranged so that said flat plate outputs light originating from said first light source in a first angular range and outputs light originating from said second light source in a second angular range that is wider than said first angular range.

* * * * *